United States Patent [19]
Kohno et al.

[11] Patent Number: 6,028,717
[45] Date of Patent: *Feb. 22, 2000

[54] ZOOM LENS SYSTEM

[75] Inventors: Tetsuo Kohno, Toyonaka; Mituaki Shimo, Osaka, both of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/096,173

[22] Filed: Jun. 12, 1998

[30] Foreign Application Priority Data

Jun. 13, 1997 [JP] Japan ................................. 9-156872
Jun. 16, 1997 [JP] Japan ................................. 9-158182

[51] Int. Cl.$^7$ .................................................. G02B 15/14
[52] U.S. Cl. ......................... 359/690; 359/676; 359/683; 359/689; 359/695
[58] Field of Search ..................... 359/690, 676, 359/683, 689, 695, 708, 748, 785

[56] References Cited

U.S. PATENT DOCUMENTS

| | | | |
|---|---|---|---|
| 4,506,958 | 3/1985 | Imai ......................................... | 350/427 |
| 4,836,662 | 6/1989 | Ogata et al. ............................. | 350/427 |
| 5,257,135 | 10/1993 | Kohno et al. ........................... | 359/689 |
| 5,543,970 | 8/1996 | Hata et al. . | |

*Primary Examiner*—Georgia Epps
*Assistant Examiner*—David N. Spector
*Attorney, Agent, or Firm*—Burns, Doane, Swecker & Mathis, LLP

[57] ABSTRACT

Sequentially from the object side: a first lens unit having positive optical power; a second lens unit having negative optical power; and a third lens unit having positive optical power, wherein said first and second lens units normally move in opposite directions whereas the third lens unit moves linearly to the object side during zooming from the wide angle end to the telephoto end, and wherein the following conditional equation is satisfied:

$$0.2 < M1/Z < 2.0$$

where M1 represents the amount of movement of the first lens unit during zooming from the wide angle end to the telephoto end, Z represents the zoom ratio (fT/fW), fT represents the overall focal length of the total system at the telephoto end, and fW represents the overall focal length of the total system at the wide angle end. Alternatively, the first lens unit moves to the object side, said second lens unit is stationary, and said third lens unit moves linearly to the object side during zooming from the wide angle end to the telephoto end, and wherein the following conditional equation is satisfied:

$$0.2 < M1/Z < 3.0.$$

51 Claims, 14 Drawing Sheets

FNO=4.12

Spherical Aberration and Sine Condition

Y°=1.8

Astigmatism

Y°=1.8

Distortion %

FNO=4.90

Spherical Aberration and Sine Condition

Y°=1.8

Astigmatism

Y°=1.8

Distortion %

FNO=5.75

Spherical Aberration and Sine Condition

Y°=1.8

Astigmatism

Y°=1.8

Distortion %

FNO=4.12
— d
---- SC
-0.1  0.1
Spherical Aberration and Sine Condition

Y°=1.8
---- DM
— DS
-0.1  0.1
Astigmatism

Y°=1.8
-5.0  5.0
Distortion %

FNO=4.90
— d
---- SC
-0.1  0.1
Spherical Aberration and Sine Condition

Y°=1.8
---- DM
— DS
-0.1  0.1
Astigmatism

Y°=1.8
-5.0  5.0
Distortion %

FNO=5.75
— d
---- SC
-0.1  0.1
Spherical Aberration and Sine Condition

Y°=1.8
---- DM
— DS
-0.1  0.1
Astigmatism

Y°=1.8
-5.0  5.0
Distortion %

FNO=4.12
Spherical Aberration and Sine Condition

Y°=1.8
Astigmatism

Y°=1.8
Distortion %

FNO=4.90
Spherical Aberration and Sine Condition

Y°=1.8
Astigmatism

Y°=1.8
Distortion %

FNO=5.75
Spherical Aberration and Sine Condition

Y°=1.8
Astigmatism

Y°=1.8
Distortion %

FNO=4.12
— d
--- SC
-0.1  0.1
Spherical Aberration and Sine Condition

Y°=1.8
--- DM
— DS
-0.1  0.1
Astigmatism

Y°=1.8
-5.0  5.0
Distortion %

FNO=4.90
— d
--- SC
-0.1  0.1
Spherical Aberration and Sine Condition

Y°=1.8
--- DM
— DS
-0.1  0.1
Astigmatism

Y°=1.8
-5.0  5.0
Distortion %

FNO=5.75
— d
--- SC
-0.1  0.1
Spherical Aberration and Sine Condition

Y°=1.8
--- DM
— DS
-0.1  0.1
Astigmatism

Y°=1.8
-5.0  5.0
Distortion %

FNO=4.10
— d
--- SC
Spherical Aberration and Sine Condition

Y°=1.8
--- DM
— DS
Astigmatism

Y°=1.8
Distortion %

FNO=5.25
— d
--- SC
Spherical Aberration and Sine Condition

Y°=1.8
--- DM
— DS
Astigmatism

Y°=1.8
Distortion %

FNO=5.73
— d
--- SC
Spherical Aberration and Sine Condition

Y°=1.8
--- DM
— DS
Astigmatism

Y°=1.8
Distortion %

FNO=4.10

Spherical Aberration and Sine Condition

Y°=1.8

Astigmatism

Y°=1.8

Distortion %

FNO=5.25

Spherical Aberration and Sine Condition

Y°=1.8

Astigmatism

Y°=1.8

Distortion %

FNO=5.73

Spherical Aberration and Sine Condition

Y°=1.8

Astigmatism

Y°=1.8

Distortion %

FNO=4.10

Spherical Aberration and Sine Condition

Y°=1.8

Astigmatism

Y°=1.8

Distortion %

FNO=5.25

Spherical Aberration and Sine Condition

Y°=1.8

Astigmatism

Y°=1.8

Distortion %

FNO=5.73

Spherical Aberration and Sine Condition

Y°=1.8

Astigmatism

Y°=1.8

Distortion %

FNO=4.10

-0.2  0.2
Spherical Aberration and Sine Condition

— d
--- SC

Y°=1.8

-0.2  0.2
Astigmatism

--- DM
— DS

Y°=1.8

-5.0  5.0
Distortion %

FNO=5.25

-0.2  0.2
Spherical Aberration and Sine Condition

— d
--- SC

Y°=1.8

-0.2  0.2
Astigmatism

--- DM
— DS

Y°=1.8

-5.0  5.0
Distortion %

FNO=5.73

-0.2  0.2
Spherical Aberration and Sine Condition

— d
--- SC

Y°=1.8

-0.2  0.2
Astigmatism

--- DM
— DS

Y°=1.8

-5.0  5.0
Distortion %

FNO=4.10
Spherical Aberration and Sine Condition

Y°=1.8
Astigmatism

Y°=1.8
Distortion %

FNO=5.25
Spherical Aberration and Sine Condition

Y°=1.8
Astigmatism

Y°=1.8
Distortion %

FNO=5.73
Spherical Aberration and Sine Condition

Y°=1.8
Astigmatism

Y°=1.8
Distortion %

FNO=4.10
— d
---- SC
-0.2  0.2
Spherical Aberration and Sine Condition

Y°=1.8
---- DM
— DS
-0.2  0.2
Astigmatism

Y°=1.8
-5.0  5.0
Distortion %

FNO=5.25
— d
---- SC
-0.2  0.2
Spherical Aberration and Sine Condition

Y°=1.8
---- DM
— DS
-0.2  0.2
Astigmatism

Y°=1.8
-5.0  5.0
Distortion %

FNO=5.73
— d
---- SC
-0.2  0.2
Spherical Aberration and Sine Condition

Y°=1.8
---- DM
— DS
-0.2  0.2
Astigmatism

Y°=1.8
-5.0  5.0
Distortion %

ZOOM LENS SYSTEM

This application is based on application Nos. 09-158182 and 09-156872 filed, the contents of which are herein incorporated by reference.

BACKGROUND OF THE INVENTION

1. Field of the Invention

The present invention relates to a zoom lens system, and specifically relates to a zoom lens system capable of high variable magnification using few lens elements, and an optical construction suitable for digital still cameras, silver halide cameras, video cameras and television cameras. for example.

2. Description of the Related Art

On one hand, in recent years demand has grown for compact and inexpensive video cameras and television cameras, and there has been an accompanying demand for compact and inexpensive photographic lens systems for use with such cameras. On the other hand, there is increasing demand for higher specification products, including zoom lens systems of high variable magnification for use as photographic lens systems. Although the demand for compact, inexpensive, high variable magnification optical systems is contradictory, response to said demand has led to various improvements in zoom lens systems.

For example, Japanese Laid-Open Patent Application Nos. 2-56515, 4-281419, and 5-203875 and U.S. Pat. No. 5,543,970 respectively disclose three-component zoom lens systems comprising sequentially from the object side a positive first lens unit, negative second lens unit, and positive third lens unit as zoom lens systems which are compact and inexpensive while providing high variable magnification.

The zoom lens systems of the aforesaid disclosures leave room for improvement in the overall length of the total lens system, and number of lens elements. Also, zoom lens systems which utilize few lens elements have not been responsive to the aforesaid demanded specifications insofar as their magnification ratio is only 2×–3×.

OBJECTS AND SUMMARY

An object of the present invention is to provide a zoom lens system constructed with few lens elements and which is suitable for video cameras and television cameras.

Another object of the present invention is to provide a zoom lens system having a high zoom ratio suitable for video cameras and television cameras.

The present invention attains these objects by providing a zoom lens system comprising sequentially from the object side:

a first lens unit having positive optical power;

a second lens unit having negative optical power; and a third lens unit having positive optical power, wherein said first and second lens units normally move in opposite directions whereas the third lens unit moves linearly to the object side during zooming from the wide angle end to the telephoto end, and wherein the following conditional equation is satisfied:

$$0.2 < M1/Z < 2.0$$

where M1 represents the amount of movement of the first lens unit during zooming from the wide angle end to the telephoto end, Z represents the zoom ratio (fT/fW), fT represents the overall focal length of the total system at the telephoto end, and fW represents the overall focal length of the total system at the wide angle end.

Another construction of the present invention further provides a zoom lens system comprising sequentially from the object side:

a first lens unit having positive optical power;

a second lens unit having negative optical power; and a third lens unit having positive optical power, wherein said first lens unit moves to the object side, said second lens unit is either stationary or more in the same direction as the first lens unit, and said third lens unit moves linearly to the object side during zooming from the wide angle end to the telephoto end, and wherein the following conditional equation is satisfied:

$$0.2 < M1/Z < 3.0$$

where M1 represents the amount of movement of the first lens unit during zooming from the wide angle end to the telephoto end, Z represents the zoom ratio (fT/fW), fT represents the overall focal length of the total system at the telephoto end, and fW represents the overall focal length of the total system at the wide angle end.

These and other objects and features of the present invention will become apparent from the following description of the preferred embodiments thereof taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
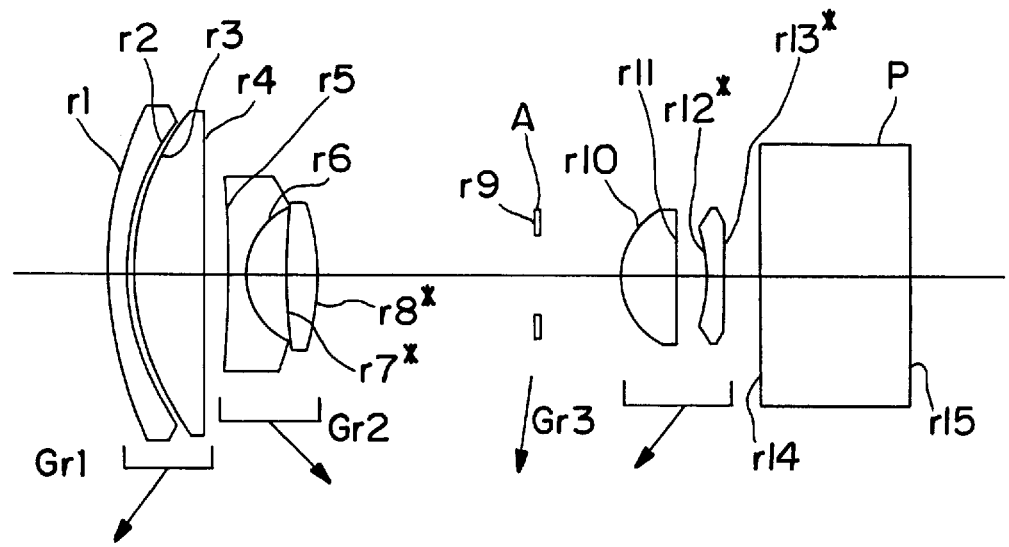
FIG. 1 shows the construction of lens units of a first embodiment (numerical value example 1)

Examples of Zoom Lens Systems in Which the First and Second Lens Units Move in Opposite Directions During Zooming Embodiments of zoom lens systems wherein the first and second lens units move in opposite directions during zooming are described hereinafter with reference to the accompanying drawings. FIGS. 1~5 show the construction of lens units of the zoom lens systems of the first through fifth embodiments, respectively. As shown in the drawings, the zoom lens systems of the first through fifth embodiments respectively comprise sequentially from the object side (left side in the drawings) a positive first lens unit Gr1, negative second lens unit Gr2, diaphragm A, and positive third lens unit Gr3, and are generally provided with a lowpass filter P nearest the image side particularly when using an electronic imaging medium such as a CCD.

Among the aforesaid embodiments, the first, third, and fifth embodiments provide that the first lens unit Gr1 moves monotonously (e.g., linearly) to the object side, the second lens unit Gr2 moves monotonously (e.g., linearly) to the image side, and the third lens unit moves linearly to the object side during zooming from the wide angle end to the telephoto end. The second and fourth embodiments provide that the first lens unit Gr1 moves linearly to the object side, the second lens unit Gr2 moves linearly to the image side, and the third lens unit Gr3 tracks a convexity to the object side. The aforesaid modes of movement of the various lens units effectively accomplish variable magnification while reducing the amount of movement and overall length of the various lens units during zooming.

In the first embodiment shown in FIG. 1, the first lens unit Gr1 comprises sequentially from the object side a negative meniscus lens element having a convex surface facing the object side, and a positive meniscus lens element having a strongly convex surface facing the object side. The second lens unit Gr2 comprises sequentially from the object side a biconcave lens element having a strongly concave surface facing the image side, and a positive meniscus lens element having a convex surface facing the image side. The third lens unit Gr3 comprises sequentially from the object side a biconvex lens element having a strongly convex surface facing the object side, and a biconcave lens element. An aperture A is positioned between the second and third lens units, wherein the aperture A moves linearly toward the object side during zooming from the wide angle end to the telephoto end.

Figure 2:
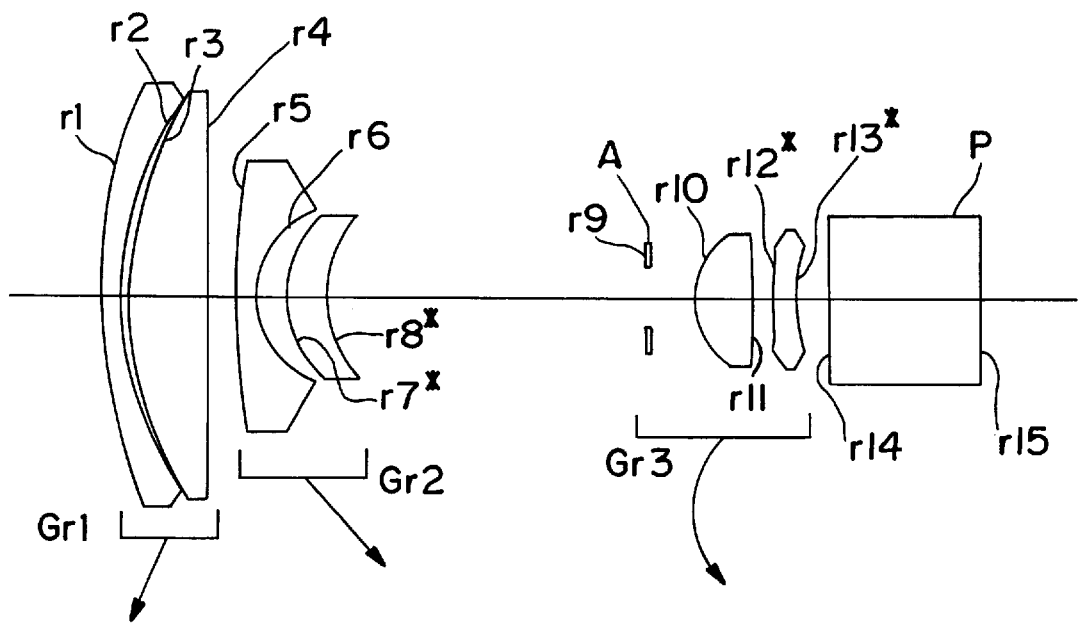
FIG. 2 shows the construction of lens units of a second embodiment (numerical value example 2)

In the second embodiment shown in FIG. 2, the first lens unit Gr1 comprises sequentially from the object side a negative meniscus lens element having a convex surface facing the object side, and a biconvex lens element having a strongly convex surface facing the object side. The second lens unit Gr2 comprises sequentially from the object side a negative meniscus lens element having a strongly concave surface facing the image side, and a meniscus lens element having weak optical power and a convex surface facing the object side. The third lens unit Gr3 comprises sequentially from the object side a biconvex lens element having a strongly convex surface facing the object side, and a negative meniscus lens element having a concave surface facing the image side. An aperture A is positioned between the second and third lens units, wherein the aperture A moves as part of the third lens unit.

Figure 3:
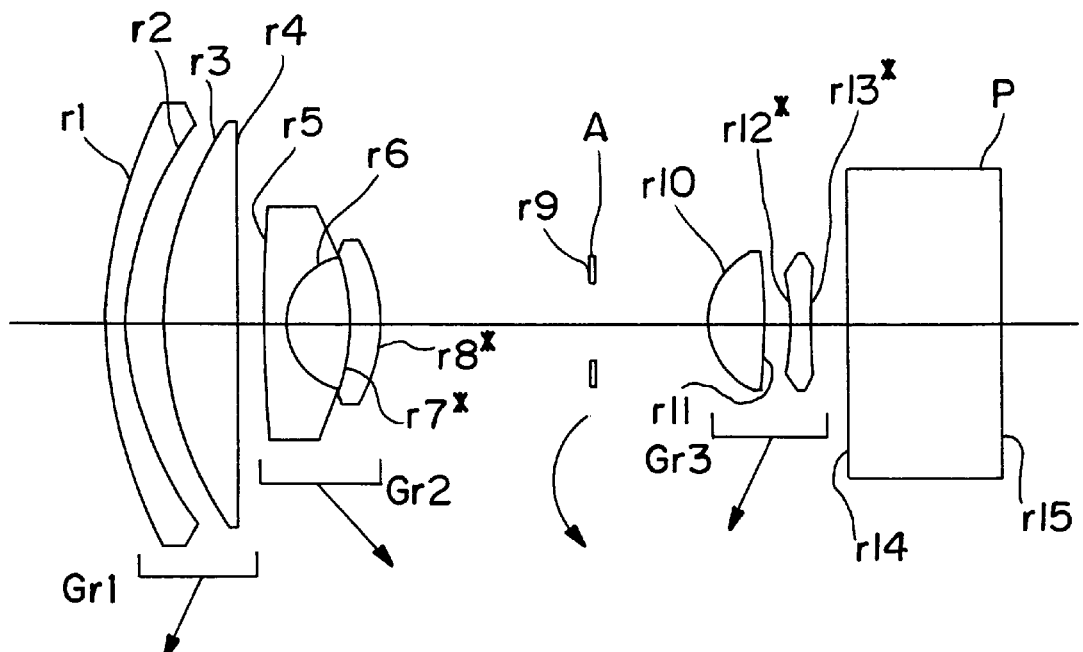
FIG. 3 shows the construction of lens units of a third embodiment (numerical value example 3)

In the third embodiment shown in FIG. 3, the first lens unit Gr1 comprises sequentially from the object side a negative meniscus lens element having a convex surface facing the object side, and positive meniscus lens element having a strongly convex surface facing the object side. The second lens unit Gr2 comprises sequentially from the object side a negative meniscus lens element having a strongly concave surface facing the image side, and positive meniscus lens element having a convex surface facing the image side. The third lens unit Gr3 comprises sequentially from the object side a biconvex lens element having a strongly convex surface facing the object side, and a negative meniscus lens element having a concave surface facing the image side. An aperture A is positioned between the second and third lens units, wherein the aperture A moves convexly toward the object side during zooming from the wide angle end to the telephoto end.

Figure 4:
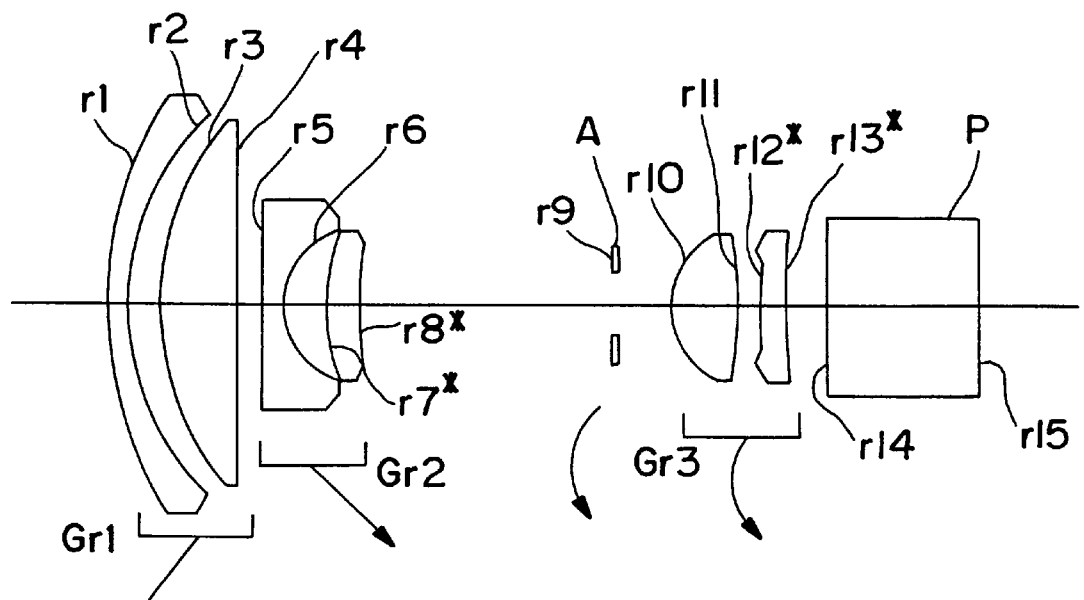
FIG. 4 shows the construction of lens units of a fourth embodiment (numerical value example 4)

In the fourth embodiment shown in FIG. 4, the first lens unit Gr1 comprises sequentially from the object side a negative meniscus lens element having a convex surface facing the object side, and a positive meniscus lens element having a convex surface facing the object side. The second lens unit Gr2 comprises sequentially from the object side a negative meniscus lens element having a strongly concave surface facing the image side, and a positive meniscus lens element having a convex surface facing the object side. The third lens unit Gr3 comprises sequentially from the object side a biconvex lens element having a strongly convex surface facing the object side, and a negative meniscus lens element having a concave surface facing the image side. An aperture A is positioned between the second and third lens units, wherein the aperture A moves convexly toward the object side during zooming from the wide angle end to the telephoto end.

Figure 5:
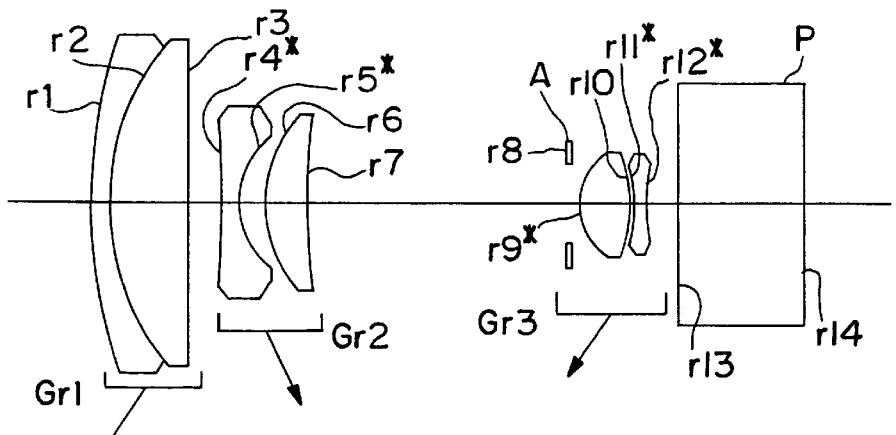
FIG. 5 shows the construction of lens units of a fifth embodiment (numerical value example 5)

In the fifth embodiment shown in FIG. 5, the first lens unit Gr1 comprises sequentially from the object side a cemented lens element incorporating a negative meniscus lens element having a convex surface facing the object side, and a positive meniscus lens element having a strongly convex surface facing the object side. The second lens unit Gr2 comprises a biconcave lens element having a strongly concave surface facing the image side, and a positive meniscus lens element having a convex surface facing the object side. The third lens unit Gr3 comprises sequentially from the object side a biconvex lens element having a strongly convex surface facing the object side, and a biconcave lens element. An aperture A is positioned between the second and third lens units, wherein said aperture moves as part of said third lens unit.

The first lens unit Gr1 comprises a negative lens element and a positive lens element in the aforesaid embodiments. This arrangement is the minimum condition to obtain excellent correction of axial color aberration. The second lens unit Gr2 comprises a negative lens element and positive lens element. This arrangement is the minimum condition to obtain excellent correction of magnification color aberration. The third lens unit Gr3 is provided with a positive lens element having a strong curvature on the object side as the element nearest the object side. This arrangement provides excellent correction of spherical aberration by largely absorbing the scattered light flux entering the third lens unit Gr3 directly after entrance.

All of the embodiments shown in FIGS. 1–5 satisfy the conditional equation below:

$$0.2 < M1/Z < 2.0 \tag{1}$$

where M1 represents the amount of movement of the first lens unit Gr1 from the wide angle end to the telephoto end during zooming, Z represents the zoom ratio (fT/fW), fr represents the overall focal length of the system at the telephoto end, and fW represents the overall focal length of the system at the wide angle end.

Conditional equation (1) specifies the zoom ratio and amount of movement of the first lens unit Gr1 during zooming, and is a condition that balances performance and size of the optical system by controlling the amount of movement of the first lens unit Gr1 in accordance with the zoom ratio. When the upper limit of conditional equation (1) is exceeded, there is an excessive amount of movement of the first lens unit Gr1 relative to the zoom ratio, thereby increasing the overall length at the telephoto end as well as increasing the anterior lens element diameter.

Conversely, when the lower limit of conditional equation (1) is exceeded, there is too little movement of the first lens unit Gr1 relative to the zoom ratio, thereby increasing the overall length at the wide angle end which must be suppressed by increasing the optical strength of the first lens unit Gr1, thereby making it difficult to correct spherical aberration and axial color aberration at the telephoto end.

It is desirable that the following conditional equations are satisfied:

$$0.7 < 2M/fW < 2.2 \tag{2}$$

$$-0.9 < f2/fW < -2.0 \tag{3}$$

where MS represents the amount of movement of the second lens unit Gr2 from the wide angle end to the telephoto end during zooming, f2 represents the focal length of the second lens unit Gr2, and fW represents the overall focal length of the system at the wide angle end.

The aforesaid conditional equations (2) and (3) relate to the second lens unit Gr2. Conditional equation (2) specifies the ratio of the amount of movement of the second lens unit Gr2 during zooming and the focal length at the wide angle end. When the upper limit of conditional equation (2) is exceeded, there is an increase in the amount of movement of the second lens unit Gr2 which increases the overall length at the wide angle end as well as increases the anterior lens element diameter.

Conversely, when the lower limit of conditional equation (2) is exceeded, there is too little movement of the second lens unit Gr2 such that the amount of movement of the first lens unit Gr1 or the third lens unit Gr3 must be markedly increased to accomplish high variable magnification. When the amount of movement of the first lens unit Gr1 is increased, the aforesaid conditional equation (1) cannot be satisfied, and there is a resultant increase in the overall length at the telephoto end as well as an increase in the anterior lens element diameter. When the amount of movement of the third lens unit Gr3 is increased, it becomes difficult to correct aberration, and correction of spherical aberration becomes particularly difficult.

The aforesaid conditional equation (3) specifies the ratio of the focal length of the second lens unit Gr2 and the focal length at the wide angle end. When the upper limit of conditional equation (3) is exceeded, the optical power of the second lens unit Gr2 is excessively reduced which is advantageous from a performance perspective, but it increases the overall length of the optical system as well as the amount of movement when zooming, and the lens element diameter is increased to assure sufficient peripheral light. As a result, the camera is enlarged overall, and the demand for compactness is not realized.

Conversely, when the lower limit of conditional equation (3) is exceeded, the optical power of the second lens unit Gr2 is excessively increased which is advantageous relative to compactness since the overall length and amount of movement when zooming is reduced, but various types of aberration are adversely influenced to marked effect. Negative aberration worsens with a marked falling of the image plane to the over side.

Providing an aspherical surface in the second lens unit Gr2 is particularly effective in correcting aberration and image plane curvature. In this instance, at least one aspherical surface satisfies conditional equation (4) below:

$$-8 < (|X|-|Xo|)/Co(N'-N)f2 < 0.0 \tag{4}$$

where X represents the amount of displacement in the optical axis direction of the height Y of the effective optical path expressed by equation (a) below, Xo represents the displacement in the optical axis direction of the height Y of the effective optical path expressed by equation (b) below, Co represents the curvature of the spherical surface referenced to the aspherical surface, N' represents the refractive index on the image side of the aspherical surface, N represents the refractive index on the object side of the aspherical surface, and f2 represents the focal length of the second lens unit Gr2. These equations are as follows:

$$X = Xo + \Sigma A j Y^j \tag{a}$$

$$Xo = CoY^2/\{1+(1-\epsilon Co^2 Y^2)^{1/2}\} \tag{b}$$

where Aj represents the aspherical surface coefficient of the j degree, and $\epsilon$ represents the curvature parameter of the second degree.

Conditional equation (4) specifies that the aspherical surface has a shape that weakens the negative optical power of the second lens unit Gr2. When the lower limit of conditional equation (4) is exceeded, the negative optical power is excessively weakened so as to increase the under fall of the image plane curvature at the wide angle end and positive distortion becomes pronounced. Conversely, when the upper limit of conditional equation (4) is exceeded, the weakening of negative optical power is effectively reduced so as to nullify the advantage of using an aspherical surface in the second lens unit Gr2, and produce an increase in the movement in a positive direction of the image plane curvature at the wide angle end in aberration correction, with pronounced negative distortion.

Provision of an aspherical surface in the third lens unit Gr3 is particularly effective for spherical aberration. In this instance, at least one aspherical surface satisfies conditional equation (5) below:

$$-1.0 < (|X|-|Xo|)/Co(N'-N)f3 < 1.0, \text{ except zero,} \tag{5}$$

where f3 represents the focal length of the third lens unit Gr3.

When the lower limit of conditional equation (5) is exceeded, positive optical power is excessively reduced at the margins so as to produce a marked over trend in spherical aberration. Conversely, when the upper limit is exceeded, positive optical power increases excessively at the margins so as to produce a marked under trend in spherical aberration.

Examples of Zoom Lens Systems in Which the First and Third Lens Units Move in a Uniform Direction During Zooming Embodiments of zoom lens systems wherein the first and third lens units move in a uniform direction during zooming are described hereinafter with reference to the accompanying drawings. FIGS. 6–10 show the construction of lens elements of the zoom lens systems of the sixth through tenth embodiments, respectively. As shown in the drawings, the zoom lens systems of the sixth through tenth embodiments respectively comprise sequentially from the object side (left side in the drawings) a positive first lens unit Gr1, negative second lens unit Gr2, diaphragm A, and positive third lens unit Gr3, and are generally provided with a lowpass filter P nearest the image side.

Among the aforesaid embodiments, the sixth, seventh, and tenth embodiments provide that the first lens unit Gr1 moves linearly to the object side, the second lens unit Gr2 is stationary (FIGS. 6, 7 and 10) or moves linearly to the image side (FIGS. 8 and 9), and the third lens unit Gr3 moves linearly to the object side during zooming from the wide angle end to the telephoto end. The eighth and ninth embodiments provide that the first lens unit Gr1 moves linearly to the object side, the second lens unit Gr2 moves so as to be positioned on the object side from the wide angle end at intermediate focal length fM, and the third lens unit Gr3 moves to the object side.

When zooming from the wide angle end to the telephoto end, the various lens units are moved such that the distance increases between the first lens unit Gr1 and the second lens unit Gr2, and the distance decreases between the second lens unit Gr2 and the third lens unit Gr3. This mode of movement of the various lens units effectively produces variable magnification, and reduces the overall length and amount of movement of the various lens units during zooming. Rendering the second lens unit Gr2 stationary during zooming is advantageous insofar as it simplifies the lens barrel construction since only two lens units move, and reduces the amount of movement of the first lens unit Gr1. Furthermore, the overall length is reduced at the wide angle end when the second lens unit Gr2 is moved to a position on the object side from the wide angle end at intermediate focal length fM.

Figure 6:
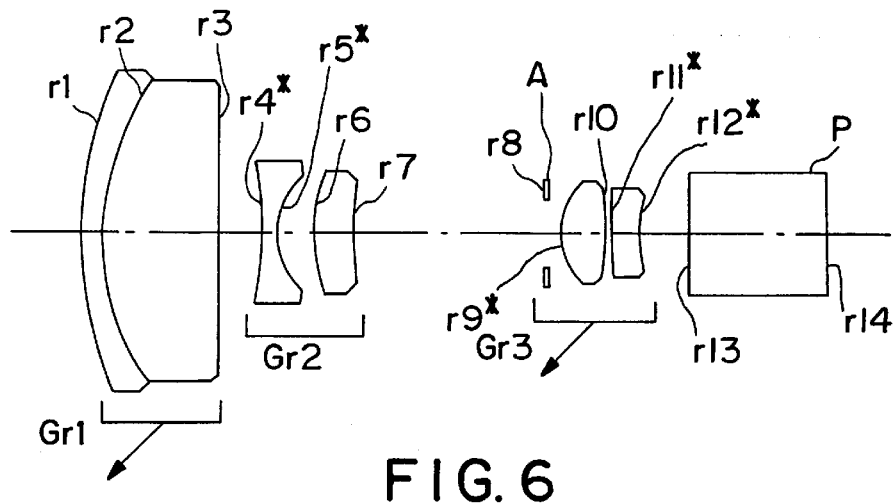
FIG. 6 shows the construction of lens units of a sixth embodiment (numerical value example 6)

In the sixth embodiment shown in FIG. 6, the first lens unit Gr1 comprises sequentially from the object side a cemented lens incorporating a negative meniscus lens element having a convex surface facing the object side, and a biconvex lens element having a strongly convex surface facing the object side. The second lens unit Gr2 comprises sequentially from the object side a biconvex lens element having a strongly convex surface facing the image side, and a positive meniscus lens element having a convex surface facing the image side. The third lens unit Gr3 comprises sequentially from the object side a biconvex lens element having a strongly convex surface facing the object side, and a negative meniscus lens element having a convex surface facing the object side.

Figure 7:
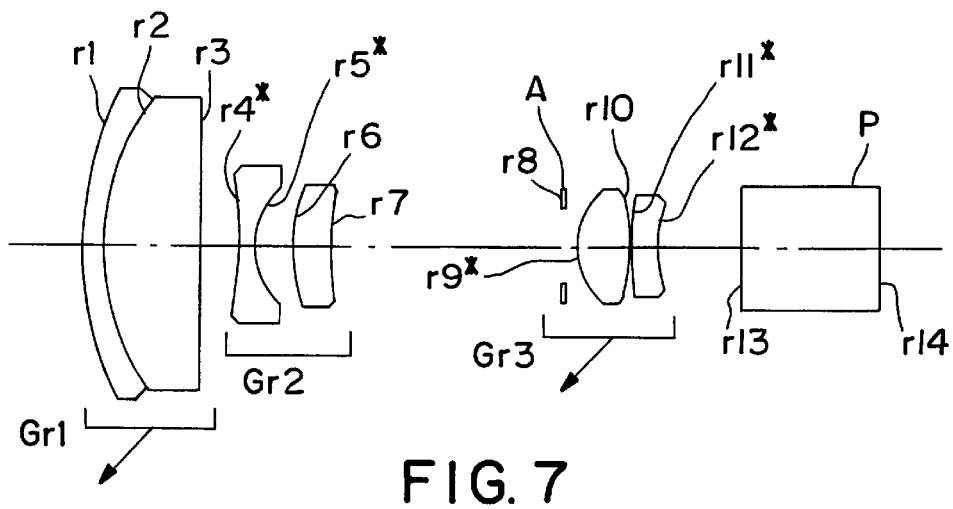
FIG. 7 shows the construction of lens units of a seventh embodiment (numerical value example 7)

In the seventh embodiment shown in FIG. 7, the first lens unit Gr1 comprises sequentially from the object side a cemented lens unit incorporating a negative meniscus lens element having a convex surface facing the object side, and a biconvex lens element having a strongly convex surface facing the object side. The second lens unit Gr2 comprises sequentially form the object side a negative meniscus lens element having a strongly concave surface facing the image side, and a positive meniscus lens element having a convex surface facing the object side. The third lens unit Gr3 comprises sequentially from the object side a biconvex lens element having a strongly convex surface facing the object side, and a biconcave lens element having a strongly concave surface facing the image side.

Figure 8:
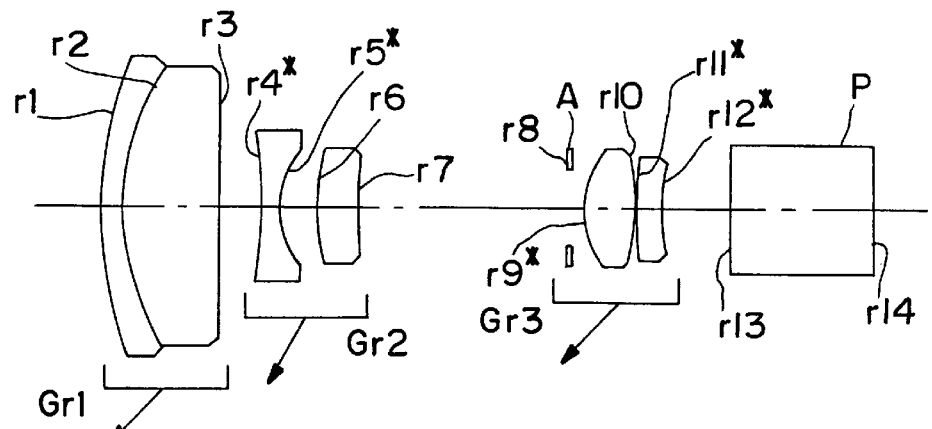
FIG. 8 shows the construction of lens units of a eighth embodiment (numerical value example 8)

In the eighth embodiment shown in FIG. 8, the first lens unit Gr1 comprises sequentially from the object side a cemented lens element incorporating a negative meniscus lens element having a convex surface facing the object side, and a biconvex lens element having a strongly convex surface facing the object side. The second lens unit Gr2 comprises sequentially from the object side a negative meniscus lens element having a strongly concave surface facing the image side, and a positive meniscus lens element having a convex surface facing the image side. The third lens unit Gr3 comprises sequentially from the object side a biconvex lens element having a strongly convex surface facing the object side, and a biconcave lens element having a concave surface on the image side.

Figure 9:
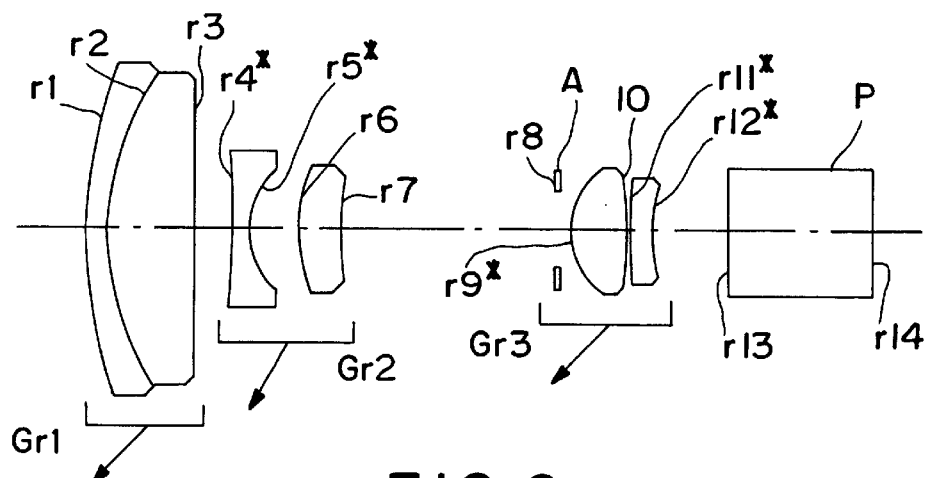
FIG. 9 shows the construction of lens units of a ninth embodiment (numerical value example 9)

In the ninth embodiment shown in FIG. 9, the first lens unit Gr1 comprises sequentially from the object side a cemented lens element incorporating a negative meniscus lens element having a convex surface facing the object side, and a biconvex lens element having a strongly convex surface facing the object side. The second lens unit Gr2 comprises sequentially from the object side a negative meniscus lens element having a strongly concave surface facing the image side, and a positive meniscus lens element having a convex surface facing the image side. The third lens unit Gr3 comprises sequentially from the object side a biconvex lens element having a strongly convex lens element facing the object side, and a biconcave lens element having a concave surface facing the image side.

Figure 10:
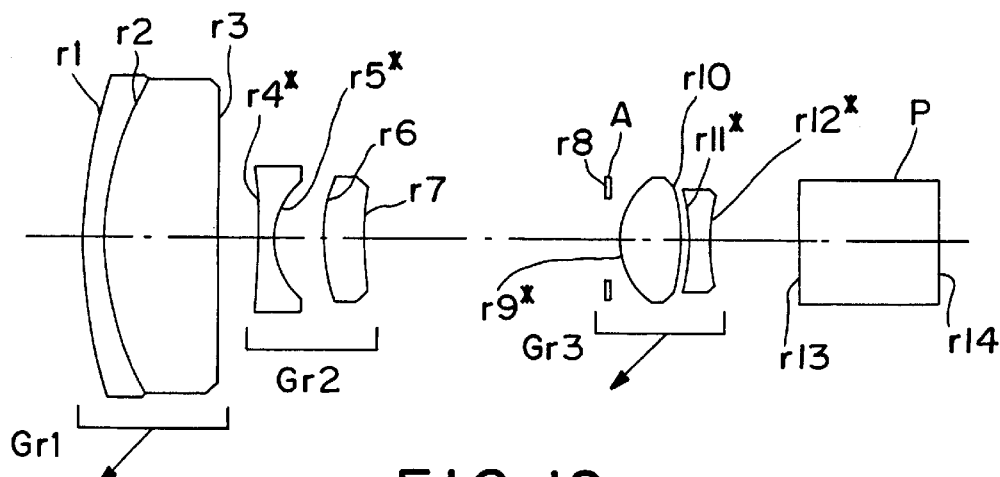
FIG. 10 shows the construction of lens units of a tenth embodiment (numerical value example 10)
Figure 11A:
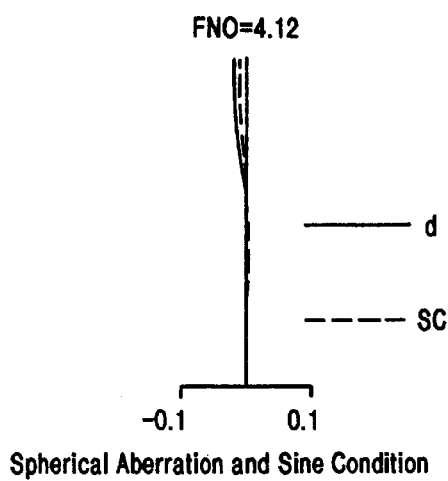
FIGS. 11(a)~(i) are aberration diagrams pertaining to the first embodiment (numerical value example 1)
Figure 11B:
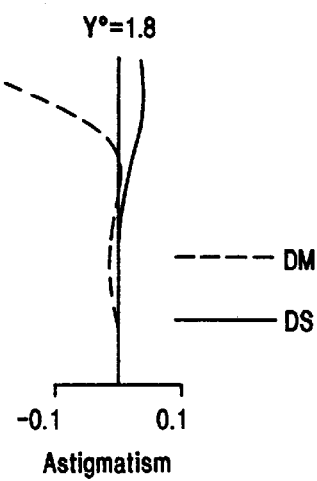
Figure 11C:
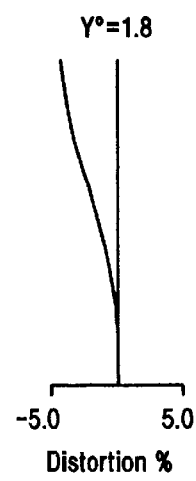
Figure 11D:
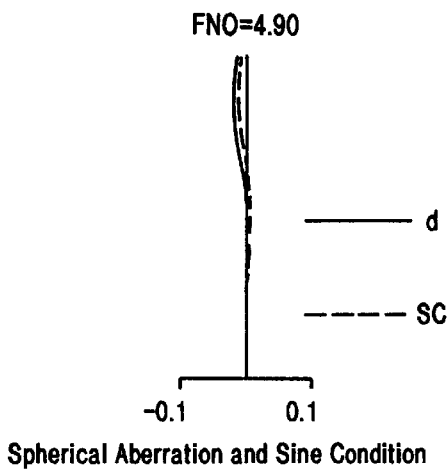
Figure 11E:
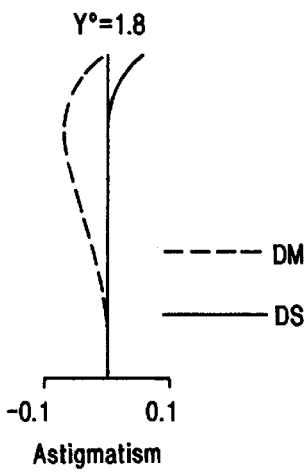
Figure 11F:
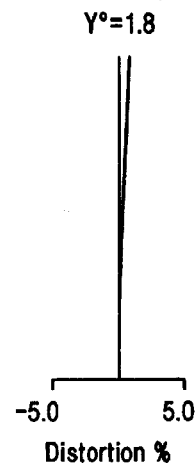
Figure 11G:
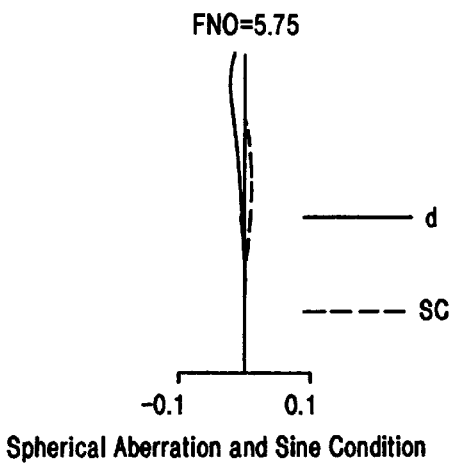
Figure 11H:
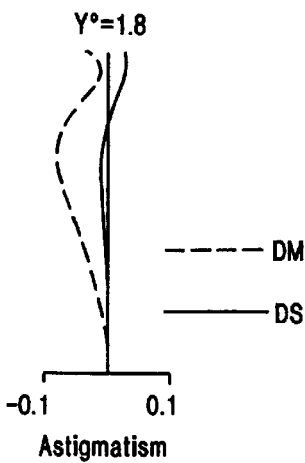
Figure 11I:
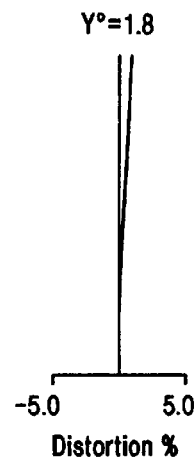
Figure 12A:
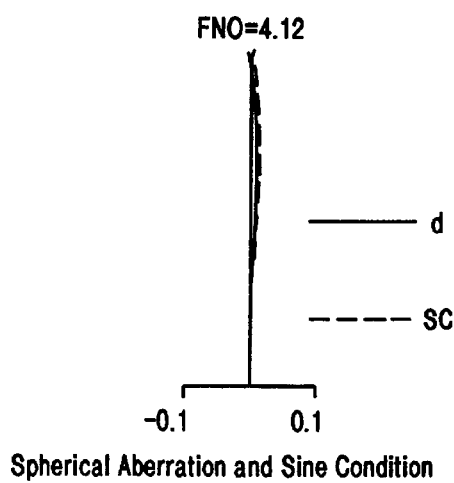
FIGS. 12(a)~(i) are aberration diagrams pertaining to the second embodiment (numerical value example 2)
Figure 12B:
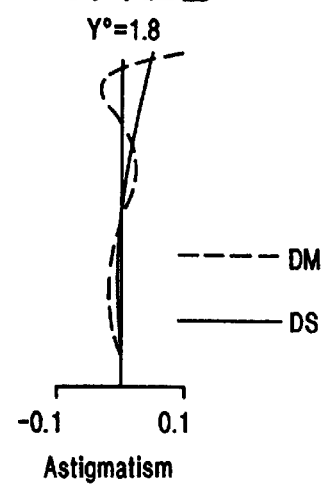
Figure 12C:
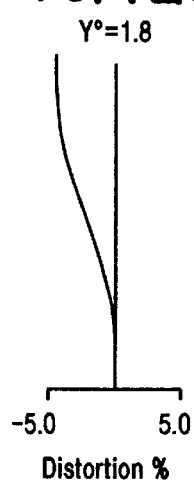
Figure 12D:
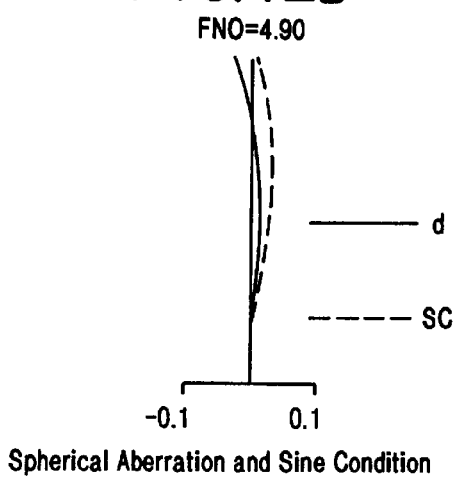
Figure 12E:
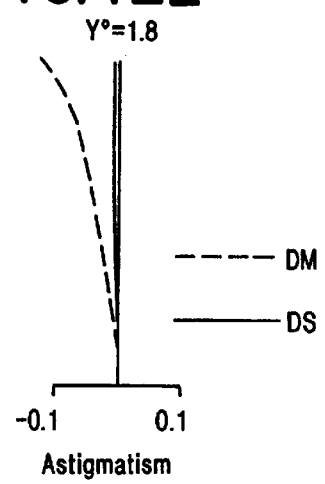
Figure 12F:
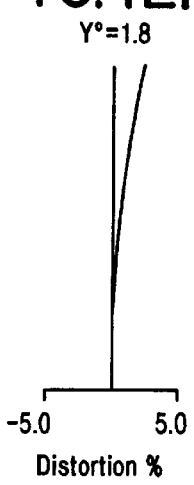
Figure 12G:
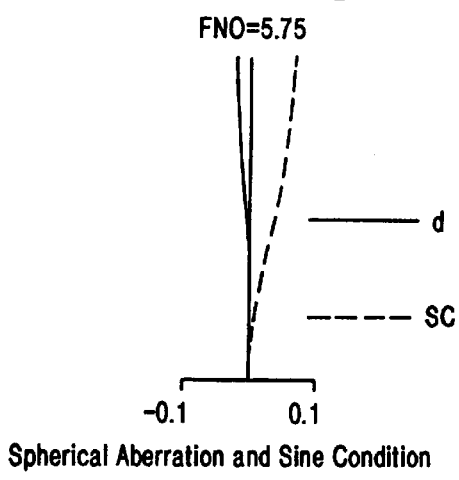
Figure 12H:
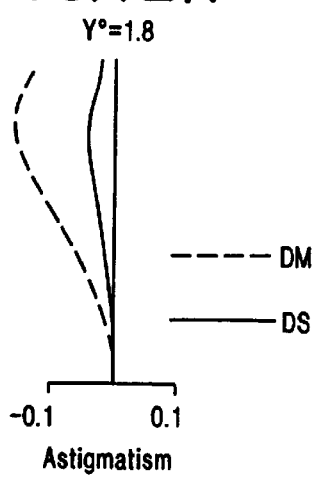
Figure 12I:
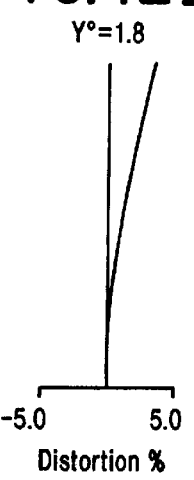
Figure 13A:
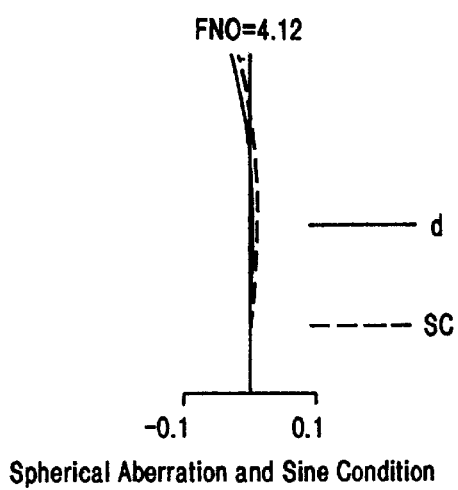
FIGS. 13(a)~(i) are aberration diagrams pertaining to the third embodiment (numerical value example 3)
Figure 13B:
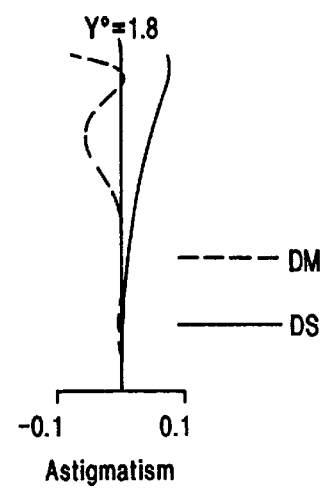
Figure 13C:
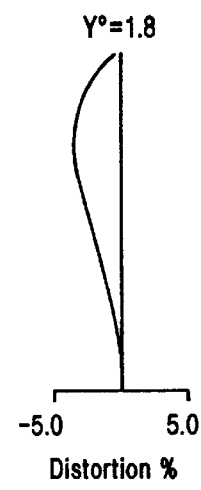
Figure 13D:
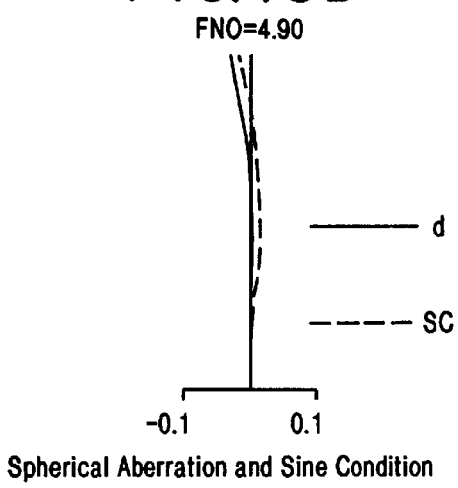
Figure 13E:
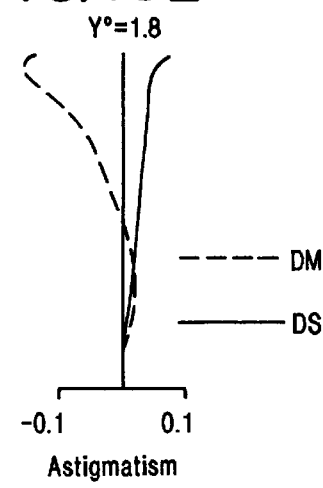
Figure 13F:
Figure 13G:
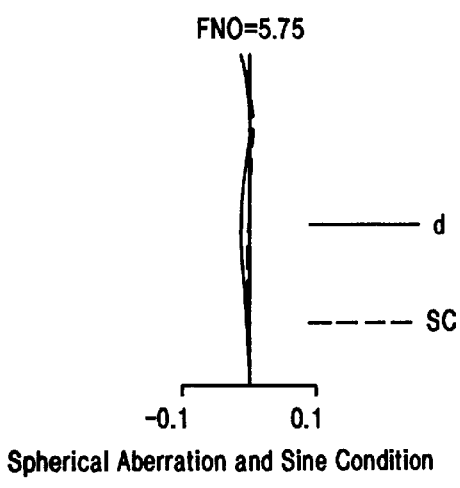
Figure 13H:
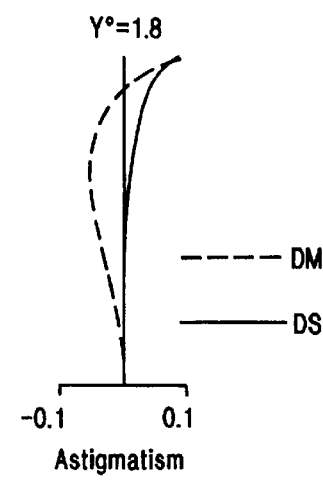
Figure 13I:
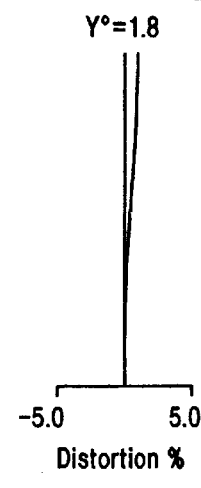
Figure 14A:
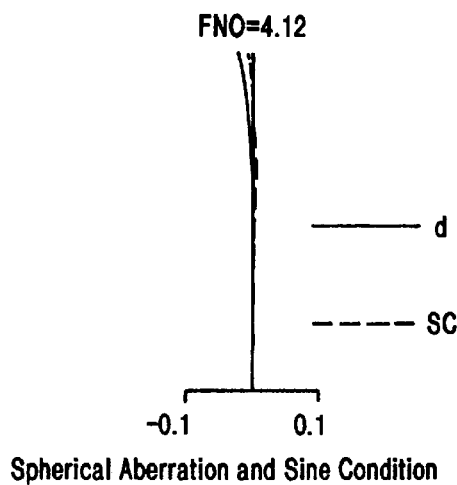
FIGS. 14(a)~(i) are aberration diagrams pertaining to the fourth embodiment (numerical value example 4)
Figure 14B:
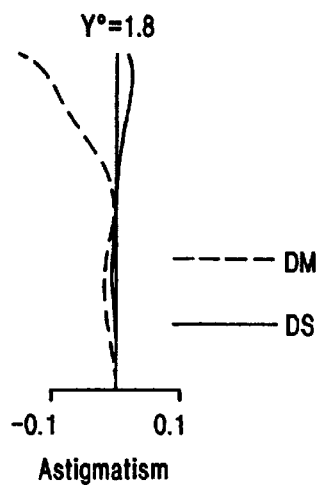
Figure 14C:
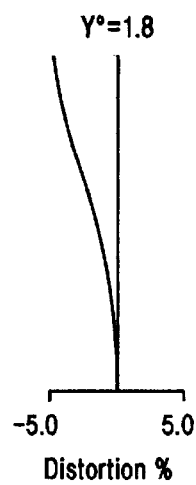
Figure 14D:
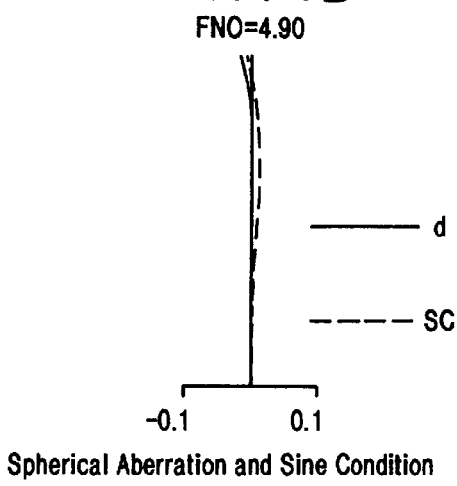
Figure 14E:
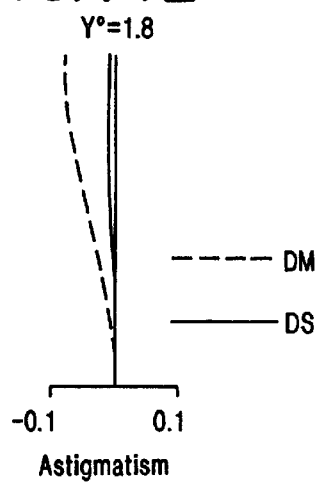
Figure 14F:
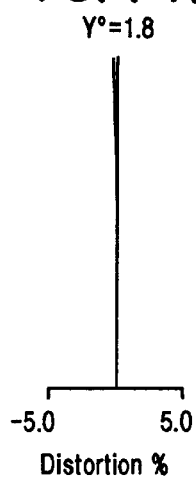
Figure 14G:
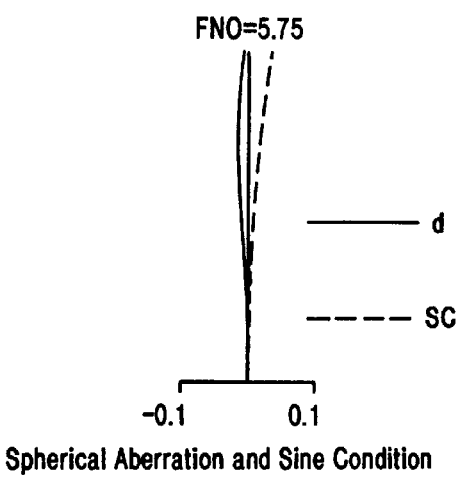
Figure 14H:
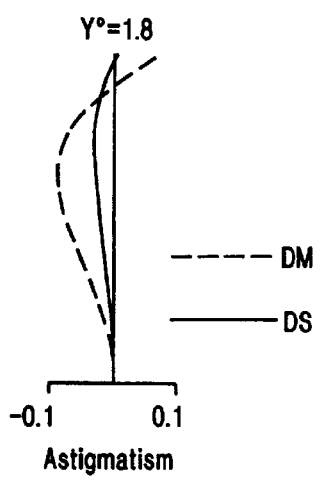
Figure 14I:
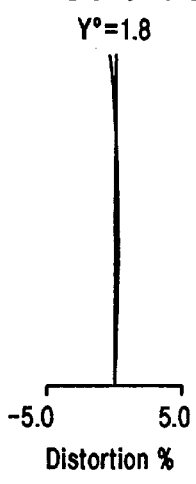
Figure 15A:
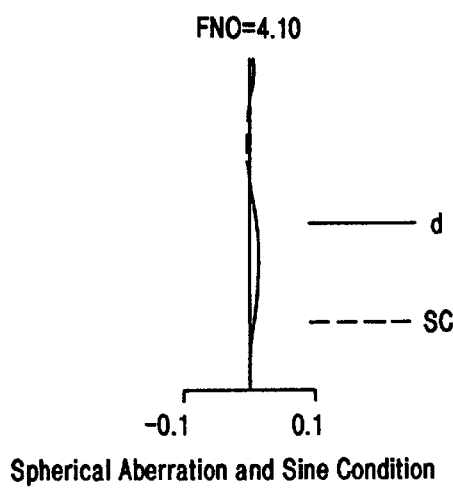
FIGS. 15(a)~(i) are aberration diagrams pertaining to the fifth embodiment (numerical value example 5)
Figure 15B:
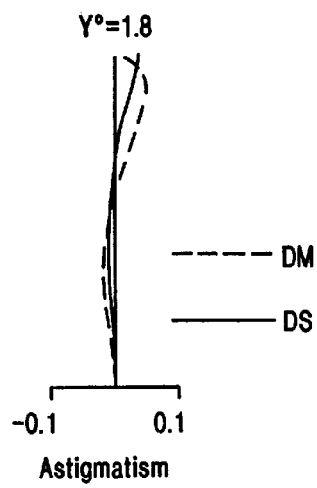
Figure 15C:
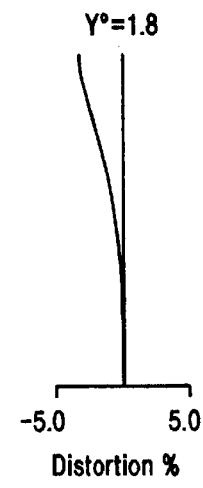
Figure 15D:
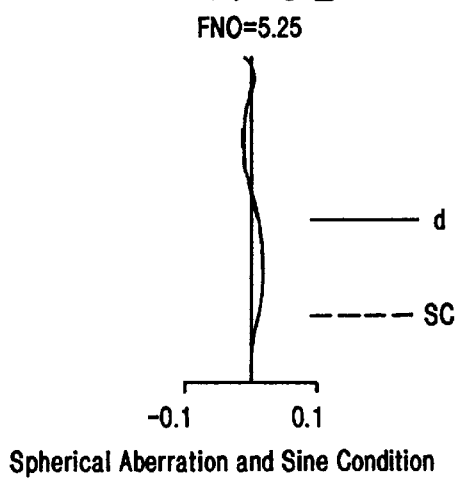
Figure 15E:
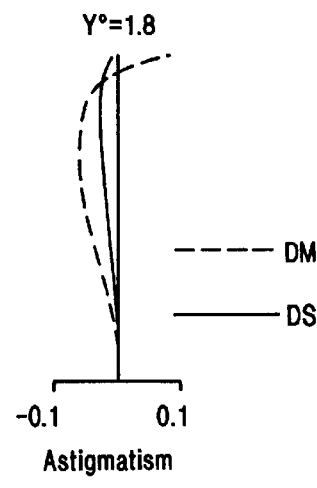
Figure 15F:
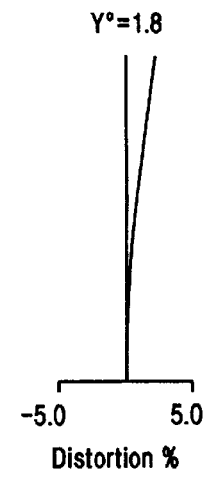
Figure 15G:
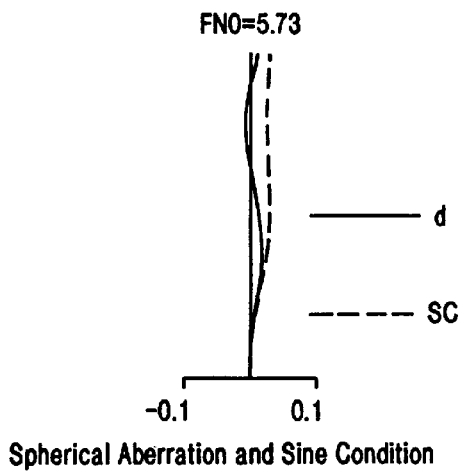
Figure 15H:
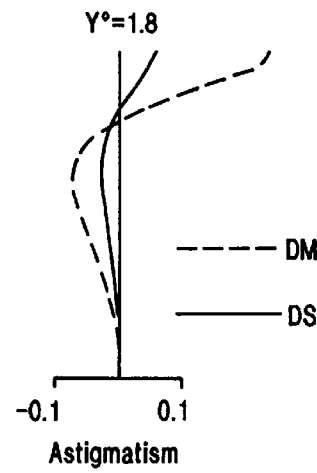
Figure 15I:
Figure 16A:
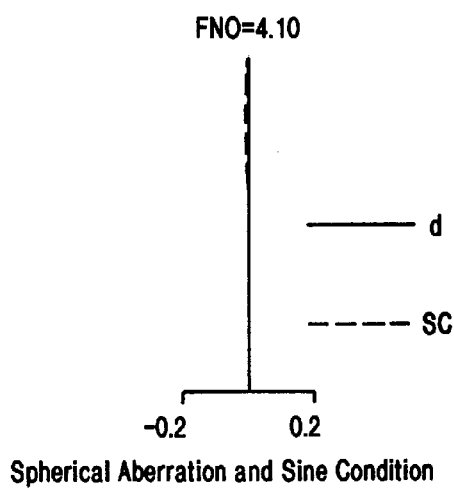
FIGS. 16(a)~(i) are aberration diagrams pertaining to the sixth embodiment (numerical value example 6)
Figure 16B:
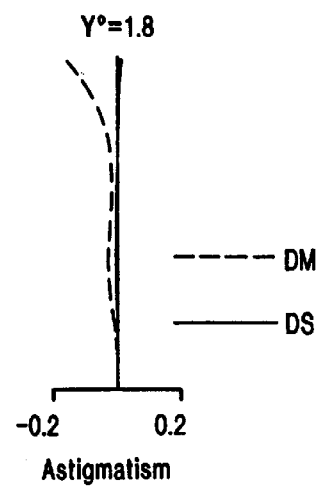
Figure 16C:
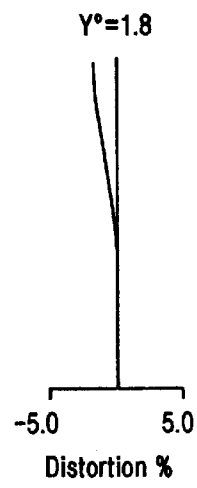
Figure 16D:
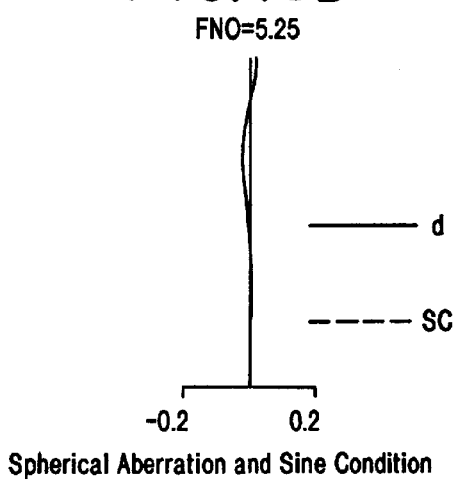
Figure 16E:
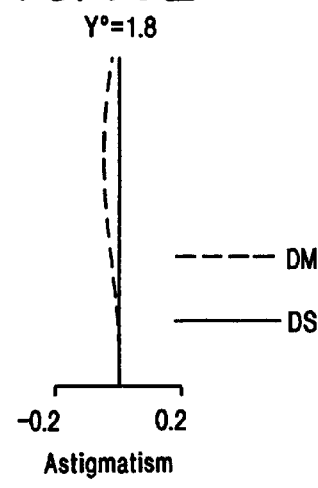
Figure 16F:
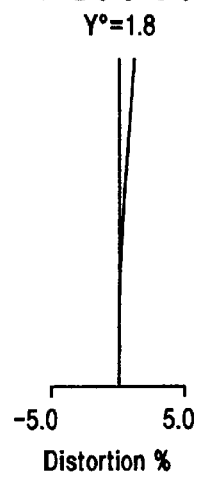
Figure 16G:
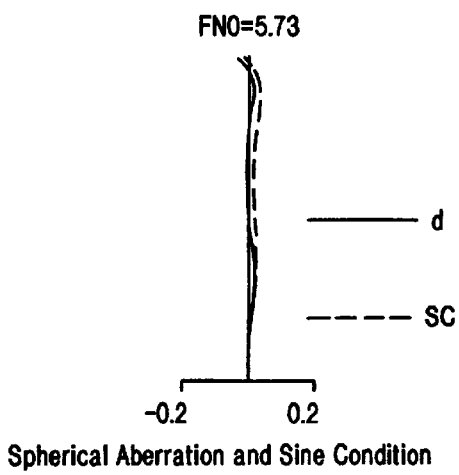
Figure 16H:
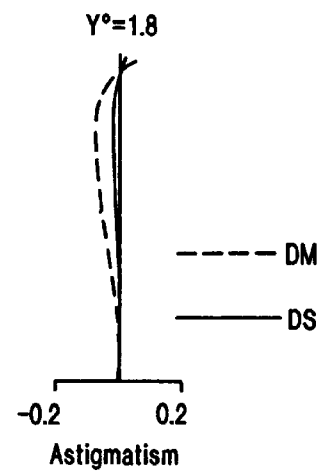
Figure 16I:
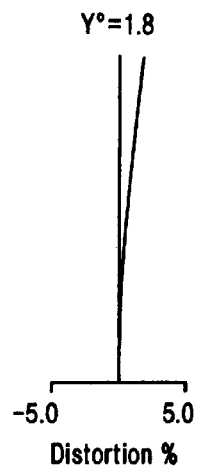
Figure 17A:
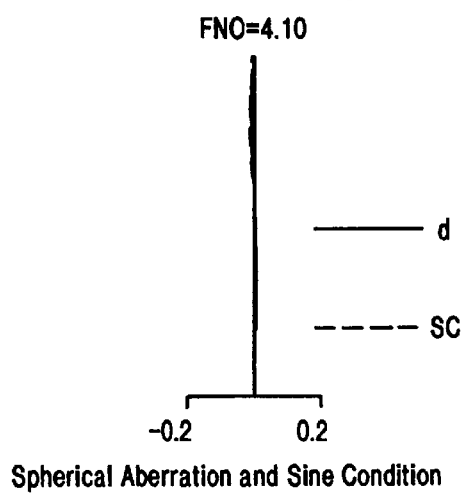
FIGS. 17(a)~(i) are aberration diagrams pertaining to the seventh embodiment (numerical value example 7)
Figure 17B:
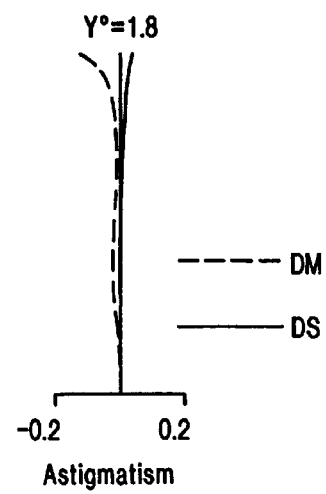
Figure 17C:
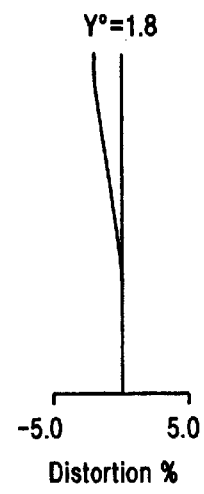
Figure 17D:
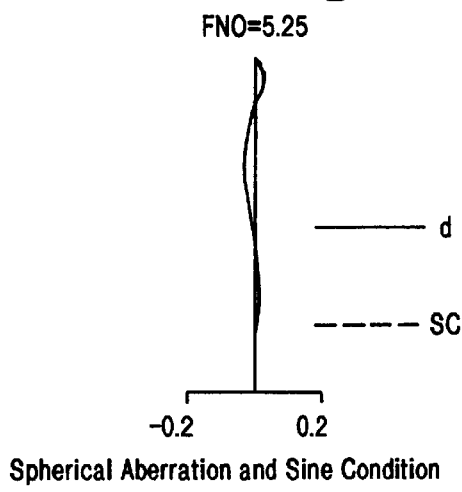
Figure 17E:
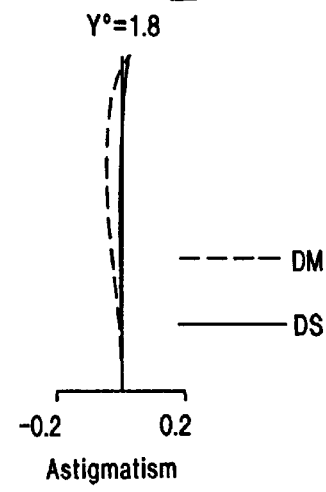
Figure 17F:
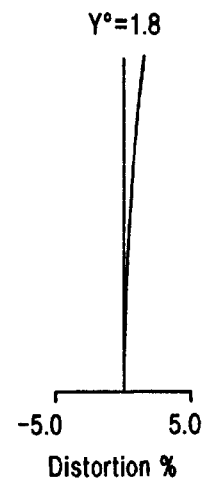
Figure 17G:
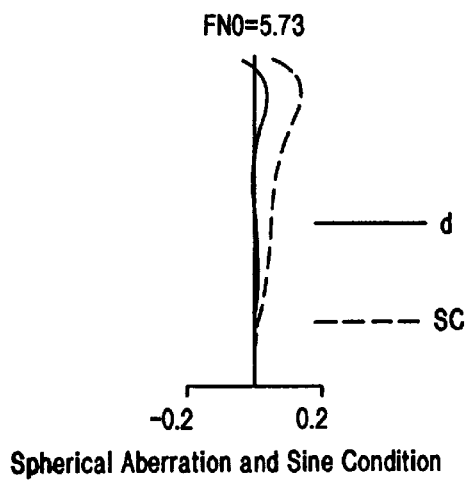
Figure 17H:
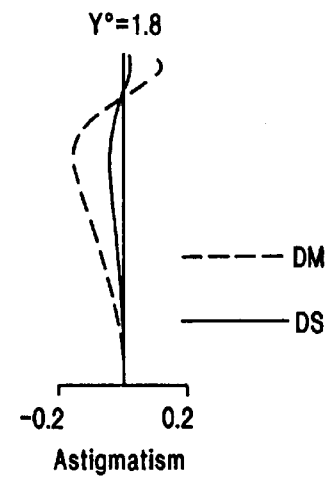
Figure 17I:
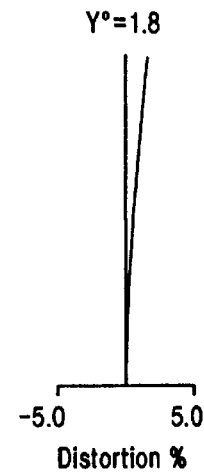
Figure 18A:
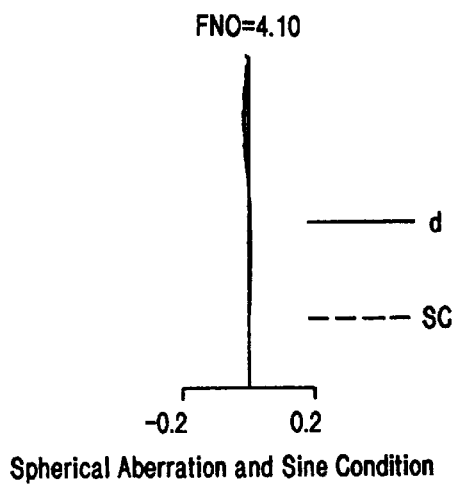
FIGS. 18(a)~(i) are aberration diagrams pertaining to the eighth embodiment (numerical value example 8)
Figure 18B:
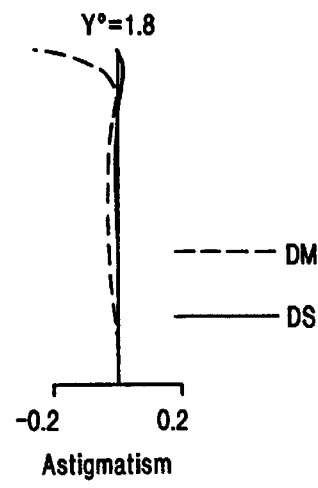
Figure 18C:
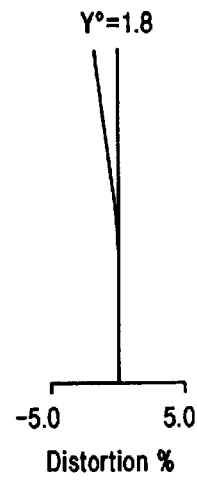
Figure 18D:
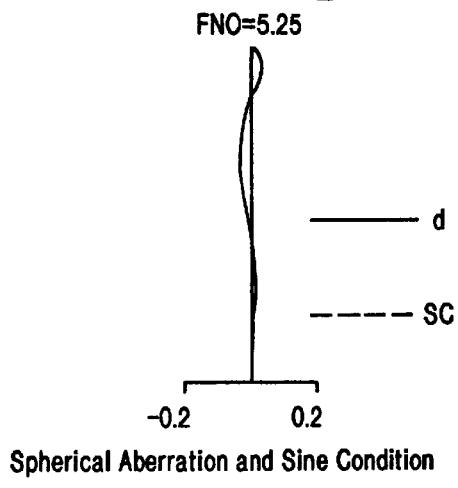
Figure 18E:
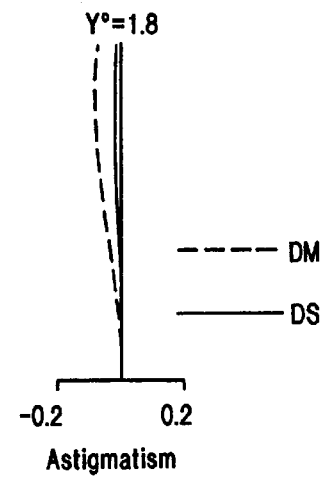
Figure 18F:
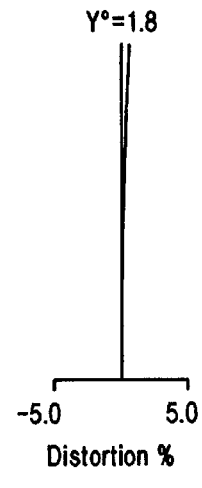
Figure 18G:
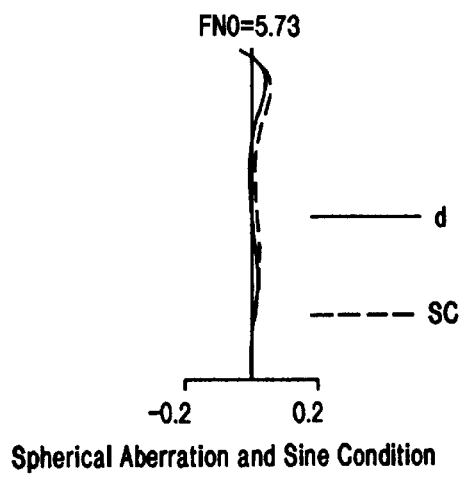
Figure 18H:
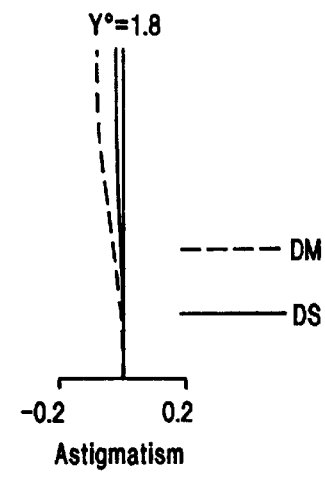
Figure 18I:
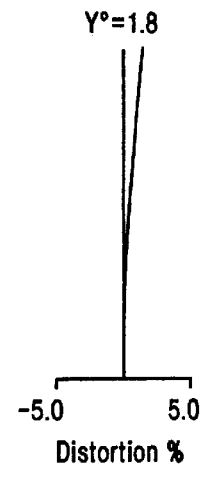
Figure 19A:
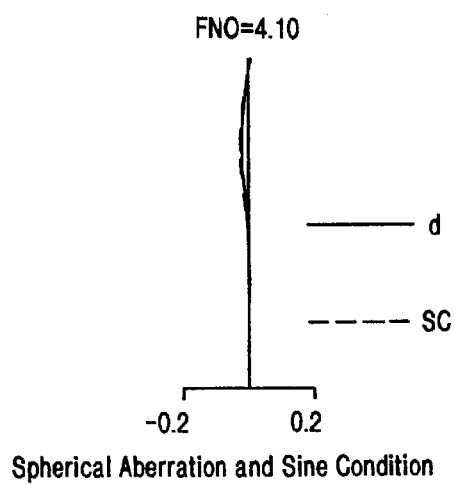
FIGS. 19(a)~(i) are aberration diagrams pertaining to the ninth embodiment (numerical value example 9)
Figure 19B:
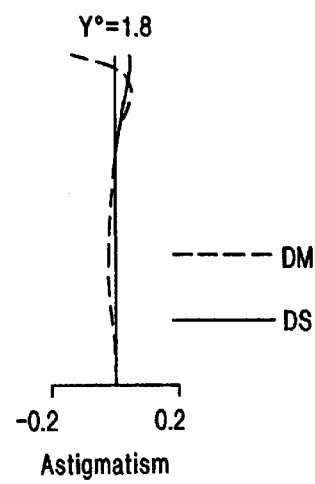
Figure 19C:
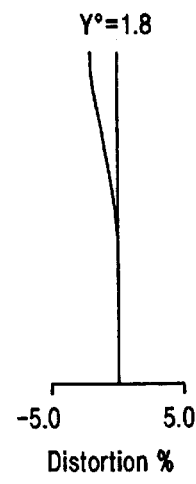
Figure 19D:
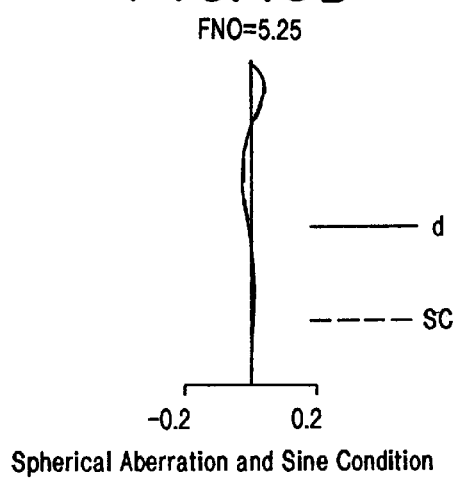
Figure 19E:
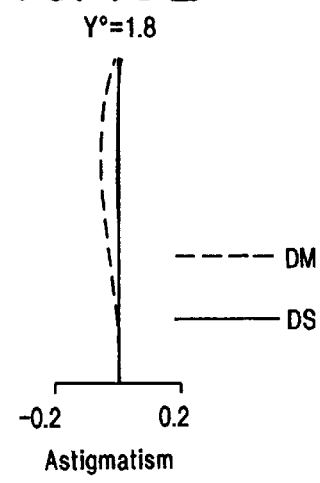
Figure 19F:
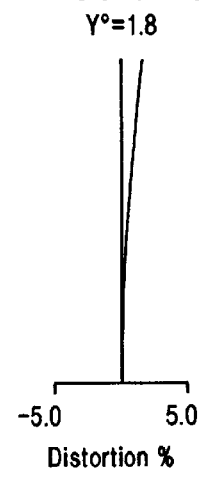
Figure 19G:
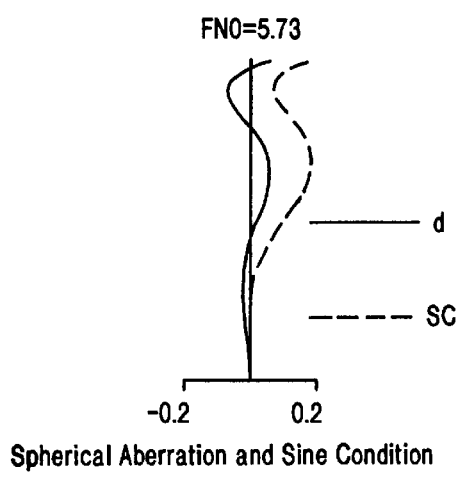
Figure 19H:
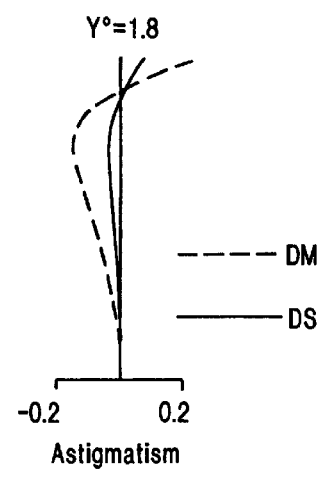
Figure 19I:
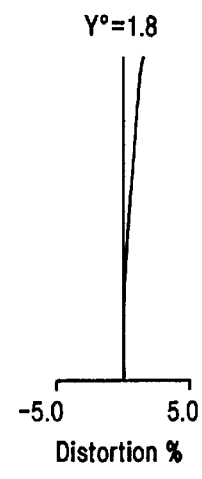
Figure 20A:
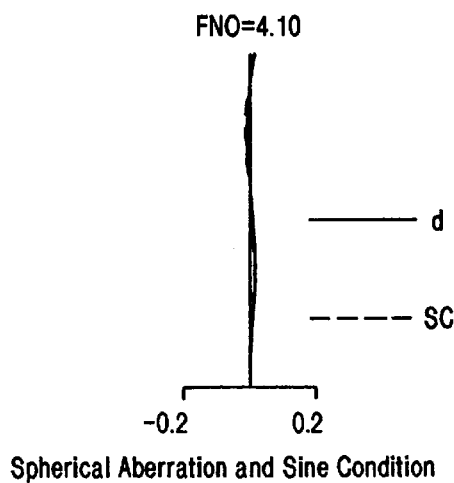
FIGS. 20(a)~(i) are aberration diagrams pertaining to the tenth embodiment (numerical value example 10).
Figure 20B:
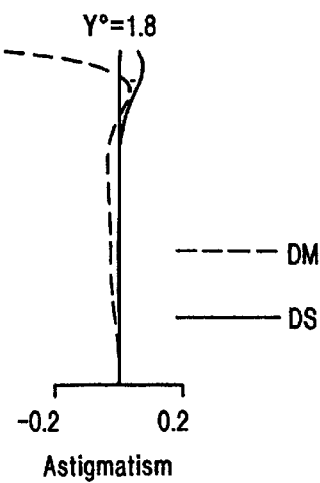
Figure 20C:
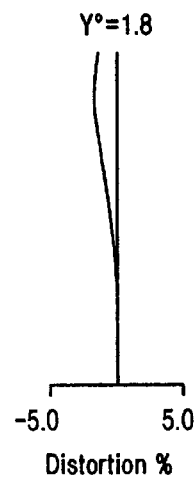
Figure 20D:
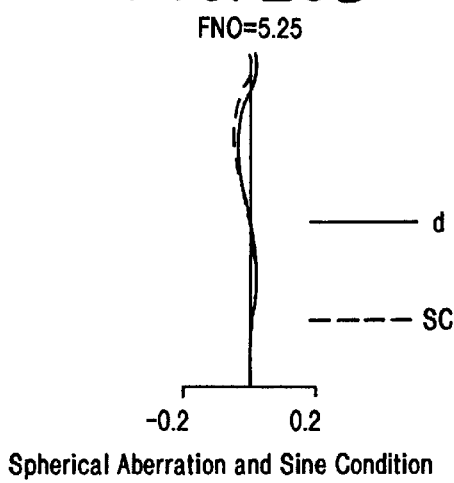
Figure 20E:
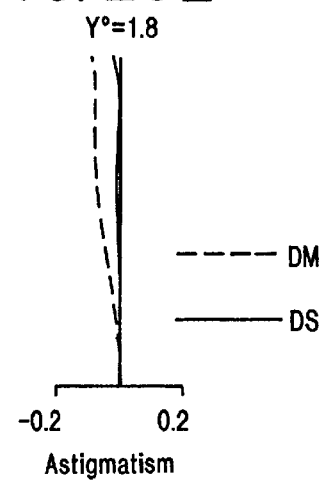
Figure 20F:
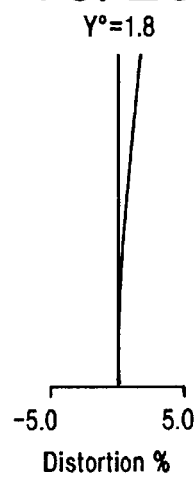
Figure 20G:
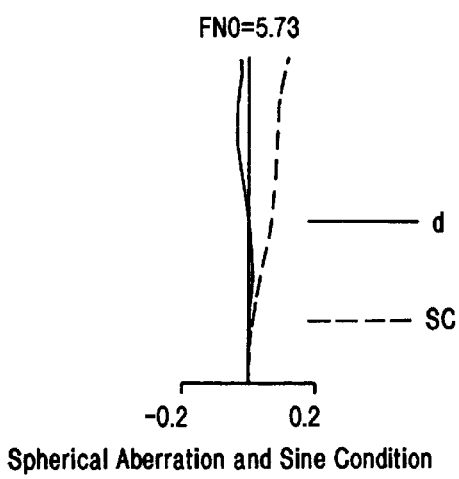
Figure 20H:
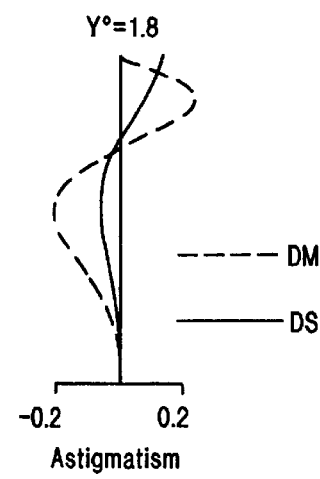
Figure 20I:
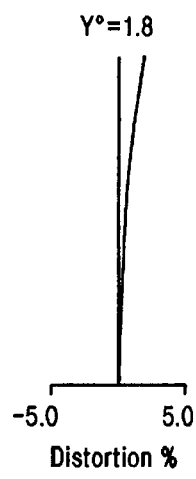

In the tenth embodiment shown in FIG. 10, the first lens unit Gr1 comprises sequentially from the object side a cemented lens element incorporating a negative meniscus lens element having a convex surface facing the object side, and a biconvex lens element having a strongly convex surface facing the object side. The second lens unit Gr2 comprises sequentially from the object side a negative meniscus lens element having a strongly concave surface facing the image side, and a positive meniscus lens element having a convex surface facing the image side. The third lens unit Gr3 comprises sequentially from the object side a biconvex lens element having a strongly convex surface facing the object side, and a biconcave lens element having a concave surface facing the image side.

The first lens unit Gr1 comprises a negative lens element and a positive lens element in the aforesaid embodiments. This arrangement is the minimum condition to obtain excellent correction of axial color aberration. The second lens unit Gr2 comprises a negative lens element and positive lens element. This arrangement is the minimum condition to obtain excellent correction of magnification color aberration. The third lens unit Gr3 is provided with a positive lens element having a strong curvature on the object side as the element nearest the object side. This arrangement provides excellent correction of spherical aberration by largely absorbing the scattered light flux entering the third lens unit Gr3 directly after entrance.

All of the embodiments in FIGS. 6–10 satisfy the conditional equation below:

$$0.2 < M1/Z < 3.0 \tag{6}$$

where M1 represents the amount of movement of the first lens unit Gr1 from the wide angle end to the telephoto end during zooming, Z represents the zoom ratio (fT/fW), fT represents the overall focal length of the system at the telephoto end, and fW represents the overall focal length of the system at the wide angle end.

Conditional equation (6) specifies the ratio of the zoom ratio and the amount of movement of the first lens unit Gr1 during zooming, and balances performance and the size of the optical system by controlling the amount of movement of the first lens unit Gr1 in accordance with the zoom ratio. When the upper limit of conditional equation (6) is exceeded, there is an excessive increase in the amount of movement of the first lens unit Gr1 relative to the zoom ratio, thereby increasing the overall length at the telephoto end as well as increasing the anterior lens element diameter.

When the lower limit of conditional equation (6) is exceeded, there is too little movement of the first lens unit Gr1 relative to the zoom ratio, thereby increasing the overall length at the wide angle end, such that it is necessary to increase the optical power of the first lens unit Gr1 to suppress said increase, which make it difficult to correct spherical aberration and axial color aberration at the telephoto end.

All embodiments shown in FIGS. 6–10 satisfy the conditional equation below:

$$4.0 < f1/fW < 10.0 \tag{7}$$

where f1 represents the focal length of the first lens unit Gr1, and fW represents the focal length of the overall system at the wide angle end.

Conditional equation (7) specifies the focal length of the first lens unit Gr1. When the lower limit of conditional equation (7) is exceeded, the focal length of the first lens unit Gr1 is excessively reduced, so as to make it difficult to correct magnification color aberration and spherical aberration at the telephoto end. When the upper limit of conditional equation (7) is exceeded, the focal length of the first lens unit Gr1 is excessively increased, so as to cause a loss of compactness at the telephoto end due to the excessive increase in the amount of movement of the first lens unit Gr1 during zooming.

It is desirable that the conditional equation below is satisfied:

$$-0.95 < f2/fW < -2.5 \tag{8}$$

where f2 represents the focal length of the second lens unit Gr2, and fW represents the focal length of the overall system at the wide angle end.

Conditional equation (8) relates to the second lens unit Gr2, and specifies the ratio of the focal length at the wide angle end and the focal length of the second lens unit Gr2. When the upper limit of conditional equation (8) is exceeded, the optical power of the second lens unit Gr2 is excessively reduced which is advantageous from a performance perspective, but it increases the overall length of the optical system as well as the amount of movement when zooming, and the lens element diameter is increased to assure sufficient peripheral light. As a result, the camera is enlarged overall, and the demand for compactness is not realized.

Conversely, when the lower limit of conditional equation (8) is exceeded, the optical power of the second lens unit Gr2 is excessively increased which is advantageous relative to compactness since the overall length and amount of movement when zooming is reduced, but various types of aberration are adversely influenced to marked effect. Negative aberration worsens with a marked movement of the image plane to the positive side as shown in the aberration diagrams.

Providing an aspherical surface in the second lens unit Gr2 is particularly effective in correcting aberration and image plane curvature. In this instance, at least one aspherical surface satisfies conditional equation (4) below:

$$-8 < (|X|-|Xo|)/Co(N'-N)f2 < 0.0 \tag{9}$$

where X represents the amount of displacement in the optical axis direction of the height Y of the effective optical path expressed by equation (c) below, Xo represents the displacement in the optical axis direction of the height Y of the effective optical path expressed by equation (d) below, Co represents the curvature of the spherical surface referenced to the aspherical surface, N' represents the refractive index on the image side of the aspherical surface, N represents the refractive index on the object side of the aspherical surface, and f2 represents the focal length of the second lens unit Gr2. Equations (c) and (d) are as follows:

$$X = Xo + \Sigma A j Y^j \tag{c}$$

$$Xo = CoY^2/\{1+(1-\epsilon Co^2 Y^2)^{1/2}\} \tag{d}$$

where Aj represents the aspherical surface coefficient of the j degree, and $\epsilon$ represents the curvature parameter of the second degree.

Conditional equation (9) specifies that the aspherical surface has a shape that weakens the negative optical power of the second lens unit Gr2. When the lower limit of conditional equation (9) is exceeded, the negative optical power is excessively weakened so as to increase the under fall of the image plane curvature at the wide angle end and positive distortion becomes pronounced. Conversely, when the upper limit of conditional equation (9) is exceeded, the weakening of negative optical power is effectively reduced so as to nullify the advantage of using an aspherical surface in the second lens unit Gr2, and produce an increase in the over fall of the image plane curvature at the wide angle end in aberration correction, with pronounced negative distortion.

Provision of an aspherical surface in the third lens unit Gr3 is particularly effective for spherical aberration. In this instance, at least one aspherical surface satisfies conditional equation (10) below:

$$-1.0 < (|X|-|Xo|)/Co(N'-N)f3 < 1.0 \tag{10}$$

where f3 represents the focal length of the third lens unit Gr3.

When the lower limit of conditional equation (10) is exceeded, positive optical power is excessively reduced at the margins so as to produce a marked over trend in spherical aberration. Conversely, when the upper limit is exceeded, positive optical power increases excessively at the margins so as to produce a marked under trend in spherical aberration.

Numerical Value Examples

The construction of the zoom lens system of the present invention is described in by way so specific examples hereinafter with reference to construction data and aberration diagrams. Examples 1~10 respectively correspond to the first through tenth embodiments, and the lens construction drawings (FIGS. 1~10) showing the mode of the first through tenth embodiments respectively correspond to the lens constructions of examples 1~10.

In the construction data of the various embodiments, ri (i=1,2,3 . . . ) represents the radius of curvature of the number i surface counting from the object side, di (i=1,2,3 . . . ) represents the axial distance of the number i surface counting from the object side, Ni (i=1,2,3 . . . ) represents the refraction index (Nd) on the d-line of the number i lens counting from the object side, and vi (i=1,2,3 . . . ) represents the Abbe number (vd) on the d-line of the number i lens counting from the object side. Surfaces having an asterisk (*) attached to the radius of curvature ri are constructed as aspherical surfaces, the shape of the aspherical surface being defined by conditional equations (4)~(9).

TABLE 1 f = 3.4~8.0~19.3
FNO = 4.1~4.9~5.8

| Radius of Curvature | | Axial Distance | | Refractive Index | | Abbe Number | |
|---|---|---|---|---|---|---|---|
| r1 = | 10.242 | | | | | | |
| | | d1 = | 0.550 | N1 = | 1.83350 | v1 = | 21.00 |
| r2 = | 7.030 | | | | | | |
| | | d2 = | 0.275 | | | | |
| r3 = | 7.438 | | | | | | |
| | | d3 = | 1.839 | N2 = | 1.77250 | v2 = | 49.77 |
| r4 = | 65.016 | | | | | | |
| | | d4 = | 0.800~4.864~8.554 | | | | |
| r5 = | 61.856 | | | | | | |
| | | d5 = | 0.600 | N3 = | 1.77250 | v3 = | 49.77 |
| r6 = | 2.127 | | | | | | |
| | | d6 = | 1.175 | | | | |
| r7* = | 46.311 | | | | | | |
| | | d7 = | 0.878 | N4 = | 1.83350 | v4 = | 21.00 |
| r8* = | −10.482 | | | | | | |
| | | d8 = | 6.461~3.604~0.900 | | | | |
| r9 = | ∞ (diaphagm A) | | | | | | |
| | | d9 = | 2.397~1.437~1.300 | | | | |
| r10 = | 2.115 | | | | | | |
| | | d10 = | 1.538 | N5 = | 1.48749 | v5 = | 70.44 |
| r11 = | −106.252 | | | | | | |
| | | d11 = | 0.801 | | | | |
| r12* = | −36.258 | | | | | | |
| | | d12 = | 0.500 | N6 = | 1.83350 | v6 = | 21.00 |
| r13* = | 9.906 | | | | | | |
| | | d13 = | 1.084~2.933~4.184 | | | | |
| r14 = | ∞ | | | | | | |
| | | d14 = | 4.200 | N7 = | 1.51680 | v7 = | 64.20 |
| r15 = | ∞ | | | | | | |

Aspherical Coefficient of $7^{th}$ Surface (r7)
$\epsilon = 1.0000$
$A4 = -0.13551 \times 10^{-2}$
$A6 = 0.44693 \times 10^{-2}$
$A8 = -0.50477 \times 10^{-2}$
$A10 = 0.23757 \times 10^{-3}$
$A12 = -0.34931 \times 10^{-3}$
Aspherical Coefficient of $8^{th}$ Surface (r8)
$\epsilon = 1.0000$
$A4 = -0.64755 \times 10^{-2}$
$A6 = 0.35527 \times 10^{-2}$
$A8 = -0.41239 \times 10^{-2}$
$A10 = 0.18282 \times 10^{-2}$
$A12 = -0.26989 \times 10^{-3}$
Aspherical Coefficient of $12^{th}$ Surface (r12)
$\epsilon = 1.0000$
$A4 = -0.53322 \times 10^{-1}$
$A6 = 0.41161 \times 10^{-2}$
$A8 = -0.84613 \times 10^{-2}$
$A10 = 0.47749 \times 10^{-2}$
$A12 = -0.10144 \times 10^{-2}$
Aspherical Coefficient of $13^{th}$ Surface (r13)
$\epsilon = 1.0000$
$A4 = -0.34433 \times 10^{-1}$
$A6 = 0.10406 \times 10^{-1}$
$A8 = -0.73665 \times 10^{-2}$
$A10 = 0.51159 \times 10^{-2}$
$A12 = -0.95123 \times 10^{-3}$
Value of Condition (4) for $7^{th}$ Surface (r7)
$y = 0.00 y max \ldots \{|x|-|x0|\}/\{C0 \cdot (N'-N) \cdot f2\} = 0.00000$
$y = 0.10 y max \ldots \{|x|-|x0|\}/\{C0 \cdot (N'-N) \cdot f2\} = 0.00001$
$y = 0.20 y max \ldots \{|x|-|x0|\}/\{C0 \cdot (N'-N) \cdot f2\} = 0.00012$
$y = 0.30 y max \ldots \{|x|-|x0|\}/\{C0 \cdot (N'-N) \cdot f2\} = 0.00040$
$y = 0.40 y max \ldots \{|x|-|x0|\}/\{C0 \cdot (N'-N) \cdot f2\} = 0.00058$
$y = 0.50 y max \ldots \{|x|-|x0|\}/\{C0 \cdot (N'-N) \cdot f2\} = 0.00022$
$y = 0.60 y max \ldots \{|x|-|x0|\}/\{C0 \cdot (N'-N) \cdot f2\} = -0.00068$
$y = 0.70 y max \ldots \{|x|-|x0|\}/\{C0 \cdot (N'-N) \cdot f2\} = -0.00199$
$y = 0.80 y max \ldots \{|x|-|x0|\}/\{C0 \cdot (N'-N) \cdot f2\} = -0.00685$
$y = 0.90 y max \ldots \{|x|-|x0|\}/\{C0 \cdot (N'-N) \cdot f2\} = -0.02958$
$y = 1.00 y max \ldots \{|x|-|x0|\}/\{C0 \cdot (N'-N) \cdot f2\} = -0.10175$
Value of Condition (4) for $8^{th}$ Surface (r8)
$y = 0.00 y max \ldots \{|x|-|x0|\}/\{C0 \cdot (N'-N) \cdot f2\} = -0.00000$
$y = 0.10 y max \ldots \{|x|-|x0|\}/\{C0 \cdot (N'-N) \cdot f2\} = -0.00001$
$y = 0.20 y max \ldots \{|x|-|x0|\}/\{C0 \cdot (N'-N) \cdot f2\} = -0.00017$
$y = 0.30 y max \ldots \{|x|-|x0|\}/\{C0 \cdot (N'-N) \cdot f2\} = -0.00083$
$y = 0.40 y max \ldots \{|x|-|x0|\}/\{C0 \cdot (N'-N) \cdot f2\} = -0.00251$
$y = 0.50 y max \ldots \{|x|-|x0|\}/\{C0 \cdot (N'-N) \cdot f2\} = -0.00595$
$y = 0.60 y max \ldots \{|x|-|x0|\}/\{C0 \cdot (N'-N) \cdot f2\} = -0.01226$
$y = 0.70 y max \ldots \{|x|-|x0|\}/\{C0 \cdot (N'-N) \cdot f2\} = -0.02302$
$y = 0.80 y max \ldots \{|x|-|x0|\}/\{C0 \cdot (N'-N) \cdot f2\} = -0.03992$
$y = 0.90 y max \ldots \{|x|-|x0|\}/\{C0 \cdot (N'-N) \cdot f2\} = -0.06390$
$y = 1.00 y max \ldots \{|x|-|x0|\}/\{C0 \cdot (N'-N) \cdot f2\} = -0.09467$
Value of Condition (5) for 12th Surface (r12)
$y = 0.00 y max \ldots \{|x|-|x0|\}/\{C0 \cdot (N'-N) \cdot f3\} = 0.00000$
$y = 0.10 y max \ldots \{|x|-|x0|\}/\{C0 \cdot (N'-N) \cdot f3\} = 0.00007$
$y = 0.20 y max \ldots \{|x|-|x0|\}/\{C0 \cdot (N'-N) \cdot f3\} = 0.00105$
$y = 0.30 y max \ldots \{|x|-|x0|\}/\{C0 \cdot (N'-N) \cdot f3\} = 0.00528$
$y = 0.40 y max \ldots \{|x|-|x0|\}/\{C0 \cdot (N'-N) \cdot f3\} = 0.01663$
$y = 0.50 y max \ldots \{|x|-|x0|\}/\{C0 \cdot (N'-N) \cdot f3\} = 0.04054$
$y = 0.60 y max \ldots \{|x|-|x0|\}/\{C0 \cdot (N'-N) \cdot f3\} = 0.08417$
$y = 0.70 y max \ldots \{|x|-|x0|\}/\{C0 \cdot (N'-N) \cdot f3\} = 0.15663$
$y = 0.80 y max \ldots \{|x|-|x0|\}/\{C0 \cdot (N'-N) \cdot f3\} = 0.26923$
$y = 0.90 y max \ldots \{|x|-|x0|\}/\{C0 \cdot (N'-N) \cdot f3\} = 0.43553$
$y = 1.00 y max \ldots \{|x|-|x0|\}/\{C0 \cdot (N'-N) \cdot f3\} = 0.67139$
Value of Condition (5) for $13^{th}$ Surface (r13)
$y = 0.00 y max \ldots \{|x|-|x0|\}/\{C0 \cdot (N'-N) \cdot f3\} = 0.00000$
$y = 0.10 y max \ldots \{|x|-|x0|\}/\{C0 \cdot (N'-N) \cdot f3\} = 0.00001$
$y = 0.20 y max \ldots \{|x|-|x0|\}/\{C0 \cdot (N'-N) \cdot f3\} = 0.00020$
$y = 0.30 y max \ldots \{|x|-|x0|\}/\{C0 \cdot (N'-N) \cdot f3\} = 0.00102$
$y = 0.40 y max \ldots \{|x|-|x0|\}/\{C0 \cdot (N'-N) \cdot f3\} = 0.00314$
$y = 0.50 y max \ldots \{|x|-|x0|\}/\{C0 \cdot (N'-N) \cdot f3\} = 0.00746$
$y = 0.60 y max \ldots \{|x|-|x0|\}/\{C0 \cdot (N'-N) \cdot f3\} = 0.01499$
$y = 0.70 y max \ldots \{|x|-|x0|\}/\{C0 \cdot (N'-N) \cdot f3\} = 0.02677$
$y = 0.80 y max \ldots \{|x|-|x0|\}/\{C0 \cdot (N'-N) \cdot f3\} = 0.04367$
$y = 0.90 y max \ldots \{|x|-|x0|\}/\{C0 \cdot (N'-N) \cdot f3\} = 0.06595$
$y = 1.00 y max \ldots \{|x|-|x0|\}/\{C0 \cdot (N'-N) \cdot f3\} = 0.09252$

TABLE 2 f = 3.4~9.3~25.6
FNO = 4.1~4.9~5.8

| Radius of Curvature | | Axial Distance | | Refractive Index | | Abbe Number | |
|---|---|---|---|---|---|---|---|
| r1 = | 15.570 | | | | | | |
| | | d1 = | 0.600 | N1 = | 1.83350 | v1 = | 21.00 |
| r2 = | 10.060 | | | | | | |
| | | d2 = | 0.238 | | | | |
| r3 = | 10.866 | | | | | | |
| | | d3 = | 2.314 | N2 = | 1.77250 | v2 = | 49.77 |
| r4 = | 271.014 | | | | | | |
| | | d4 = | 0.800~6.167~12.484 | | | | |
| r5 = | 23.516 | | | | | | |
| | | d5 = | 0.600 | N3 = | 1.77250 | v3 = | 49.77 |
| r6 = | 2.671 | | | | | | |
| | | d6 = | 0.884 | | | | |
| r7* = | 2.887 | | | | | | |
| | | d7 = | 1.106 | N4 = | 1.83350 | v4 = | 21.00 |
| r8* = | 2.886 | | | | | | |
| | | d8 = | 9.171~4.182~0.883 | | | | |

TABLE 2-continued $$f = 3.4 \sim 9.3 \sim 25.6$$
$$FNO = 4.1 \sim 4.9 \sim 5.8$$

| Radius of Curvature | Axial Distance | Refractive Index | Abbe Number |
|---|---|---|---|
| r9 = ∞ (diaphagm A) | | | |
| | d9 = 1.367 | | |
| r10 = 2.296 | | | |
| | d10 = 1.617 | N5 = 1.48749 | ν5 = 70.44 |
| r11 = 32.186 | | | |
| | d11 = 0.614 | | |
| r12* = 4.838 | | | |
| | d12 = 0.584 | N6 = 1.83350 | ν6 = 21.00 |
| r13* = 2.994 | | | |
| | d13 = 1.000~3.122~2.603 | | |
| r14 = ∞ | | | |
| | d14 = 4.200 | N7 = 1.51680 | ν7 = 64.20 |
| r15 = ∞ | | | |

Aspherical Coefficient of $7^{th}$ Surface (r7)
$\epsilon = 1.0000$
$A4 = -0.48772 \times 10^{-2}$
$A6 = -0.13966 \times 10^{-2}$
$A8 = 0.41820 \times 10^{-3}$
$A10 = -0.39409 \times 10^{-4}$
$A12 = -0.60915 \times 10^{-7}$
Aspherical Coefficient of $8^{th}$ Surface (r8)
$\epsilon = 1.0000$
$A4 = -0.10819 \times 10^{-1}$
$A6 = -0.23340 \times 10^{-2}$
$A8 = 0.15596 \times 10^{-2}$
$A10 = -0.34466 \times 10^{-3}$
$A12 = 0.24376 \times 10^{-4}$
Aspherical Coefficient of $12^{th}$ Surface (r12)
$\epsilon = 1.0000$
$A4 = -0.35114 \times 10^{-1}$
$A6 = -0.49822 \times 10^{-2}$
$A8 = -0.14583 \times 10^{-2}$
$A10 = 0.57363 \times 10^{-3}$
$A12 = -0.17545 \times 10^{-4}$
Aspherical Coefficient of $13^{th}$ Surface (r13)
$\epsilon = 1.0000$
$A4 = -0.28500 \times 10^{-1}$
$A6 = -0.43096 \times 10^{-2}$
$A8 = 0.12786 \times 10^{-2}$
$A10 = 0.17487 \times 10^{-3}$
$A12 = 0.25779 \times 10^{-3}$
Value of Condition (4) for $7^{th}$ Surface (r7)
y=0.00ymax ... $\{|x|-|x0|\}/\{C0 \cdot (N'-N) \cdot f2\} = 0.00000$
y=0.10ymax ... $\{|x|-|x0|\}/\{C0 \cdot (N'-N) \cdot f2\} = 0.00001$
y=0.20ymax ... $\{|x|-|x0|\}/\{C0 \cdot (N'-N) \cdot f2\} = 0.00023$
y=0.30ymax ... $\{|x|-|x0|\}/\{C0 \cdot (N'-N) \cdot f2\} = 0.00124$
y=0.40ymax ... $\{|x|-|x0|\}/\{C0 \cdot (N'-N) \cdot f2\} = 0.00416$
y=0.50ymax ... $\{|x|-|x0|\}/\{C0 \cdot (N'-N) \cdot f2\} = 0.01066$
y=0.60ymax ... $\{|x|-|x0|\}/\{C0 \cdot (N'-N) \cdot f2\} = -0.02278$
y=0.70ymax ... $\{|x|-|x0|\}/\{C0 \cdot (N'-N) \cdot f2\} = -0.04251$
y=0.80ymax ... $\{|x|-|x0|\}/\{C0 \cdot (N'-N) \cdot f2\} = -0.07193$
y=0.90ymax ... $\{|x|-|x0|\}/\{C0 \cdot (N'-N) \cdot f2\} = -0.11523$
y=1.00ymax ... $\{|x|-|x0|\}/\{C0 \cdot (N'-N) \cdot f2\} = -0.18545$
Value of Condition (4) for $8^{th}$ Surface (r8)
y=0.00ymax ... $\{|x|-|x0|\}/\{C0 \cdot (N'-N) \cdot f2\} = -0.00000$
y=0.10ymax ... $\{|x|-|x0|\}/\{C0 \cdot (N'-N) \cdot f2\} = -0.00002$
y=0.20ymax ... $\{|x|-|x0|\}/\{C0 \cdot (N'-N) \cdot f2\} = -0.00031$
y=0.30ymax ... $\{|x|-|x0|\}/\{C0 \cdot (N'-N) \cdot f2\} = -0.00163$
y=0.40ymax ... $\{|x|-|x0|\}/\{C0 \cdot (N'-N) \cdot f2\} = -0.00528$
y=0.50ymax ... $\{|x|-|x0|\}/\{C0 \cdot (N'-N) \cdot f2\} = -0.01300$
y=0.60ymax ... $\{|x|-|x0|\}/\{C0 \cdot (N'-N) \cdot f2\} = -0.02665$
y=0.70ymax ... $\{|x|-|x0|\}/\{C0 \cdot (N'-N) \cdot f2\} = -0.04804$
y=0.80ymax ... $\{|x|-|x0|\}/\{C0 \cdot (N'-N) \cdot f2\} = -0.07956$
y=0.90ymax ... $\{|x|-|x0|\}/\{C0 \cdot (N'-N) \cdot f2\} = -0.12585$
y=1.00ymax ... $\{|x|-|x0|\}/\{C0 \cdot (N'-N) \cdot f2\} = -0.19531$
Value of Condition (5) for $12^{th}$ Surface (r12)
y=0.00ymax ... $\{|x|-|x0|\}/\{C0 \cdot (N'-N) \cdot f3\} = 0.00000$
y=0.10ymax ... $\{|x|-|x0|\}/\{C0 \cdot (N'-N) \cdot f3\} = 0.00001$
y=0.20ymax ... $\{|x|-|x0|\}/\{C0 \cdot (N'-N) \cdot f3\} = 0.00017$
y=0.30ymax ... $\{|x|-|x0|\}/\{C0 \cdot (N'-N) \cdot f3\} = 0.00087$
y=0.40ymax ... $\{|x|-|x0|\}/\{C0 \cdot (N'-N) \cdot f3\} = 0.00279$
y=0.50ymax ... $\{|x|-|x0|\}/\{C0 \cdot (N'-N) \cdot f3\} = 0.00697$
y=0.60ymax ... $\{|x|-|x0|\}/\{C0 \cdot (N'-N) \cdot f3\} = 0.01489$
y=0.70ymax ... $\{|x|-|x0|\}/\{C0 \cdot (N'-N) \cdot f3\} = 0.02854$
y=0.80ymax ... $\{|x|-|x0|\}/\{C0 \cdot (N'-N) \cdot f3\} = 0.05060$
y=0.90ymax ... $\{|x|-|x0|\}/\{C0 \cdot (N'-N) \cdot f3\} = 0.08442$
y=1.00ymax ... $\{|x|-|x0|\}/\{C0 \cdot (N'-N) \cdot f3\} = 0.13405$
Value of Condition (5) for $13^{th}$ Surface (r13)
y=0.00ymax ... $\{|x|-|x0|\}/\{C0 \cdot (N'-N) \cdot f3\} = 0.00000$
y=0.10ymax ... $\{|x|-|x0|\}/\{C0 \cdot (N'-N) \cdot f3\} = 0.00000$
y=0.20ymax ... $\{|x|-|x0|\}/\{C0 \cdot (N'-N) \cdot f3\} = 0.00007$
y=0.30ymax ... $\{|x|-|x0|\}/\{C0 \cdot (N'-N) \cdot f3\} = 0.00037$
y=0.40ymax ... $\{|x|-|x0|\}/\{C0 \cdot (N'-N) \cdot f3\} = 0.00117$
y=0.50ymax ... $\{|x|-|x0|\}/\{C0 \cdot (N'-N) \cdot f3\} = 0.00291$
y=0.60ymax ... $\{|x|-|x0|\}/\{C0 \cdot (N'-N) \cdot f3\} = 0.00613$
y=0.70ymax ... $\{|x|-|x0|\}/\{C0 \cdot (N'-N) \cdot f3\} = 0.01152$
y=0.80ymax ... $\{|x|-|x0|\}/\{C0 \cdot (N'-N) \cdot f3\} = 0.01980$
y=0.90ymax ... $\{|x|-|x0|\}/\{C0 \cdot (N'-N) \cdot f3\} = 0.03157$
y=1.00ymax ... $\{|x|-|x0|\}/\{C0 \cdot (N'-N) \cdot f3\} = 0.04679$

TABLE 3

$$f = 2.4 \sim 5.6 \sim 13.5$$
$$FNO = 4.1 \sim 4.9 \sim 5.8$$

| Radius of Curvature | Axial Distance | Refractive Index | Abbe Number |
|---|---|---|---|
| r1 = 12.050 | | | |
| | d1 = 0.550 | N1 = 1.83350 | ν1 = 21.00 |
| r2 = 8.281 | | | |
| | d2 = 1.100 | | |
| r3 = 9.452 | | | |
| | d3 = 2.003 | N2 = 1.77250 | ν2 = 49.77 |
| r4 = 1013.161 | | | |
| | d4 = 0.800~5.326~9.166 | | |
| r5 = 50.122 | | | |
| | d5 = 0.600 | N3 = 1.77250 | ν3 = 49.77 |
| r6 = 1.865 | | | |
| | d6 = 1.663 | | |
| r7* = 5.658 | | | |
| | d7 = 0.848 | N4 = 1.83350 | ν4 = 21.00 |
| r8* = 4.823 | | | |
| | d8 = 5.758~0.900~0.900 | | |
| r9 = ∞ (diaphagm A) | | | |
| | d9 = 3.153~3.888~1.300 | | |
| r10 = 2.133 | | | |
| | d10 = 1.578 | N5 = 1.48749 | ν5 = 70.44 |
| r11 = 12.714 | | | |
| | d11 = 0.672 | | |
| r12* = 59.040 | | | |
| | d12 = 0.500 | N6 = 1.83350 | ν6 = 21.00 |
| r13* = 5.804 | | | |
| | d13 = 1.000~2.720~4.669 | | |
| r14 = ∞ | | | |
| | d14 = 4.200 | N7 = 1.51680 | ν7 = 64.20 |
| r15 = ∞ | | | |

Aspherical Coefficient of $7^{th}$ Surface (r7)
$\epsilon = 1.0000$
$A4 = -0.95052 \times 10^{-3}$
$A6 = 0.68934 \times 10^{-2}$
$A8 = -0.61552 \times 10^{-2}$
$A10 = 0.26096 \times 10^{-2}$
$A12 = -0.33565 \times 10^{-3}$
Aspherical Coefficient of $8^{th}$ Surface (r8)
$\epsilon = 1.0000$ A4=−0.60651×10$^{-2}$
A6=0.58394×10$^{-2}$
A8=−0.51960×10$^{-2}$
A10=0.19672×10$^{-2}$
A12=−0.25129×10$^{-3}$
Aspherical Coefficient of 12$^{th}$ Surface (r12)
ε=1.0000
A4=−0.59194×10$^{-1}$
A6=0.53292×10$^{-2}$
A8=−0.82241×10$^{-2}$
A10=0.37893×10$^{-2}$
A12=−0.10144×10$^{-2}$
Aspherical Coefficient of 13$^{th}$ Surface (r13)
ε=1.0000
A4=−0.42408×10$^{-1}$
A6=0.13116×10$^{-1}$
A8=−0.82396×10$^{-2}$
A10=0.46767×10$^{-2}$
A12=−0.95123×10$^{-3}$
Value of Condition (4) for 7$^{th}$ Surface (r7)
y=0.00ymax . . . {|x|−|x0|}/{C0·(N'−N)·f2}=0.00000
y=0.10ymax . . . {|x|−|x0|}/{C0·(N'−N)·f2}=0.00000
y=0.20ymax . . . {|x|−|x0|}/{C0·(N'−N)·f2}=0.00001
y=0.30ymax . . . {|x|−|x0|}/{C0·(N'−N)·f2}=−0.00004
y=0.40ymax . . . {|x|−|x0|}/{C0·(N'−N)·f2}=−0.00037
y=0.50ymax . . . {|x|−|x0|}/{C0·(N'−N)·f2}=−0.00138
y=0.60ymax . . . {|x|−|x0|}/{C0·(N'−N)·f2}=−0.00359
y=0.70ymax . . . {|x|−|x0|}/{C0·(N'−N)·f2}=−0.00786
y=0.80ymax . . . {|x|−|x0|}/{C0·(N'−N)·f2}=−0.01669
y=0.90ymax . . . {|x|−|x0|}/{C0·(N'−N)·f2}=−0.03690
y=1.00ymax . . . {|x|−|x0|}/{C0·(N'−N)·f2}=−0.08202
Value of Condition (4) for 8$^{th}$ Surface (r8)
y=0.00ymax . . . {|x|−|x0|}/{C0·(N'−N)·f2}=−0.00000
y=0.10ymax . . . {|x|−|x0|}/{C0·(N'−N)·f2}=−0.00001
y=0.20ymax . . . {|x|−|x0|}/{C0·(N'−N)·f2}=−0.00011
y=0.30ymax . . . {|x|−|x0|}/{C0·(N'−N)·f2}=−0.00052
y=0.40ymax . . . {|x|−|x0|}/{C0·(N'−N)·f2}=−0.00145
y=0.50ymax . . . {|x|−|x0|}/{C0·(N'−N)·f2}=−0.00320
y=0.60ymax . . . {|x|−|x0|}/{C0·(N'−N)·f2}=−0.00626
y=0.70ymax . . . {|x|−|x0|}/{C0·(N'−N)·f2}=−0.01139
y=0.80ymax . . . {|x|−|x0|}/{C0·(N'−N)·f2}=−0.01904
y=0.90ymax . . . {|x|−|x0|}/{C0·(N'−N)·f2}=−0.02818
y=1.00ymax . . . {|x|−|x0|}/{C0·(N'−N)·f2}=−0.03626
Value of Condition (5) for 12$^{th}$ Surface (r12)
y=0.00ymax . . . {|x|−|x0|}/{C0·(N'−N)·f3}=0.00000
y=0.10ymax . . . {|x|−|x0|}/{C0·(N'−N)·f3}=0.00013
y=0.20ymax . . . {|x|−|x0|}/{C0·(N'−N)·f3}=0.00206
y=0.30ymax . . . {|x|−|x0|}/{C0·(N'−N)·f3}=0.01040
y=0.40ymax . . . {|x|−|x0|}/{C0·(N'−N)·f3}=−0.01407
y=0.50ymax . . . {|x|−|x0|}/{C0·(N'−N)·f3}=0.00650
y=0.60ymax . . . {|x|−|x0|}/{C0·(N'−N)·f3}=0.05963
y=0.70ymax . . . {|x|−|x0|}/{C0·(N'−N)·f3}=0.16296
y=0.80ymax . . . {|x|−|x0|}/{C0·(N'−N)·f3}=0.33888
y=0.90ymax . . . {|x|−|x0|}/{C0·(N'−N)·f3}=0.61605
y=1.00ymax . . . {|x|−|x0|}/{C0·(N'−N)·f3}=1.03241
Value of Condition (5) for 13$^{th}$ Surface (r13)
y=0.00ymax . . . {|x|−|x0|}/{C0·(N'−N)·f3}=−0.00000
y=0.10ymax . . . {|x|−|x0|}/{C0·(N'−N)·f3}=0.00001
y=0.20ymax . . . {|x|−|x0|}/{C0·(N'−N)·f3}=0.00016
y=0.30ymax . . . {|x|−|x0|}/{C0·(N'−N)·f3}=0.00078
y=0.40ymax . . . {|x|−|x0|}/{C0·(N'−N)·f3}=0.00240
y=0.50ymax . . . {|x|−|x0|}/{C0·(N'−N)·f3}=0.00568
y=0.60ymax . . . {|x|−|x0|}/{C0·(N'−N)·f3}=0.01141
y=0.70ymax . . . {|x|−|x0|}/{C0·(N'−N)·f3}=0.02040
y=0.80ymax . . . {|x|−|x0|}/{C0·(N'−N)·f3}=0.03346
y=0.90ymax . . . {|x|−|x0|}/{C0·(N'−N)·f3}=0.05122
y=1.00ymax . . . {|x|−|x0|}/{C0·(N'−N)·f3}=0.07396

TABLE 4 f = 3.4~8.0~19.3
FNO = 4.1~4.9~5.8

| | Radius of Curvature | Axial Distance | Refractive Index | Abbe Number |
|---|---|---|---|---|
| r1 = | 10.632 | | | |
| | | d1 = 0.550 | N1 = 1.83350 | ν1 = 21.00 |
| r2 = | 7.201 | | | |
| | | d2 = 0.892 | | |
| r3 = | 7.857 | | | |
| | | d3 = 1.937 | N2 = 1.77250 | ν2 = 49.77 |
| r4 = | 77.655 | | | |
| | | d4 = 0.800~4.984~10.083 | | |
| r5 = | 153.589 | | | |
| | | d5 = 0.600 | N3 = 1.77250 | ν3 = 49.77 |
| r6 = | 2.190 | | | |
| | | d6 = 1.147 | | |
| r7* = | 7.510 | | | |
| | | d7 = 0.916 | N4 = 1.83350 | ν4 = 21.00 |
| r8* = | 18.393 | | | |
| | | d8 = 6.888~2.285~0.900 | | |
| r9 = | ∞ (diaphagm A) | | | |
| | | d9 = 1.568~2.341~1.300 | | |
| r10 = | 2.353 | | | |
| | | d10 = 1.730 | N5 = 1.48749 | ν5 = 70.44 |
| r11 = | 10.915 | | | |
| | | d11 = 0.673 | | |
| r12* = | 15.290 | | | |
| | | d12 = 0.615 | N6 = 1.83350 | ν6 = 21.00 |
| r13* = | 4.896 | | | |
| | | d13 = 1.163~2.910~2.335 | | |
| r14 = | ∞ | | | |
| | | d14 = 4.200 | N7 = 1.51680 | ν7 = 64.20 |
| r15 = | ∞ | | | |

Aspherical Coefficient of 7$^{th}$ Surface (r7)
ε=1.0000
A4=0.24004×10$^{-2}$
A6=−0.11554×10$^{-2}$
A8=0.83042×10$^{-3}$
A10=0.62446×10$^{-4}$
A12=−0.20248×10$^{-4}$
Aspherical Coefficient of 8$^{th}$ Surface (r8)
ε=1.0000
A4=−0.30186×10$^{-2}$
A6=−0.71783×10$^{-3}$
A8=0.57385×10$^{-3}$
A10=0.11743×10$^{-3}$
A12=−0.24479×10$^{-4}$
Aspherical Coefficient of 12$^{th}$ Surface (r12)
ε=1.0000
A4=−0.41599×10$^{-1}$
A6=0.40957×10$^{-2}$
A8=−0.28086×10$^{-3}$
A10=0.26307×10$^{-4}$
A12=−0.10389×10$^{-3}$
Aspherical Coefficient of 13$^{th}$ Surface (r13)
ε=1.0000
A4=−0.32188×10$^{-1}$
A6=0.12557×10$^{-3}$
A8=0.13471×10$^{-2}$
A10=−0.17388×10$^{-4}$
A12=−0.25972×10$^{-4}$
Value of Condition (4) for 7$^{th}$ Surface (r7)
y=0.00ymax . . . {|x|−|x0|}/{C0·(N'−N)·f2}=0.00000
y=0.10ymax . . . {|x|−|x0|}/{C0·(N'−N)·f2}=0.00000
y=0.20ymax . . . {|x|−|x0|}/{C0·(N'−N)·f2}=0.00006
y=0.30ymax . . . {|x|−|x0|}/{C0·(N'−N)·f2}=−0.00029
y=0.40ymax . . . {|x|−|x0|}/{C0·(N'−N)·f2}=−0.00089
y=0.50ymax . . . {|x|−|x0|}/{C0·(N'−N)·f2}=−0.00211 y=0.60ymax ... {|x|−|x0|}/{C0·(N'−N)·f2}=−0.00456
y=0.70ymax ... {|x|−|x0|}/{C0·(N'−N)·f2}=−0.00965
y=0.80ymax ... {|x|−|x0|}/{C0·(N'−N)·f2}=−0.02060
y=0.90ymax ... {|x|−|x0|}/{C0·(N'−N)·f2}=−0.04391
y=1.00ymax ... {|x|−|x0|}/{C0·(N'−N)·f2}=−0.09088
Value of Condition (4) for $8^{th}$ Surface (r8)
y=0.00ymax ... {|x|−|x0|}/{C0·(N'−N)·f2}=−0.00000
y=0.10ymax ... {|x|−|x0|}/{C0·(N'−N)·f2}=−0.00001
y=0.20ymax ... {|x|−|x0|}/{C0·(N'−N)·f2}=−0.00014
y=0.30ymax ... {|x|−|x0|}/{C0·(N'−N)·f2}=−0.00074
y=0.40ymax ... {|x|−|x0|}/{C0·(N'−N)·f2}=−0.00237
y=0.50ymax ... {|x|−|x0|}/{C0·(N'−N)·f2}=−0.00584
y=0.60ymax ... {|x|−|x0|}/{C0·(N'−N)·f2}=−0.01192
y=0.00ymax ... {|x|−|x0|}/{C0·(N'−N)·f2}=−0.02084
y=0.80ymax ... {|x|−|x0|}/{C0·(N'−N)·f2}=−0.03110
y=0.90ymax ... {|x|−|x0|}/{C0·(N'−N)·f2}=−0.03769
y=1.00ymax ... {|x|−|x0|}/{C0·(N'−N)·f2}=−0.02954
Value of Condition (5) for $12^{th}$ Surface (r12)
y=0.00ymax ... {|x|−|x0|}/{C0·(N'−N)·f3}=−0.00000
y=0.10ymax ... {|x|−|x0|}/{C0·(N'−N)·f3}=−0.00004
y=0.20ymax ... {|x|−|x0|}/{C0·(N'−N)·f3}=−0.00068
y=0.30ymax ... {|x|−|x0|}/{C0·(N'−N)·f3}=−0.00346
y=0.40ymax ... {|x|−|x0|}/{C0·(N'−N)·f3}=−0.01106
y=0.50ymax ... {|x|−|x0|}/{C0·(N'−N)·f3}=−0.02738
y=0.60ymax ... {|x|−|x0|}/{C0·(N'−N)·f3}=−0.05774
y=0.70ymax ... {|x|−|x0|}/{C0·(N'−N)·f3}=−0.08017
y=0.80ymax ... {|x|−|x0|}/{C0·(N'−N)·f3}=0.05689
y=0.90ymax ... {|x|−|x0|}/{C0·(N'−N)·f3}=0.00028
y=1.00ymax ... {|x|−|x0|}/{C0·(N'−N)·f3}=0.10736
Value of Condition (5) for $13^{th}$ Surface (r13)
y=0.00ymax ... {|x|−|x0|}/{C0·(N'−N)·f3}=−0.00000
y=0.10ymax ... {|x|−|x0|}/{C0·(N'−N)·f3}=0.00001
y=0.20ymax ... {|x|−|x0|}/{C0·(N'−N)·f3}=0.00017
y=0.30ymax ... {|x|−|x0|}/{C0·(N'−N)·f3}=0.00087
y=0.40ymax ... {|x|−|x0|}/{C0·(N'−N)·f3}=0.00274
y=0.50ymax ... {|x|−|x0|}/{C0·(N'−N)·f3}=0.00666
y=0.60ymax ... {|x|−|x0|}/{C0·(N'−N)·f3}=0.01368
y=0.70ymax ... {|x|−|x0|}/{C0·(N'−N)·f3}=0.02496
y=0.80ymax ... {|x|−|x0|}/{C0·(N'−N)·f3}=0.04165
y=0.90ymax ... {|x|−|x0|}/{C0·(N'−N)·f3}=0.06462
y=1.00ymax ... {|x|−|x0|}/{C0·(N'−N)·f3}=0.09426

TABLE 5 f = 3.3~9.3~26.4
FNO = 4.1~5.3~5.7

| Radius of Curvature | Axial Distance | Refractive Index | Abbe Number |
|---|---|---|---|
| r1 = 15.691 | | | |
| | d1 = 0.600 | N1 = 1.80741 | v1 = 31.59 |
| r2 = 7.793 | | | |
| | d2 = 2.356 | N2 = 1.72000 | v2 = 50.31 |
| r3 = 139.225 | | | |
| | d3 = 1.174~8.043~15.461 | | |
| r4* = 26.981 | | | |
| | d4 = 0.800 | N3 = 1.85000 | v3 = 40.04 |
| r5* = 2.211 | | | |
| | d5 = 0.821 | | |
| r6 = 4.278 | | | |
| | d6 = 1.200 | N4 = 1.79850 | v4 = 22.60 |
| r7 = 18.204 | | | |
| | d7 = 8.298~3.306~0.501 | | |
| r8 = ∞ (diaphagm A) | | | |
| | d8 = 0.400 | | |
| r9* = 1.906 | | | |
| | d9 = 1.507 | N5 = 1.48749 | v5 = 70.44 |
| r10 = 5.709 | | | |
| | d10 = 0.100 | | |
| r11* = 6.666 | | | |
| | d11 = 0.434 | N6 = 1.80741 | v6 = 31.59 |

TABLE 5-continued f = 3.3~9.3~26.4
FNO = 4.1~5.3~5.7

| Radius of Curvature | Axial Distance | Refractive Index | Abbe Number |
|---|---|---|---|
| r12* = 10.675 | | | |
| | d12 = 1.000~3.698~5.510 | | |
| r13 = ∞ | | | |
| | d13 = 4.000 | N7 = 1.51680 | v7 = 64.20 |
| r14 = ∞ | | | |

Aspherical Coefficient of $4^{th}$ Surface (r4)
$\epsilon$=1.0000
A4=−0.58808×10⁻³
A6=−0.74948×10⁻⁴
A8=0.53484×10⁻⁴
A10=−0.10135×10⁻⁴
A12=0.79335×10⁻⁶
Aspherical Coefficient of $5^{th}$ Surface (r5)
$\epsilon$=1.0000
A4=−0.10663×10⁻¹
A6=−0.24982×10⁻³
A8=0.72750×10⁻³
A10=0.17883×10⁻³
A12=−0.33604×10⁻⁴
Aspherical Coefficient of $9^{th}$ Surface (r9)
$\epsilon$=1.0000
A4=−0.45550×10⁻²
A6=0.39537×10⁻²
A8=−0.50067×10⁻²
A10=0.24452×10⁻²
A12=−0.48225×10⁻³
Aspherical Coefficient of $11^{th}$ Surface (r11)
$\epsilon$=1.0000
A4=0.14594×10⁻¹
A6=−0.66500×10⁻³
A8=−0.28663×10⁻²
A10=0.89083×10⁻³
A12=−0.18308×10⁻³
Aspherical Coefficient of $12^{th}$ Surface (r12)
$\epsilon$=1.0000
A4=0.38047×10⁻¹
A6=0.90521×10⁻²
A8=−0.33435×10⁻²
A10=0.16028×10⁻²
A12=0.52665×10⁻³
Value of Condition (4) for $4^{th}$ Surface (r4)
y=0.00ymax ... {|x|−|x0|}/{C0·(N'−N)·f2}=0.00000
y=0.10ymax ... {|x|−|x0|}/{C0·(N'−N)·f2}=0.00001
y=0.20ymax ... {|x|−|x0|}/{C0·(N'−N)·f2}=0.00017
y=0.30ymax ... {|x|−|x0|}/{C0·(N'−N)·f2}=−0.00085
y=0.40ymax ... {|x|−|x0|}/{C0·(N'−N)·f2}=−0.00272
y=0.50ymax ... {|x|−|x0|}/{C0·(N'−N)·f2}=−0.00662
y=0.60ymax ... {|x|−|x0|}/{C0·(N'−N)·f2}=−0.01341
y=0.70ymax ... {|x|−|x0|}/{C0·(N'−N)·f2}=−0.02371
y=0.80ymax ... {|x|−|x0|}/{C0·(N'−N)·f2}=−0.03764
y=0.90ymax ... {|x|−|x0|}/{C0·(N'−N)·f2}=−0.05443
y=1.00ymax ... {|x|−|x0|}/{C0·(N'−N)·f2}=−0.07069
Value of Condition (4) for $5^{th}$ Surface (r5)
y=0.00ymax ... {|x|−|x0|}/{C0·(N'−N)·f2}=0.00000
y=0.10ymax ... {|x|−|x0|}/{C0·(N'−N)·f2}=−0.00001
y=0.20ymax ... {|x|−|x0|}/{C0·(N'−N)·f2}=−0.00012
y=0.30ymax ... {|x|−|x0|}/{C0·(N'−N)·f2}=−0.00059
y=0.40ymax ... {|x|−|x0|}/{C0·(N'−N)·f2}=−0.00189
y=0.50ymax ... {|x|−|x0|}/{C0·(N'−N)·f2}=−0.00476
y=0.60ymax ... {|x|−|x0|}/{C0·(N'−N)·f2}=−0.01029 y=0.70ymax ... $\{|x|-|x0|\}/\{C0\cdot(N'-N)\cdot f2\}=-0.02020$
y=0.80ymax ... $\{|x|-|x0|\}/\{C0\cdot(N'-N)\cdot f2\}=-0.03722$
y=0.90ymax ... $\{|x|-|x0|\}/\{C0\cdot(N'-N)\cdot f2\}=-0.06606$
y=1.00ymax ... $\{|x|-|x0|\}/\{C0\cdot(N'-N)\cdot f2\}=-0.11567$
Value of Condition (5) for $9^{th}$ Surface (r9)
y=0.00ymax ... $\{|x|-|x0|\}/\{C0\cdot(N'-N)\cdot f3\}=0.00000$
y=0.10ymax ... $\{|x|-|x0|\}/\{C0\cdot(N'-N)\cdot f3\}=-0.00000$
y=0.20ymax ... $\{|x|-|x0|\}/\{C0\cdot(N'-N)\cdot f3\}=-0.00001$
y=0.30ymax ... $\{|x|-|x0|\}/\{C0\cdot(N'-N)\cdot f3\}=-0.00007$
y=0.40ymax ... $\{|x|-|x0|\}/\{C0\cdot(N'-N)\cdot f3\}=-0.00020$
y=0.50ymax ... $\{|x|-|x0|\}/\{C0\cdot(N'-N)\cdot f3\}=-0.00047$
y=0.60ymax ... $\{|x|-|x0|\}/\{C0\cdot(N'-N)\cdot f3\}=-0.00095$
y=0.70ymax ... $\{|x|-|x0|\}/\{C0\cdot(N'-N)\cdot f3\}=-0.00178$
y=0.80ymax ... $\{|x|-|x0|\}/\{C0\cdot(N'-N)\cdot f3\}=-0.00317$
y=0.90ymax ... $\{|x|-|x0|\}/\{C0\cdot(N'-N)\cdot f3\}=-0.00542$
y=1.00ymax ... $\{|x|-|x0|\}/\{C0\cdot(N'-N)\cdot f3\}=-0.00903$
Value of Condition (5) for $11^{th}$ Surface (r11)
y=0.00ymax ... $\{|x|-|x0|\}/\{C0\cdot(N'-N)\cdot f3\}=-0.00000$
y=0.10ymax ... $\{|x|-|x0|\}/\{C0\cdot(N'-N)\cdot f3\}=0.00000$
y=0.20ymax ... $\{|x|-|x0|\}/\{C0\cdot(N'-N)\cdot f3\}=0.00005$
y=0.30ymax ... $\{|x|-|x0|\}/\{C0\cdot(N'-N)\cdot f3\}=0.00024$
y=0.00ymax ... $\{|x|-|x0|\}/\{C0\cdot(N'-N)\cdot f3\}=0.00076$
y=0.50ymax ... $\{|x|-|x0|\}/\{C0\cdot(N'-N)\cdot f3\}=0.00183$
y=0.60ymax ... $\{|x|-|x0|\}/\{C0\cdot(N'-N)\cdot f3\}=0.00371$
y=0.70ymax ... $\{|x|-|x0|\}/\{C0\cdot(N'-N)\cdot f3\}=0.00665$
y=0.80ymax ... $\{|x|-|x0|\}/\{C0\cdot(N'-N)\cdot f3\}=0.01083$
y=0.90ymax ... $\{|x|-|x0|\}/\{C0\cdot(N'-N)\cdot f3\}=0.01627$
y=1.00ymax ... $\{|x|-|x0|\}/\{C0\cdot(N'-N)\cdot f3\}=0.02269$
Value of Condition (5) for $12^{th}$ Surface (r12)
y=0.00ymax ... $\{|x|-|x0|\}/\{C0\cdot(N'-N)\cdot f3\}=-0.00000$
y=0.10ymax ... $\{|x|-|x0|\}/\{C0\cdot(N'-N)\cdot f3\}=0.00001$
y=0.20ymax ... $\{|x|-|x0|\}/\{C0\cdot(N'-N)\cdot f3\}=0.00015$
y=0.30ymax ... $\{|x|-|x0|\}/\{C0\cdot(N'-N)\cdot f3\}=0.00076$
y=0.40ymax ... $\{|x|-|x0|\}/\{C0\cdot(N'-N)\cdot f3\}=0.00245$
y=0.50ymax ... $\{|x|-|x0|\}/\{C0\cdot(N'-N)\cdot f3\}=0.00609$
y=0.60ymax ... $\{|x|-|x0|\}/\{C0\cdot(N'-N)\cdot f3\}=0.01290$
y=0.70ymax ... $\{|x|-|x0|\}/\{C0\cdot(N'-N)\cdot f3\}=0.02444$
y=0.80ymax ... $\{|x|-|x0|\}/\{C0\cdot(N'-N)\cdot f3\}=0.04277$
y=0.90ymax ... $\{|x|-|x0|\}/\{C0\cdot(N'-N)\cdot f3\}=0.07056$
y=1.00ymax ... $\{|x|-|x0|\}/\{C0\cdot(N'-N)\cdot f3\}=0.11148$

TABLE 6 f = 3.3~8.0~19.8
FNO = 4.1~5.25~5.73

| Radius of Curvature | Axial Distance | Refractive Index | Abbe Number |
|---|---|---|---|
| r1 = 11.310 | | | |
| | d1 = 0.600 | N1 = 1.84666 | v1 = 23.82 |
| r2 = 7.193 | | | |
| | d2 = 3.500 | N2 = 1.58267 | v2 = 46.43 |
| r3 = 275.037 | | | |
| | d3 = 1.174~2.898~10.969 | | |
| r4* = 12.399 | | | |
| | d4 = 0.500 | N3 = 1.80420 | v3 = 46.50 |
| r5* = 2.023 | | | |
| | d5 = 1.000 | | |
| r6 = 4.407 | | | |
| | d6 = 1.200 | N4 = 1.79850 | v4 = 22.60 |
| r7 = 13.816 | | | |
| | d7 = 5.567~1.804~0.500 | | |
| r8 = ∞ (diaphagm A) | | | |
| | d8 = 0.400 | | |
| r9* = 1.987 | | | |
| | d9 = 1.340 | N5 = 1.48749 | v5 = 70.44 |
| r10 = 7.040 | | | |
| | d10 = 0.130 | | |
| r11* = 47.462 | | | |
| | d11 = 0.800 | N6 = 1.84666 | v6 = 23.82 |
| r12* = 5.237 | | | |
| | d12 = 1.500~5.263~6.567 | | |

TABLE 6-continued f = 3.3~8.0~19.8
FNO = 4.1~5.25~5.73

| Radius of Curvature | Axial Distance | Refractive Index | Abbe Number |
|---|---|---|---|
| r13 = ∞ | | | |
| | d13 = 4.000 | N7 = 1.51680 | v7 = 64.20 |
| r14 = ∞ | | | |
| | Σd = 21.711~23.435~31.506 | | |

Aspherical Coefficient of $4^{th}$ Surface (r4)
$\epsilon=1.0000$
$A4=0.43211\times10^{-2}$
$A6=-0.26499\times10^{-2}$
$A8=0.85892\times10^{-3}$
$A10=-0.13129\times10^{-3}$
$A12=0.86344\times10^{-5}$
Aspherical Coefficient of $5^{th}$ Surface (r5)
$\epsilon=1.0000$
$A4=-0.99900\times10^{-2}$
$A6=-0.29443\times10^{-2}$
$A8=0.90977\times10^{-3}$
$A10=0.39506\times10^{-3}$
$A12=-0.71124\times10^{-4}$
Aspherical Coefficient of $9^{th}$ Surface (r9)
$\epsilon=1.0000$
$A4=-0.90209\times10^{-2}$
$A6=0.41064\times10^{-3}$
$A8=-0.29246\times10^{-2}$
$A10=0.13103\times10^{-2}$
$A12=-0.28195\times10^{-3}$
Aspherical Coefficient of $11^{th}$ Surface (r11)
$\epsilon=1.0000$
$A4=0.73187\times10^{-2}$
$A6=0.21358\times10^{-2}$
$A8=-0.30599\times10^{-3}$
$A10=-0.12063\times10^{-2}$
$A12=0.53304\times10^{-3}$
Aspherical Coefficient of $12^{th}$ Surface (r12)
$\epsilon=1.0000$
$A4=0.28827\times10^{-1}$
$A6=0.10287\times10^{-1}$
$A8=-0.97538\times10^{-3}$
$A10=0.16814\times10^{-2}$
$A12=0.18718\times10^{-2}$
Value of Condition (4) for $4^{th}$ Surface (r4)
y=0.00ymax ... $\{|x|-|x0|\}/\{C0\cdot(N'-N)\cdot f2\}=0.00000$
y=0.10ymax ... $\{|x|-|x0|\}/\{C0\cdot(N'-N)\cdot f2\}=-0.00003$
y=0.20ymax ... $\{|x|-|x0|\}/\{C0\cdot(N'-N)\cdot f2\}=-0.00041$
y=0.30ymax ... $\{|x|-|x0|\}/\{C0\cdot(N'-N)\cdot f2\}=-0.00186$
y=0.40ymax ... $\{|x|-|x0|\}/\{C0\cdot(N'-N)\cdot f2\}=-0.00502$
y=0.50ymax ... $\{|x|-|x0|\}/\{C0\cdot(N'-N)\cdot f2\}=-0.01011$
y=0.60ymax ... $\{|x|-|x0|\}/\{C0\cdot(N'-N)\cdot f2\}=-0.01694$
y=0.70ymax ... $\{|x|-|x0|\}/\{C0\cdot(N'-N)\cdot f2\}=-0.02546$
y=0.80ymax ... $\{|x|-|x0|\}/\{C0\cdot(N'-N)\cdot f2\}=-0.03672$
y=0.90ymax ... $\{|x|-|x0|\}/\{C0\cdot(N'-N)\cdot f2\}=-0.05361$
y=1.00ymax ... $\{|x|-|x0|\}/\{C0\cdot(N'-N)\cdot f2\}=-0.08185$
Value of Condition (4) for $5^{th}$ Surface (r5)
y=0.00ymax ... $\{|x|-|x0|\}/\{C0\cdot(N'-N)\cdot f2\}=-0.00000$
y=0.10ymax ... $\{|x|-|x0|\}/\{C0\cdot(N'-N)\cdot f2\}=-0.00000$
y=0.20ymax ... $\{|x|-|x0|\}/\{C0\cdot(N'-N)\cdot f2\}=-0.00008$
y=0.30ymax ... $\{|x|-|x0|\}/\{C0\cdot(N'-N)\cdot f2\}=-0.00042$
y=0.40ymax ... $\{|x|-|x0|\}/\{C0\cdot(N'-N)\cdot f2\}=-0.00140$
y=0.50ymax ... $\{|x|-|x0|\}/\{C0\cdot(N'-N)\cdot f2\}=-0.00368$
y=0.60ymax ... $\{|x|-|x0|\}/\{C0\cdot(N'-N)\cdot f2\}=-0.00829$
y=0.70ymax ... $\{|x|-|x0|\}/\{C0\cdot(N'-N)\cdot f2\}=-0.01687$ y=0.80ymax ... {|x|−|x0|}/{C0·(N'−N)·f2}=−0.03179
y=0.90ymax ... {|x|−|x0|}/{C0·(N'−N)·f2}=−0.05654
y=1.00ymax ... {|x|−|x0|}/{C0·(N'−N)·f2}=−0.09642
Value of Condition (5) for 9$^{th}$ Surface (r9)
y=0.00ymax ... {|x|−|x0|}/{C0·(N'−N)·f3}=0.00000
y=0.10ymax ... {|x|−|x0|}/{C0·(N'−N)·f3}=−0.00000
y=0.20ymax ... {|x|−|x0|}/{C0·(N'−N)·f3}=−0.00004
y=0.30ymax ... {|x|−|x0|}/{C0·(N'−N)·f3}=−0.00020
y=0.40ymax ... {|x|−|x0|}/{C0·(N'−N)·f3}=−0.00063
y=0.50ymax ... {|x|−|x0|}/{C0·(N'−N)·f3}=−0.00156
y=0.60ymax ... {|x|−|x0|}/{C0·(N'−N)·f3}=−0.00336
y=0.70ymax ... {|x|−|x0|}/{C0·(N'−N)·f3}=−0.00655
y=0.80ymax ... {|x|−|x0|}/{C0·(N'−N)·f3}=−0.01192
y=0.90ymax ... {|x|−|x0|}/{C0·(N'−N)·f3}=−0.02067
y=1.00ymax ... {|x|−|x0|}/{C0·(N'−N)·f3}=−0.03463
Value of Condition (5) for 11$^{th}$ Surface (r11)
y=0.00ymax ... {|x|−|x0|}/{C0·(N'−N)·f3}=0.00000
y=0.10ymax ... {|x|−|x0|}/{C0·(N'−N)·f3}=0.00001
y=0.20ymax ... {|x|−|x0|}/{C0·(N'−N)·f3}=0.00014
y=0.30ymax ... {|x|−|x0|}/{C0·(N'−N)·f3}=0.00122
y=0.40ymax ... {|x|−|x0|}/{C0·(N'−N)·f3}=0.00395
y=0.50ymax ... {|x|−|x0|}/{C0·(N'−N)·f3}=0.00989
y=0.60ymax ... {|x|−|x0|}/{C0·(N'−N)·f3}=0.02104
y=0.70ymax ... {|x|−|x0|}/{C0·(N'−N)·f3}=0.03983
y=0.80ymax ... {|x|−|x0|}/{C0·(N'−N)·f3}=0.06890
y=0.90ymax ... {|x|−|x0|}/{C0·(N'−N)·f3}=0.11081
y=1.00ymax ... {|x|−|x0|}/{C0·(N'−N)·f3}=0.16841
Value of Condition (5) for 12$^{th}$ Surface (r12)
y=0.00ymax ... {|x|−|x0|}/{C0·(N'−N)·f3}=−0.00000
y=0.10ymax ... {|x|−|x0|}/{C0·(N'−N)·f3}=−0.00000
y=0.20ymax ... {|x|−|x0|}/{C0·(N'−N)·f3}=−0.00005
y=0.30ymax ... {|x|−|x0|}/{C0·(N'−N)·f3}=−0.00027
y=0.40ymax ... {|x|−|x0|}/{C0·(N'−N)·f3}=−0.00087
y=0.50ymax ... {|x|−|x0|}/{C0·(N'−N)·f3}=−0.00217
y=0.60ymax ... {|x|−|x0|}/{C0·(N'−N)·f3}=−0.00464
y=0.70ymax ... {|x|−|x0|}/{C0·(N'−N)·f3}=−0.00889
y=0.80ymax ... {|x|−|x0|}/{C0·(N'−N)·f3}=−0.01572
y=0.90ymax ... {|x|−|x0|}/{C0·(N'−N)·f3}=−0.02621
y=1.00ymax ... {|x|−|x0|}/{C0·(N'−N)·f3}=−0.04179

TABLE 7 f = 3.3~9.3~26.4
FNO = 4.1~5.25~5.73

| Radius of Curvature | Axial Distance | Refractive Index | Abbe Number |
|---|---|---|---|
| r1 = 10.961 | | | |
| | d1 = 0.600 | N1 = 1.84666 | v1 = 23.82 |
| r2 = 7.086 | | | |
| | d2 = 2.800 | N2 = 1.58267 | v2 = 46.43 |
| r3 = 481.533 | | | |
| | d3 = 1.174~4.737~12.361 | | |
| r4* = 12.033 | | | |
| | d4 = 0.500 | N3 = 1.80420 | v3 = 46.50 |
| r5* = 2.061 | | | |
| | d5 = 1.050 | | |
| r6 = 4.652 | | | |
| | d6 = 1.200 | N4 = 1.79850 | v4 = 22.60 |
| r7 = 15.453 | | | |
| | d7 = 6.626~2.285~0.501 | | |
| r8 = ∞ (diaphagm A) | | | |
| | d8 = 0.400 | | |
| r9* = 2.093 | | | |
| | d9 = 1.500 | N5 = 1.48749 | v5 = 70.44 |
| r10 = 6.957 | | | |
| | d10 = 0.100 | | |
| r11* = 35.846 | | | |
| | d11 = 0.690 | N6 = 1.84666 | v6 = 23.82 |
| r12* = 7.127 | | | |
| | d12 = 2.400~6.741~8.525 | | |
| r13 = ∞ | | | |

TABLE 7-continued f = 3.3~9.3~26.4
FNO = 4.1~5.25~5.73

| Radius of Curvature | Axial Distance | Refractive Index | Abbe Number |
|---|---|---|---|
| r14 = ∞ | d13 = 4.000 | N7 = 1.51680 | v7 = 64.20 |
| | Σd = 23.040~26.603~34.227 | | |

Aspherical Coefficient of 4$^{th}$ Surface (r4)
ε=1.0000
A4=0.35558×10$^{-2}$
A6=−0.19282×10$^{-2}$
A8=0.58717×10$^{-3}$
A10=−0.69677×10$^{-4}$
A12=0.24236×10$^{-5}$
Aspherical Coefficient of 5$^{th}$ Surface (r5)
ε=1.0000
A4=−0.10687×10$^{-1}$
A6=0.13290×10$^{-2}$
A8=0.20252×10$^{-2}$
A10=0.97516×10$^{-3}$
A12=−0.17463×10$^{-3}$
Aspherical Coefficient of 9$^{th}$ Surface (r4)
ε=1.0000
A4=−0.86322×10$^{-2}$
A6=0.25268×10$^{-2}$
A8=−0.43939×10$^{-2}$
A10=0.18136×10$^{-2}$
A12=−0.32438×10$^{-3}$
Aspherical Coefficient of 11$^{th}$ Surface (r9)
ε=1.0000
A4=0.14049×10$^{-1}$
A6=0.15318×10$^{-2}$
A8=−0.16627×10$^{-3}$
A10=−0.68691×10$^{-2}$
A12=0.30468×10$^{-3}$
Aspherical Coefficient of 12$^{th}$ Surface (r12)
ε=1.0000
A4=0.30477×10$^{-1}$
A6=0.11214×10$^{-1}$
A8=−0.67234×10$^{-2}$
A10=0.40279×10$^{-2}$
A12=0.39886×10$^{-3}$
Value of Condition (4) for 4$^{th}$ Surface (r4)
y=0.00ymax ... {|x|−|x0|}/{C0·(N'−N)·f2}=0.00000
y=0.10ymax ... {|x|−|x0|}/{C0·(N'−N)·f2}=−0.00002
y=0.20ymax ... {|x|−|x0|}/{C0·(N'−N)·f2}=−0.00036
y=0.30ymax ... {|x|−|x0|}/{C0·(N'−N)·f2}=−0.00165
y=0.40ymax ... {|x|−|x0|}/{C0·(N'−N)·f2}=−0.00453
y=0.50ymax ... {|x|−|x0|}/{C0·(N'−N)·f2}=−0.00934
y=0.60ymax ... {|x|−|x0|}/{C0·(N'−N)·f2}=−0.01623
y=0.70ymax ... {|x|−|x0|}/{C0·(N'−N)·f2}=−0.02579
y=0.80ymax ... {|x|−|x0|}/{C0·(N'−N)·f2}=−0.04000
y=0.90ymax ... {|x|−|x0|}/{C0·(N'−N)·f2}=−0.06255
y=1.00ymax ... {|x|−|x0|}/{C0·(N'−N)·f2}=−0.09737
Value of Condition (4) for 5$^{th}$ Surface (r5)
y=0.00ymax ... {|x|−|x0|}/{C0·(N'−N)·f2}=0.00000
y=0.10ymax ... {|x|−|x0|}/{C0·(N'−N)·f2}=−0.00001
y=0.20ymax ... {|x|−|x0|}/{C0·(N'−N)·f2}=−0.00008
y=0.30ymax ... {|x|−|x0|}/{C0·(N'−N)·f2}=−0.00044
y=0.40ymax ... {|x|−|x0|}/{C0·(N'−N)·f2}=−0.00144
y=0.50ymax ... {|x|−|x0|}/{C0·(N'−N)·f2}=−0.00370
y=0.60ymax ... {|x|−|x0|}/{C0·(N'−N)·f2}=−0.00822
y=0.70ymax ... {|x|−|x0|}/{C0·(N'−N)·f2}=−0.01647
y=0.80ymax ... {|x|−|x0|}/{C0·(N'−N)·f2}=−0.03054 y=0.90ymax ... {|x|−|x0|}/{C0·(N'−N)·f2}=−0.05345
y=1.00ymax ... {|x|−|x0|}/{C0·(N'−N)·f2}=−0.09033
Value of Condition (5) for 9$^{th}$ Surface (r9)
y=0.00ymax ... {|x|−|x0|}/{C0·(N'−N)·f3}=0.00000
y=0.10ymax ... {|x|−|x0|}/{C0·(N'−N)·f3}=−0.00000
y=0.20ymax ... {|x|−|x0|}/{C0·(N'−N)·f3}=−0.00000
y=0.30ymax ... {|x|−|x0|}/{C0·(N'−N)·f3}=−0.00030
y=0.40ymax ... {|x|−|x0|}/{C0·(N'−N)·f3}=−0.00093
y=0.50ymax ... {|x|−|x0|}/{C0·(N'−N)·f3}=−0.00231
y=0.60ymax ... {|x|−|x0|}/{C0·(N'−N)·f3}=−0.00498
y=0.70ymax ... {|x|−|x0|}/{C0·(N'−N)·f3}=−0.00990
y=0.80ymax ... {|x|−|x0|}/{C0·(N'−N)·f3}=−0.01849
y=0.90ymax ... {|x|−|x0|}/{C0·(N'−N)·f3}=−0.03308
y=1.00ymax ... {|x|−|x0|}/{C0·(N'−N)·f3}=−0.05811
Value of Condition (5) for 11$^{th}$ Surface (r11)
y=0.00ymax ... {|x|−|x0|}/{C0·(N'−N)·f3}=−0.00000
y=0.10ymax ... {|x|−|x0|}/{C0·(N'−N)·f3}=0.00003
y=0.20ymax ... {|x|−|x0|}/{C0·(N'−N)·f3}=0.00055
y=0.30ymax ... {|x|−|x0|}/{C0·(N'−N)·f3}=0.00279
y=0.40ymax ... {|x|−|x0|}/{C0·(N'−N)·f3}=0.00892
y=0.50ymax ... {|x|−|x0|}/{C0·(N'−N)·f3}=0.02206
y=0.60ymax ... {|x|−|x0|}/{C0·(N'−N)·f3}=0.04632
y=0.70ymax ... {|x|−|x0|}/{C0·(N'−N)·f3}=0.08669
y=0.80ymax ... {|x|−|x0|}/{C0·(N'−N)·f3}=0.10224
y=0.90ymax ... {|x|−|x0|}/{C0·(N'−N)·f3}=0.07801
y=1.00ymax ... {|x|−|x0|}/{C0·(N'−N)·f3}=0.02183
Value of Condition (5) for 12$^{th}$ Surface (r12)
y=0.00ymax ... {|x|−|x0|}/{C0·(N'−N)·f3}=−0.00000
y=0.10ymax ... {|x|−|x0|}/{C0·(N'−N)·f3}=−0.00001
y=0.20ymax ... {|x|−|x0|}/{C0·(N'−N)·f3}=−0.00013
y=0.30ymax ... {|x|−|x0|}/{C0·(N'−N)·f3}=−0.00065
y=0.40ymax ... {|x|−|x0|}/{C0·(N'−N)·f3}=−0.00210
y=0.50ymax ... {|x|−|x0|}/{C0·(N'−N)·f3}=−0.00529
y=0.60ymax ... {|x|−|x0|}/{C0·(N'−N)·f3}=−0.01131
y=0.70ymax ... {|x|−|x0|}/{C0·(N'−N)·f3}=−0.02167
y=0.80ymax ... {|x|−|x0|}/{C0·(N'−N)·f3}=−0.03836
y=0.90ymax ... {|x|−|x0|}/{C0·(N'−N)·f3}=−0.06418
y=1.00ymax ... {|x|−|x0|}/{C0·(N'−N)·f3}=−0.10331

TABLE 8 f = 3.3~8.0~19.8
FNO = 4.1

| Radius of Curvature | Axial Distance | Refractive Index | Abbe Number |
|---|---|---|---|
| r1 = 10.736 | | | |
| | d1 = 0.600 | N1 = 1.84666 | ν1 = 23.82 |
| r2 = 6.617 | | | |
| | d2 = 2.800 | N2 = 1.58267 | ν2 = 46.43 |
| r3 = 125.571 | | | |
| | d3 = 1.174~1.625~9.352 | | |
| r4* = 12.032 | | | |
| | d4 = 0.500 | N3 = 1.80420 | ν3 = 46.50 |
| r5* = 2.051 | | | |
| | d5 = 1.050 | | |
| r6 = 4.570 | | | |
| | d6 = 1.200 | N4 = 1.79850 | ν4 = 22.60 |
| r7 = 14.472 | | | |
| | d7 = 6.037~1.844~0.501 | | |
| r8 = ∞ (diaphagm A) | | | |
| | d8 = 0.400 | | |
| r9* = 2.092 | | | |
| | d9 = 1.500 | N5 = 1.48749 | ν5 = 70.44 |
| r10 = 6.912 | | | |
| | d10 = 0.100 | | |
| r11* = 48.525 | | | |
| | d11 = 0.680 | N6 = 1.84666 | ν6 = 23.82 |
| r12* = 7.438 | | | |
| | d12 = 2.000~6.593~8.536 | | |
| r13 = ∞ | | | |
| | d13 = 4.000 | N7 = 1.51680 | ν7 = 64.20 |

TABLE 8-continued f = 3.3~8.0~19.8
FNO = 4.1

| Radius of Curvature | Axial Distance | Refractive Index | Abbe Number |
|---|---|---|---|
| r14 = ∞ | | | |
| | Σd = 23.041~22.892~31.219 | | |

Aspherical Coefficient of 4$^{th}$ Surface (r4)
ε=1.0000
A4=0.38104×10$^{-2}$
A6=−0.19863×10$^{-2}$
A8=0.58725×10$^{-3}$
A10=−0.69676×10$^{-4}$
A12=0.24236×10$^{-5}$
Aspherical Coefficient of 5$^{th}$ Surface (r5)
ε=1.0000
A4=−0.10488×10$^{-1}$
A6=0.13654×10$^{-2}$
A8=0.20255×10$^{-2}$
A10=0.97516×10$^{-3}$
A12=−0.17463×10$^{-3}$
Aspherical Coefficient of 9$^{th}$ Surface (r9)
ε=1.0000
A4=−0.88749×10$^{-2}$
A6=0.25363×10$^{-2}$
A8=−0.43935×10$^{-2}$
A10=0.18136×10$^{-2}$
A12=−0.32438×10$^{-3}$
Aspherical Coefficient of 11$^{th}$ Surface (r11)
ε=1.0000
A4=0.14049×10$^{-1}$
A6=0.15318×10$^{-2}$
A8=−0.16627×10$^{-3}$
A10=−0.68691×10$^{-3}$
A12=0.30468×10$^{-3}$
Aspherical Coefficient of 12$^{th}$ Surface (r12)
ε=1.0000
A4=0.30477×10$^{-1}$
A6=0.11214×10$^{-1}$
A8=−0.67234×10$^{-2}$
A10=0.40279×10$^{-2}$
A12=0.39886×10$^{-3}$
Value of Condition (4) for 4$^{th}$ Surface (r4)
y=0.00ymax ... {|x|−|x0|}/{C0·(N'−N)·f2}=0.00000
y=0.10ymax ... {|x|−|x0|}/{C0·(N'−N)·f2}=−0.00002
y=0.20ymax ... {|x|−|x0|}/{C0·(N'−N)·f2}=−0.00032
y=0.30ymax ... {|x|−|x0|}/{C0·(N'−N)·f2}=−0.00149
y=0.40ymax ... {|x|−|x0|}/{C0·(N'−N)·f2}=−0.00417
y=0.50ymax ... {|x|−|x0|}/{C0·(N'−N)·f2}=−0.00875
y=0.60ymax ... {|x|−|x0|}/{C0·(N'−N)·f2}=−0.01538
y=0.70ymax ... {|x|−|x0|}/{C0·(N'−N)·f2}=−0.02434
y=0.80ymax ... {|x|−|x0|}/{C0·(N'−N)·f2}=−0.03669
y=0.90ymax ... {|x|−|x0|}/{C0·(N'−N)·f2}=−0.05474
y=1.00ymax ... {|x|−|x0|}/{C0·(N'−N)·f2}=−0.08161
Value of Condition (4) for 5$^{th}$ Surface (r5)
y=0.00ymax ... {|x|−|x0|}/{C0·(N'−N)·f2}=0.00000
y=0.10ymax ... {|x|−|x0|}/{C0·(N'−N)·f2}=−0.00000
y=0.20ymax ... {|x|−|x0|}/{C0·(N'−N)·f2}=−0.00006
y=0.30ymax ... {|x|−|x0|}/{C0·(N'−N)·f2}=−0.00033
y=0.40ymax ... {|x|−|x0|}/{C0·(N'−N)·f2}=−0.00109
y=0.50ymax ... {|x|−|x0|}/{C0·(N'−N)·f2}=−0.00278
y=0.60ymax ... {|x|−|x0|}/{C0·(N'−N)·f2}=−0.00613
y=0.70ymax ... {|x|−|x0|}/{C0·(N'−N)·f2}=−0.01219
y=0.80ymax ... {|x|−|x0|}/{C0·(N'−N)·f2}=−0.02249
y=0.90ymax ... {|x|−|x0|}/{C0·(N'−N)·f2}=−0.03908 y=1.00ymax . . . {|x|−|x0|}/{C0·(N'−N)·f2}=−0.06508
Value of Condition (5) for 9$^{th}$ Surface (r9)
y=0.00ymax . . . {|x|−|x0|}/{C0·(N'−N)·f3}=0.00000
y=0.10ymax . . . {|x|−|x0|}/{C0·(N'−N)·f3}=−0.00000
y=0.20ymax . . . {|x|−|x0|}/{C0·(N'−N)·f3}=−0.00007
y=0.30ymax . . . {|x|−|x0|}/{C0·(N'−N)·f3}=−0.00033
y=0.40ymax . . . {|x|−|x0|}/{C0·(N'−N)·f3}=−0.00103
y=0.50ymax . . . {|x|−|x0|}/{C0·(N'−N)·f3}=−0.00255
y=0.60ymax . . . {|x|−|x0|}/{C0·(N'−N)·f3}=−0.00552
y=0.70ymax . . . {|x|−|x0|}/{C0·(N'−N)·f3}=−0.01095
y=0.80ymax . . . {|x|−|x0|}/{C0·(N'−N)·f3}=−0.02045
y=0.90ymax . . . {|x|−|x0|}/{C0·(N'−N)·f3}=−0.03657
y=1.00ymax . . . {|x|−|x0|}/{C0·(N'−N)·f3}=−0.06435
Value of Condition (5) for 11$^{th}$ Surface (r11)
y=0.00ymax . . . {|x|−|x0|}/{C0·(N'−N)·f3}=−0.00000
y=0.10ymax . . . {|x|−|x0|}/{C0·(N'−N)·f3}=0.00005
y=0.20ymax . . . {|x|−|x0|}/{C0·(N'−N)·f3}=0.00081
y=0.30ymax . . . {|x|−|x0|}/{C0·(N'−N)·f3}=0.00413
y=0.40ymax . . . {|x|−|x0|}/{C0·(N'−N)·f3}=0.01320
y=0.50ymax . . . {|x|−|x0|}/{C0·(N'−N)·f3}=0.03265
y=0.60ymax . . . {|x|−|x0|}/{C0·(N'−N)·f3}=0.06854
y=0.70ymax . . . {|x|−|x0|}/{C0·(N'−N)·f3}=0.07688
y=0.80ymax . . . {|x|−|x0|}/{C0·(N'−N)·f3}=0.04772
y=0.90ymax . . . {|x|−|x0|}/{C0·(N'−N)·f3}=−0.01574
y=1.00ymax . . . {|x|−|x0|}/{C0·(N'−N)·f3}=−0.13082
Value of Condition (5) for 12$^{th}$ Surface (r12)
y=0.00ymax . . . {|x|−|x0|}/{C0·(N'−N)·f3}=−0.00000
y=0.10ymax . . . {|x|−|x0|}/{C0·(N'−N)·f3}=−0.00001
y=0.20ymax . . . {|x|−|x0|}/{C0·(N'−N)·f3}=−0.00014
y=0.30ymax . . . {|x|−|x0|}/{C0·(N'−N)·f3}=−0.00075
y=0.40ymax . . . {|x|−|x0|}/{C0·(N'−N)·f3}=−0.00242
y=0.50ymax . . . {|x|−|x0|}/{C0·(N'−N)·f3}=−0.00608
y=0.60ymax . . . {|x|−|x0|}/{C0·(N'−N)·f3}=−0.01303
y=0.70ymax . . . {|x|−|x0|}/{C0·(N'−N)·f3}=−0.02497
y=0.80ymax . . . {|x|−|x0|}/{C0·(N'−N)·f3}=−0.04426
y=0.90ymax . . . {|x|−|x0|}/{C0·(N'−N)·f3}=−0.07417
y=1.00ymax . . . {|x|−|x0|}/{C0·(N'−N)·f3}=−0.11969

TABLE 9 f = 3.3~9.3~26.4
FNO = 4.1~5.25~5.73

| Radius of Curvature | Axial Distance | Refractive Index | Abbe Number |
|---|---|---|---|
| r1 = 12.643 | | | |
| | d1 = 0.600 | N1 = 1.84666 | ν1 = 23.82 |
| r2 = 7.356 | | | |
| | d2 = 2.400 | N2 = 1.70154 | ν2 = 41.15 |
| r3 = 100.461 | | | |
| | d3 = 1.173~5.400~12.287 | | |
| r4* = 20.857 | | | |
| | d4 = 0.500 | N3 = 1.75450 | ν3 = 51.57 |
| r5* = 2.062 | | | |
| | d5 = 1.340 | | |
| r6 = 3.947 | | | |
| | d6 = 1.200 | N4 = 1.79850 | ν4 = 22.60 |
| r7 = 6.089 | | | |
| | d7 = 6.132~2.254~0.501 | | |
| r8 = ∞ (diaphagm A) | | | |
| | d8 = 0.400 | | |
| r9* = 2.020 | | | |
| | d9 = 1.600 | N5 = 1.48749 | ν5 = 70.44 |
| r10 = 10.684 | | | |
| | d10 = 0.100 | | |
| r11* = 32.168 | | | |
| | d11 = 0.630 | N6 = 1.84666 | ν6 = 23.82 |
| r12* = 9.493 | | | |
| | d12 = 2.200~6.278~9.031 | | |
| r13 = ∞ | | | |
| | d13 = 4.000 | N7 = 1.51680 | ν7 = 64.20 |
| r14 = ∞ | | | |

TABLE 9-continued f = 3.3~9.3~26.4
FNO = 4.1~5.25~5.73

| Radius of Curvature | Axial Distance | Refractive Index | Abbe Number |
|---|---|---|---|
| | Σd = 22.275~26.702~34.589 | | |

Aspherical Coefficient of 4$^{th}$ Surface (r4)
ε=1.0000
A4=0.49606×10$^{-2}$
A6=−0.18679×10$^{-2}$
A8=0.18135×10$^{-3}$
A10=0.25065×10$^{-4}$
A12=0.34002×10$^{-5}$
Aspherical Coefficient of 5$^{th}$ Surface (r5)
ε=1.0000
A4=−0.53884×10$^{-2}$
A6=−0.12523×10$^{-2}$
A8=−0.16825×10$^{-2}$
A10=0.25510×10$^{-3}$
A12=0.12877×10$^{-4}$
Aspherical Coefficient of 9$^{th}$ Surface (r9)
ε=1.0000
A4=−0.74090×10$^{-2}$
A6=0.36776×10$^{-2}$
A8=−0.45738×10$^{-2}$
A10=0.17594×10$^{-2}$
A12=−0.28578×10$^{-3}$
Aspherical Coefficient of 11 Surface (r11)
ε=1.0000
A4=0.12523×10$^{-1}$
A6=0.65982×10$^{-3}$
A8=−0.57961×10$^{-3}$
A10=−0.24606×10$^{-3}$
A12=0.99508×10$^{-4}$
Aspherical Coefficient of 12$^{th}$ Surface (r12)
ε=1.0000
A4=0.29975×10$^{-1}$
A6=0.10943×10$^{-1}$
A8=−0.53112×10$^{-2}$
A10=0.22484×10$^{-2}$
A12=0.94187×10$^{-4}$
Value of Condition (4) for 4$^{th}$ Surface (r4)
y=0.00ymax . . . {|x|−|x0|}/{C0·(N'−N)·f2}=0.00000
y=0.10ymax . . . {|x|−|x0|}/{C0·(N'−N)·f2}=−0.00007
y=0.20ymax . . . {|x|−|x0|}/{C0·(N'−N)·f2}=−0.00110
y=0.30ymax . . . {|x|−|x0|}/{C0·(N'−N)·f2}=−0.00513
y=0.40ymax . . . {|x|−|x0|}/{C0·(N'−N)·f2}=−0.01437
y=0.50ymax . . . {|x|−|x0|}/{C0·(N'−N)·f2}=−0.02982
y=0.60ymax . . . {|x|−|x0|}/{C0·(N'−N)·f2}=−0.05023
y=0.70ymax . . . {|x|−|x0|}/{C0·(N'−N)·f2}=−0.07253
y=0.80ymax . . . {|x|−|x0|}/{C0·(N'−N)·f2}=−0.09448
y=0.90ymax . . . {|x|−|x0|}/{C0·(N'−N)·f2}=−0.12001
y=1.00ymax . . . {|x|−|x0|}/{C0·(N'−N)·f2}=−0.16480
Value of Condition (4) for 5$^{th}$ Surface (r5)
y=0.00ymax . . . {|x|−|x0|}/{C0·(N'−N)·f2}=0.00000
y=0.10ymax . . . {|x|−|x0|}/{C0·(N'−N)·f2}=−0.00000
y=0.20ymax . . . {|x|−|x0|}/{C0·(N'−N)·f2}=−0.00005
y=0.30ymax . . . {|x|−|x0|}/{C0·(N'−N)·f2}=−0.00025
y=0.40ymax . . . {|x|−|x0|}/{C0·(N'−N)·f2}=−0.00086
y=0.50ymax . . . {|x|−|x0|}/{C0·(N'−N)·f2}=−0.00231
y=0.60ymax . . . {|x|−|x0|}/{C0·(N'−N)·f2}=−0.00546
y=0.70ymax . . . {|x|−|x0|}/{C0·(N'−N)·f2}=−0.01183
y=0.80ymax . . . {|x|−|x0|}/{C0·(N'−N)·f2}=−0.02389
y=0.90ymax . . . {|x|−|x0|}/{C0·(N'−N)·f2}=−0.04527 y=1.00ymax ... $\{|x|-|x0|\}/\{C0\cdot(N'-N)\cdot f2\}=-0.08030$
Value of Condition (5) for $9^{th}$ Surface (r9)
y=0.00ymax ... $\{|x|-|x0|\}/\{C0\cdot(N'-N)\cdot f3\}=0.00000$
y=0.10ymax ... $\{|x|-|x0|\}/\{C0\cdot(N'-N)\cdot f3\}=-0.00000$
y=0.20ymax ... $\{|x|-|x0|\}/\{C0\cdot(N'-N)\cdot f3\}=-0.00006$
y=0.30ymax ... $\{|x|-|x0|\}/\{C0\cdot(N'-N)\cdot f3\}=-0.00030$
y=0.40ymax ... $\{|x|-|x0|\}/\{C0\cdot(N'-N)\cdot f3\}=-0.00092$
y=0.50ymax ... $\{|x|-|x0|\}/\{C0\cdot(N'-N)\cdot f3\}=-0.00223$
y=0.60ymax ... $\{|x|-|x0|\}/\{C0\cdot(N'-N)\cdot f3\}=-0.00477$
y=0.70ymax ... $\{|x|-|x0|\}/\{C0\cdot(N'-N)\cdot f3\}=-0.00950$
y=0.80ymax ... $\{|x|-|x0|\}/\{C0\cdot(N'-N)\cdot f3\}=-0.01790$
y=0.90ymax ... $\{|x|-|x0|\}/\{C0\cdot(N'-N)\cdot f3\}=-0.03250$
y=1.00ymax ... $\{|x|-|x0|\}/\{C0\cdot(N'-N)\cdot f3\}=-0.05877$
Value of Condition (5) for $11^{th}$ Surface (r11)
y=0.00ymax ... $\{|x|-|x0|\}/\{C0\cdot(N'-N)\cdot f3\}=-0.00000$
y=0.10ymax ... $\{|x|-|x0|\}/\{C0\cdot(N'-N)\cdot f3\}=0.00003$
y=0.20ymax ... $\{|x|-|x0|\}/\{C0\cdot(N'-N)\cdot f3\}=0.00051$
y=0.30ymax ... $\{|x|-|x0|\}/\{C0\cdot(N'-N)\cdot f3\}=0.00259$
y=0.40ymax ... $\{|x|-|x0|\}/\{C0\cdot(N'-N)\cdot f3\}=0.00823$
y=0.50ymax ... $\{|x|-|x0|\}/\{C0\cdot(N'-N)\cdot f3\}=0.02013$
y=0.60ymax ... $\{|x|-|x0|\}/\{C0\cdot(N'-N)\cdot f3\}=0.04165$
y=0.70ymax ... $\{|x|-|x0|\}/\{C0\cdot(N'-N)\cdot f3\}=0.07644$
y=0.80ymax ... $\{|x|-|x0|\}/\{C0\cdot(N'-N)\cdot f3\}=0.12789$
y=0.90ymax ... $\{|x|-|x0|\}/\{C0\cdot(N'-N)\cdot f3\}=-0.15195$
y=1.00ymax ... $\{|x|-|x0|\}/\{C0\cdot(N'-N)\cdot f3\}=-0.14304$
Value of Condition (5) for $12^{th}$ Surface (r12)
y=0.00ymax ... $\{|x|-|x0|\}/\{C0\cdot(N'-N)\cdot f3\}=-0.00000$
y=0.10ymax ... $\{|x|-|x0|\}/\{C0\cdot(N'-N)\cdot f3\}=-0.00001$
y=0.20ymax ... $\{|x|-|x0|\}/\{C0\cdot(N'-N)\cdot f3\}=-0.00020$
y=0.30ymax ... $\{|x|-|x0|\}/\{C0\cdot(N'-N)\cdot f3\}=-0.00106$
y=0.40ymax ... $\{|x|-|x0|\}/\{C0\cdot(N'-N)\cdot f3\}=-0.00344$
y=0.50ymax ... $\{|x|-|x0|\}/\{C0\cdot(N'-N)\cdot f3\}=-0.00866$
y=0.60ymax ... $\{|x|-|x0|\}/\{C0\cdot(N'-N)\cdot f3\}=-0.01859$
y=0.70ymax ... $\{|x|-|x0|\}/\{C0\cdot(N'-N)\cdot f3\}=-0.03571$
y=0.80ymax ... $\{|x|-|x0|\}/\{C0\cdot(N'-N)\cdot f3\}=-0.06336$
y=0.90ymax ... $\{|x|-|x0|\}/\{C0\cdot(N'-N)\cdot f3\}=-0.10621$
y=1.00ymax ... $\{|x|-|x0|\}/\{C0\cdot(N'-N)\cdot f3\}=-0.17146$

TABLE 10 f = 3.3~10.4~33.0
FNO = 4.1

| Radius of Curvature | Axial Distance | Refractive Index | Abbe Number |
|---|---|---|---|
| r1 = 14.544 | | | |
| | d1 = 0.600 | N1 = 1.80741 | v1 = 31.59 |
| r2 = 8.856 | | | |
| | d2 = 3.200 | N2 = 1.63854 | v2 = 55.62 |
| r3 = 255.170 | | | |
| | d3 = 1.174~8.011~17.101 | | |
| r4* = 11.630 | | | |
| | d4 = 0.500 | N3 = 1.77250 | v3 = 49.77 |
| r5* = 2.135 | | | |
| | d5 = 1.327 | | |
| r6 = 5.037 | | | |
| | d6 = 1.200 | N4 = 1.79850 | v4 = 22.60 |
| r7 = 13.642 | | | |
| | d7 = 6.933~2.503~0.501 | | |
| r8 = ∞ (diaphagm A) | | | |
| | d8 = 0.400 | | |
| r9* = 2.063 | | | |
| | d9 = 1.761 | N5 = 1.48749 | v5 = 70.44 |
| r10 = 4.393 | | | |
| | d10 = 0.200 | | |
| r11* = 4.180 | | | |
| | d11 = 0.655 | N6 = 1.80741 | v6 = 31.59 |
| r12* = 89.289 | | | |
| | d12 = 2.500~6.930~8.932 | | |
| r13 = ∞ | | | |
| | d13 = 4.000 | N7 = 1.51680 | v7 = 64.20 |
| r14 = ∞ | | | |

TABLE 10-continued f = 3.3~10.4~33.0
FNO = 4.1

| Radius of Curvature | Axial Distance | Refractive Index | Abbe Number |
|---|---|---|---|
| | Σd = 24.451~31.287~40.378 | | |

Aspherical Coefficient of $4^{th}$ Surface (r4)
$\epsilon=1.0000$
$A4=0.70975\times10^{-2}$
$A6=-0.33106\times10^{-2}$
$A8=0.90948\times10^{-3}$
$A10=-0.91009\times10^{-4}$
$A12=0.15581\times10^{-5}$
Aspherical Coefficient of $5^{th}$ Surface (r5)
$\epsilon=1.0000$
$A4=-0.50268\times10^{-2}$
$A6=-0.22635\times10^{-2}$
$A8=-0.20490\times10^{-2}$
$A10=0.12188\times10^{-2}$
$A12=-0.20492\times10^{-3}$
Aspherical Coefficient of $9^{th}$ Surface (r9)
$\epsilon=1.0000$
$A4=-0.67922\times10^{-2}$
$A6=0.43760\times10^{-2}$
$A8=-0.47283\times10^{-2}$
$A10=0.17022\times10^{-2}$
$A12=-0.28605\times10^{-3}$
Aspherical Coefficient of $11^{th}$ Surface (r11)
$\epsilon=1.0000$
$A4=0.89966\times10^{-2}$
$A6=0.96879\times10^{-3}$
$A8=0.28150\times10^{-3}$
$A10=-0.60519\times10^{-3}$
$A12=0.27835\times10^{-3}$
Aspherical Coefficient of $12^{th}$ Surface (r12)
$\epsilon=1.0000$
$A4=0.23388\times10^{-1}$
$A6=0.12923\times10^{-1}$
$A8=-0.90422\times10^{-2}$
$A10=0.48878\times10^{-2}$
$A12=-0.39886\times10^{-3}$
Value of Condition (4) for $4^{th}$ Surface (r4)
y=0.00ymax ... $\{|x|-|x0|\}/\{C0\cdot(N'-N)\cdot f2\}=0.00000$
y=0.10ymax ... $\{|x|-|x0|\}/\{C0\cdot(N'-N)\cdot f2\}=-0.00004$
y=0.20ymax ... $\{|x|-|x0|\}/\{C0\cdot(N'-N)\cdot f2\}=-0.00065$
y=0.30ymax ... $\{|x|-|x0|\}/\{C0\cdot(N'-N)\cdot f2\}=-0.00302$
y=0.40ymax ... $\{|x|-|x0|\}/\{C0\cdot(N'-N)\cdot f2\}=-0.00850$
y=0.50ymax ... $\{|x|-|x0|\}/\{C0\cdot(N'-N)\cdot f2\}=-0.01805$
y=0.60ymax ... $\{|x|-|x0|\}/\{C0\cdot(N'-N)\cdot f2\}=-0.03222$
y=0.70ymax ... $\{|x|-|x0|\}/\{C0\cdot(N'-N)\cdot f2\}=-0.05194$
y=0.80ymax ... $\{|x|-|x0|\}/\{C0\cdot(N'-N)\cdot f2\}=-0.07987$
y=0.90ymax ... $\{|x|-|x0|\}/\{C0\cdot(N'-N)\cdot f2\}=-0.12147$
y=1.00ymax ... $\{|x|-|x0|\}/\{C0\cdot(N'-N)\cdot f2\}=-0.18339$
Value of Condition (4) for $5^{th}$ Surface (r5)
y=0.00ymax ... $\{|x|-|x0|\}/\{C0\cdot(N'-N)\cdot f2\}=0.00000$
y=0.10ymax ... $\{|x|-|x0|\}/\{C0\cdot(N'-N)\cdot f2\}=-0.00000$
y=0.20ymax ... $\{|x|-|x0|\}/\{C0\cdot(N'-N)\cdot f2\}=-0.00004$
y=0.30ymax ... $\{|x|-|x0|\}/\{C0\cdot(N'-N)\cdot f2\}=-0.00023$
y=0.40ymax ... $\{|x|-|x0|\}/\{C0\cdot(N'-N)\cdot f2\}=-0.00081$
y=0.50ymax ... $\{|x|-|x0|\}/\{C0\cdot(N'-N)\cdot f2\}=-0.00225$
y=0.60ymax ... $\{|x|-|x0|\}/\{C0\cdot(N'-N)\cdot f2\}=-0.00534$
y=0.70ymax ... $\{|x|-|x0|\}/\{C0\cdot(N'-N)\cdot f2\}=-0.01129$
y=0.80ymax ... $\{|x|-|x0|\}/\{C0\cdot(N'-N)\cdot f2\}=-0.02170$
y=0.90ymax ... $\{|x|-|x0|\}/\{C0\cdot(N'-N)\cdot f2\}=-0.03845$ y=1.00ymax ... {|x|−|x0|}/{C0·(N'−N)·f2}=−0.06450
Value of Condition (5) for $9^{th}$ Surface (r9)
y=0.00ymax ... {|x|−|x0|}/{C0·(N'−N)·f3}=0.00000
y=0.10ymax ... {|x|−|x0|}/{C0·(N'−N)·f3}=−0.00000
y=0.20ymax ... {|x|−|x0|}/{C0·(N'−N)·f3}=−0.00006
y=0.30ymax ... {|x|−|x0|}/{C0·(N'−N)·f3}=−0.00027
y=0.40ymax ... {|x|−|x0|}/{C0·(N'−N)·f3}=−0.00082
y=0.50ymax ... {|x|−|x0|}/{C0·(N'−N)·f3}=−0.00195
y=0.60ymax ... {|x|−|x0|}/{C0·(N'−N)·f3}=−0.00416
y=0.70ymax ... {|x|−|x0|}/{C0·(N'−N)·f3}=−0.00841
y=0.80ymax ... {|x|−|x0|}/{C0·(N'−N)·f3}=−0.01642
y=0.90ymax ... {|x|−|x0|}/{C0·(N'−N)·f3}=−0.03165
y=1.00ymax ... {|x|−|x0|}/{C0·(N'−N)·f3}=−0.06258
Value of Condition (5) for $11^{th}$ Surface (r11)
y=0.00ymax ... {|x|−|x0|}/{C0·(N'−N)·f3}=−0.00000
y=0.10ymax ... {|x|−|x0|}/{C0·(N'−N)·f3}=0.00000
y=0.20ymax ... {|x|−|x0|}/{C0·(N'−N)·f3}=0.00004
y=0.30ymax ... {|x|−|x0|}/{C0·(N'−N)·f3}=0.00022
y=0.40ymax ... {|x|−|x0|}/{C0·(N'−N)·f3}=0.00000
y=0.50ymax ... {|x|−|x0|}/{C0·(N'−N)·f3}=0.00000
y=0.60ymax ... {|x|−|x0|}/{C0·(N'−N)·f3}=0.00000
y=0.70ymax ... {|x|−|x0|}/{C0·(N'−N)·f3}=0.00000
y=0.80ymax ... {|x|−|x0|}/{C0·(N'−N)·f3}=0.00000
y=0.90ymax ... {|x|−|x0|}/{C0·(N'−N)·f3}=0.00000
y=1.00ymax ... {|x|−|x0|}/{C0·(N'−N)·f3}=0.00000
Value of Condition (5) for $12^{th}$ Surface (r12)
y=0.00ymax ... {|x|−|x0|}/{C0·(N'−N)·f3}=−0.00000
y=0.10ymax ... {|x|−|x0|}/{C0·(N'−N)·f3}=−0.00009
y=0.20ymax ... {|x|−|x0|}/{C0·(N'−N)·f3}=−0.00144
y=0.30ymax ... {|x|−|x0|}/{C0·(N'−N)·f3}=−0.00755
y=0.40ymax ... {|x|−|x0|}/{C0·(N'−N)·f3}=−0.02480
y=0.50ymax ... {|x|−|x0|}/{C0·(N'−N)·f3}=−0.06314
y=0.60ymax ... {|x|−|x0|}/{C0·(N'−N)·f3}=−0.13663
y=0.70ymax ... {|x|−|x0|}/{C0·(N'−N)·f3}=−0.26441
y=0.80ymax ... {|x|−|x0|}/{C0·(N'−N)·f3}=−0.47298
y=0.90ymax ... {|x|−|x0|}/{C0·(N'−N)·f3}=−0.80228
y=1.00ymax ... {|x|−|x0|}/{C0·(N'−N)·f3}=−1.31900

FIGS. 11~20 are aberration diagrams corresponding to examples 1–10, respectively. In the drawings, (a)~(c) are wide angle end aberration diagrams, (d)~(f) are intermediate focal length aberration diagrams, and (g)~(i) are telephoto end aberration diagrams. In spherical aberration diagrams (a),(d),(g), the solid line represents the d-line, and the broken line represents the sine condition. In aspherical aberration diagrams (b),(e),(h), the solid line DS and broken line DM represent astigmatism of sagittal flux and meridional flux, respectively. Drawings (c),(f),(i) show distortion.

Table 11 shows values corresponding to conditional equations (1)~(10) for examples 1~10.

TABLE 11(a)

|  | f2/fw | M2/fw | M1/Z |
|---|---|---|---|
| Emb. 1 | −1.08142 | −1.04965 | 0.736965 |
| Emb. 2 | −1.2472 | −1.97209 | 0.660825 |
| Emb. 3 | −1.39746 | −1.28936 | 0.929903 |
| Emb. 4 | −1.13599 | −1.49953 | 0.73772 |
| Emb. 5 | −1.3124 | −0.75906 | 1.375 |

TABLE 11(b)

|  | Emb. 6 | Emb. 7 | Emb. 8 | Emb. 9 | Emb. 10 |
|---|---|---|---|---|---|
| fW | 3.3 | 3.3 | 3.3 | 3.3 | 3.3 |
| fT | 19.8 | 26.4 | 19.8 | 26.4 | 33.0 |
| f1 | 24.4 | 23.8 | 22.6 | 24.2 | 29.0 |

TABLE 11(b)-continued

|  | Emb. 6 | Emb. 7 | Emb. 8 | Emb. 9 | Emb. 10 |
|---|---|---|---|---|---|
| f2 | −3.4 | −3.4 | −3.4 | −3.3 | −3.5 |
| M1 | 9.8 | 11.2 | 9.2 | 12.3 | 15.9 |
| M1/Z | 1.63 | 1.40 | 1.53 | 1.54 | 1.59 |
| f1/fw | 7.40 | 7.21 | 6.86 | 7.34 | 8.78 |
| f2/fw | −1.03 | −1.04 | −1.03 | −1.00 | −1.07 |
| Z | 6.0 | 8.0 | 6.0 | 8.0 | 10.0 |

The various lens elements need not be constructed only of refractive type lens elements which deflect incidence rays by refraction as described above, and may include diffraction lens elements which deflect incidence rays by diffraction, and refraction/diffraction type hybrid lens elements which deflect incidence rays via a combination of refractive and diffractive actions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system comprising sequentially from the object side:

a first lens unit having positive optical power;

a second lens unit having negative optical power; and a third lens unit having positive optical power, wherein said first lens unit moves monotonously to the object side, the second lens unit moves to the image side, and the third lens unit moves linearly to the object side, during zooming from the wide angle end to the telephoto end, and wherein the following conditional equation is satisfied:

$$0.2 < M1/Z < 2.0$$

where M1 represents the amount of movement of the first lens unit during zooming from the wide angle end to the telephoto end, Z represents the zoom ratio (fT/fW), fT represents the overall focal length of the total system at the telephoto end, and fW represents the overall focal length of the total system at the wide angle end.

2. A zoom lens system in accordance with claim 1, wherein the first lens unit comprises a negative lens element and a positive lens element.

3. A zoom lens system in accordance with claim 1, wherein the second lens unit comprises a negative lens element and positive lens element.

4. A zoom lens system in accordance with claim 1, wherein the third lens unit includes a positive lens element having a strong curvature on the object side as the element nearest the object side.

5. A zoom lens system in accordance with claim 1, wherein the following conditional equations are satisfied:

$$0.7 < 2M/fW < 2.2$$

$$-0.9 < f2/fW < -2.0$$

where M represents the amount of movement of the second lens unit from the wide angle end to the telephoto end during zooming, f2 represents the focal length of the second lens unit, and fW represents the overall focal length of the system at the wide angle end.

6. A zoom lens system in accordance with claim 1, wherein at least one aspherical surface is provided in said second lens unit which satisfies the following conditional equation:

$$-8 < (|X|-|Xo|)/Co(N'-N)f2 < 0.0$$

where X represents the amount of displacement in the optical axis direction of the height Y of the effective optical path expressed by equation (a) below, Xo represents the displacement in the optical axis direction of the height Y of the effective optical path expressed by equation (b) below, Co represents the curvature of the spherical surface referenced to the aspherical surface, N' represents the refractive index on the image side of the aspherical surface, N represents the refractive index on the object side of the aspherical surface, and f2 represents the focal length of the second lens unit, and wherein equations (a) and (b) are as follows:

$$X = Xo + \Sigma AjY^j \quad (a)$$

$$Xo = COY^2/\{1+(1-\epsilon CO^2Y^2)^{1/2}\} \quad (b)$$

where Aj represents the aspherical surface coefficient of the j degree, and $\epsilon$ represents the curvature parameter of the second degree.

7. A zoom lens system in accordance with claim 1, wherein at least one aspherical surface is provided in said third lens unit which satisfies the following conditional equation:

$$-1.0 < (|X|-|Xo|)/Co(N'-N)f3 < 1.0, \text{ except zero,}$$

where X represents the amount of displacement in the optical axis direction of the height Y of the effective optical path expressed by equation (a) below, Xo represents the displacement in the optical axis direction of the height Y of the effective optical path expressed by equation (b) below, Co represents the curvature of the spherical surface referenced to the aspherical surface, N' represents the refractive index on the image side of the aspherical surface, N represents the refractive index on the object side of the aspherical surface, and f3 represents the focal length of the third lens unit, and wherein equations (a) and (b) are as follows:

$$X = Xo + \Sigma AjY^j \quad (a)$$

$$Xo = CoY^2/\{1+(1-\epsilon Co^2Y^2)^{1/2}\} \quad (b)$$

where Aj represents the aspherical surface coefficient of the j degree, and $\epsilon$ represents the curvature parameter of the second degree.

8. A zoom lens system in accordance with claim A1, wherein the first lens unit moves linearly to the object side, the second lens unit moves linearly to the image side, and the third lens unit moves linearly to the object side during zooming from the wide angle end to the telephoto end.

9. A zoom lens system in accordance with claim 1, wherein the first lens unit moves linearly to the object side, the second lens unit moves linearly to the image side, and the third lens unit tracks a convexity to the object side.

10. A zoom lens system in accordance with claim 1, wherein the first lens unit comprises sequentially from the object side a negative meniscus lens element having a convex surface facing the object side, and a positive meniscus lens element having a strongly convex surface facing the object side;

the second lens unit comprises sequentially from the object side a biconcave lens element having a strongly concave surface facing the image side, and a positive meniscus lens element having a convex surface facing the image side; and the third lens unit comprises sequentially from the object side a biconvex lens element having a strongly convex surface facing the object side, and a biconcave lens element.

11. A zoom lens system in accordance with claim 10, further comprising an aperture positioned between the second and third lens units, wherein said aperture moves linearly to the object side during zooming from the wide angle end to the telephoto end.

12. A zoom lens system in accordance with claim 1, wherein the first lens unit comprises sequentially from the object side a negative meniscus lens element having a convex surface facing the object side, and a biconvex lens element having a strongly convex surface facing the object side;

the second lens unit comprises sequentially from the object side a negative meniscus lens element having a strongly concave surface facing the image side, and a meniscus lens element having weak optical power and a convex surface facing the object side; and the third lens unit comprises sequentially from the object side a biconvex lens element having a strongly convex surface facing the object side, and a negative meniscus lens element having a concave surface facing the image side.

13. A zoom lens system in accordance with claim 12, further comprising an aperture positioned between the second and third lens units, wherein said aperture moves as part of said third lens unit.

14. A zoom lens system in accordance with claim 1, wherein the first lens unit comprises sequentially from the object side a negative meniscus lens element having a convex surface facing the object side, and positive meniscus lens element having a strongly convex surface facing the object side;

the second lens unit comprises sequentially from the object side a negative meniscus lens element having a strongly concave surface facing the image side, and positive meniscus lens element having a convex surface facing the image side; and the third lens unit comprises sequentially from the object side a biconvex lens element having a strongly convex surface facing the object side, and a negative meniscus lens element having a concave surface facing the image side.

15. A zoom lens system in accordance with claim 14, further comprising an aperture positioned between the second and third lens units, wherein said aperture moves convexly initially toward the object side during zooming from the wide angle end to the telephoto end.

16. A zoom lens system in accordance with claim 1, wherein the first lens unit comprises sequentially from the object side a negative meniscus lens element having a convex surface facing the object side, and a positive meniscus lens element having a convex surface facing the object side;

the second lens unit comprises sequentially from the object side a negative meniscus lens element having a strongly concave surface facing the image side, and a positive meniscus lens element having a convex surface facing the object side; and the third lens unit comprises sequentially from the object side a biconvex lens element having a strongly convex surface facing the object side, and a negative meniscus lens element having a concave surface facing the image side.

17. A zoom lens system in accordance with claim 16, further comprising an aperture positioned between the second and third lens units, wherein said aperture moves convexly toward the object side during zooming from the wide angle end to the telephoto end.

18. A zoom lens system in accordance with claim 1, wherein the first lens unit comprises sequentially from the object side a cemented lens element incorporating a negative meniscus lens element having a convex surface facing the object side, and a positive meniscus lens element having a strongly convex surface facing the object side;

the second lens unit comprises a biconcave lens element having a strongly concave surface facing the image side, and a positive meniscus lens element having a convex surface facing the object side; and the third lens unit comprises sequentially from the object side a biconvex lens element having a strongly convex surface facing the object side, and a biconcave lens element.

19. A zoom lens system in accordance with claim 18, further comprising an aperture positioned between the second and third lens units, wherein said aperture moves as part of said third lens unit.

20. A zoom lens system comprising sequentially from the object side:

a first lens unit having positive optical power;

a second lens unit having negative optical power; and a third lens unit having positive optical power, wherein said first lens unit moves to the object side and said third lens unit moves linearly to the object side during zooming from the wide angle end to the telephoto end, and wherein the following conditional equation is satisfied:

$$0.2 < M1/Z < 3.0$$

where M1 represents the amount of movement of the first lens unit during zooming from the wide angle end to the telephoto end, Z represents the zoom ratio (fT/fW), fT represents the overall focal length of the total system at the telephoto end, and fW represents the overall focal length of the total system at the wide angle end.

21. A zoom lens system in accordance with claim 20, wherein the first lens unit comprises a negative lens element and a positive lens.

22. A zoom lens system in accordance with claim 20, wherein the second lens unit comprises a negative lens element and positive lens element.

23. A zoom lens system in accordance with claim 20, wherein the third lens unit is provided with a positive lens element having a strong curvature on the object side as the element nearest the object side.

24. A zoom lens system in accordance with claim 20, wherein the following conditional equation is satisfied:

$$4.0 < f1/fW < 10.0$$

where f1 represents the focal length of the first lens unit, and fW represents the focal length of the overall system at the wide angle end.

25. A zoom lens system in accordance with claim 20, wherein the following conditional equation is satisfied:

$$-0.95 < f2/fW < -2.5$$

where f2 represents the focal length of the second lens unit, and fW represents the focal length of the overall system at the wide angle end.

26. A zoom lens system in accordance with claim 20, wherein at least one aspherical surface is provided in said second lens unit which satisfies the following conditional equation:

$$-8 < (|X|-|Xo|)/Co(N'-N)f2 < 0.0$$

where X represents the amount of displacement in the optical axis direction of the height Y of the effective optical path expressed by equation (c) below, Xo represents the displacement in the optical axis direction of the height Y of the effective optical path expressed by equation (d) below, Co represents the curvature of the spherical surface referenced to the aspherical surface, N' represents the refractive index on the image side of the aspherical surface, N represents the refractive index on the object side of the aspherical surface, and f2 represents the focal length of the second lens unit, and wherein equations (c) and (d) are as follows:

$$X = Xo + \Sigma Aj Y^j \qquad (c)$$

$$Xo = CoY^2/\{1+(1-\epsilon Co^2 Y^2)^{1/2}\} \qquad (d)$$

where Aj represents the aspherical surface coefficient of the j degree, and $\epsilon$ represents the curvature parameter of the second degree.

27. A zoom lens system in accordance with claim 20, wherein at least one aspherical surface is provided in said third lens unit which satisfies the following conditional equation:

$$-1.0 < (|X|-|Xo|)/Co(N'-N)f3 < 1.0, \text{ except zero,}$$

where X represents the amount of displacement in the optical axis direction of the height Y of the effective optical path expressed by equation (c) below, Xo represents the displacement in the optical axis direction of the height Y of the effective optical path expressed by equation (d) below, Co represents the curvature of the spherical surface referenced to the aspherical surface, N' represents the refractive index on the image side of the aspherical surface, N represents the refractive index on the object side of the aspherical surface, and f3 represents the focal length of the third lens unit, and wherein equations (c) and (d) are as follows:

$$X = Xo + \Sigma Aj Y^j \qquad (c)$$

$$Xo = COY^2/\{1+(1-\epsilon Co^2 Y^2)^{1/2}\} \qquad (d)$$

where Aj represents the aspherical surface coefficient of the j degree, and $\epsilon$ represents the curvature parameter of the second degree.

28. A zoom lens system in accordance with claim 20, the second lens unit is stationary.

29. A zoom lens system in accordance with claim 20, wherein the second lens unit moves toward the object side during zooming from the wide angle end to the telephoto end.

30. A zoom lens system in accordance with claim 20, wherein when zooming from the wide angle end to the telephoto end, the various lens units are moved such that the distance increases between the first lens unit and the second lens unit, and the distance decreases between the second lens unit and the third lens unit.

31. A zoom lens system in accordance with claim 20, wherein
the first lens unit comprises sequentially from the object side a cemented lens incorporating a negative meniscus lens element having a convex surface facing the object side, and a biconvex lens element having a strongly convex surface facing the object side;
the second lens unit comprises sequentially from the object side a biconvex lens element having a strongly convex surface facing the image side, and a positive meniscus lens element having a convex surface facing the image side; and
the third lens unit comprises sequentially from the object side a biconvex lens element having a strongly convex surface facing the object side, and a negative meniscus lens element having a convex surface facing the object side.

32. A zoom lens system in accordance with claim 20, wherein
the first lens unit comprises sequentially from the object side a cemented lens unit incorporating a negative meniscus lens element having a convex surface facing the object side, and a biconvex lens element having a strongly convex surface facing the object side;
the second lens unit comprises sequentially form the object side a negative meniscus lens element having a strongly concave surface facing the image side, and a positive meniscus lens element having a convex surface facing the object side; and
the third lens unit comprises sequentially from the object side a biconvex lens element having a strongly convex surface facing the object side, and a biconcave lens element having a strongly concave surface facing the image side.

33. A zoom lens system in accordance with claim 20, wherein
the first lens unit comprises sequentially from the object side a cemented lens element incorporating a negative meniscus lens element having a convex surface facing the object side, and a biconvex lens element having a strongly convex surface facing the object side;
the second lens unit comprises sequentially from the object side a negative meniscus lens element having a strongly concave surface facing the image side, and a positive meniscus lens element having a convex surface facing the image side; and
the third lens unit comprises sequentially from the object side a biconvex lens element having a strongly convex surface facing the object side, and a biconcave lens element having a concave surface on the image side.

34. A zoom lens system in accordance with claim 20, wherein
the first lens unit comprises sequentially from the object side a cemented lens element incorporating a negative meniscus lens element having a convex surface facing the object side, and a biconvex lens element having a strongly convex surface facing the object side;
the second lens unit comprises sequentially from the object side a negative meniscus lens element having a strongly concave surface facing the image side, and a positive meniscus lens element having a convex surface facing the image side; and
the third lens unit comprises sequentially from the object side a biconvex lens element having a strongly convex lens element facing the object side, and a biconcave lens element having a concave surface facing the image side.

35. A zoom lens system in accordance with claim 20, wherein
the first lens unit comprises sequentially from the object side a cemented lens element incorporating a negative meniscus lens element having a convex surface facing the object side, and a biconvex lens element having a strongly convex surface facing the object side;
the second lens unit comprises sequentially from the object side a negative meniscus lens element having a strongly concave surface facing the image side, and a positive meniscus lens element having a convex surface facing the image side; and
the third lens unit comprises sequentially from the object side a biconvex lens element having a strongly convex surface facing the object side, and a biconcave lens element having a concave surface facing the image side.

36. A zoom lens system comprising sequentially from an object side:
a first lens unit having a positive optical power;
a second lens unit having a negative optical power; and
a third lens unit having a positive optical power,
wherein, when zooming, the first lens unit and the second lens unit move in mutually opposite directions along an optical axis,
wherein the third lens unit moves monotonously toward the object side when zooming from a wide angle end to a telephoto end, and
wherein the following conditional equation is satisfied:

$$0.2 < M1/Z < 2.0$$

where, M1 represents an amount of movement of the first lens unit during zooming from the wide angle end to the telephoto end, Z represents a zoom ratio (fT/fW), fT represents an overall focal length of the zoom lens system at the telephoto end, and fW represents an overall focal length of the zoom lens system at the wide angle end.

37. A zoom lens system in accordance with claim 36, wherein the first lens unit moves monotonously toward the object side during zooming from the wide angle end to the telephoto end and the second lens unit moves monotonously toward the image side during zooming from the wide angle end to the telephoto end.

38. A zoom lens system in accordance with claim 36, further comprising an aperture diaphragm provided between the second and third lens units, wherein the third lens unit and the aperture diaphragm move integrally during zooming.

39. A zoom lens system in accordance with claim 36, further comprising an aperture diaphragm provided between the second and third lens units, wherein the third lens unit and the aperture diaphragm do not move integrally during zooming.

40. A zoom lens systems comprising sequentially from an object side:
a first lens unit having a positive optical power:
a second lens unit having a negative optical power; and
a third lens unit having a positive optical power,
wherein, when zooming, the first lens unit and the second lens unit move in mutually opposite directions along an optical axis, wherein the third lens unit moves to the object side by following a locus of a convex line when zooming from a wide angle end to a telephoto end, and wherein the following conditional equation is satisfied:

$$0.2<M1/Z<2.0$$

where, M1 represents an amount of movement of the first lens unit during zooming from the wide angle end to the telephoto end, Z represents a zoom ratio (fT/fW), fT represents an overall focal length of the zoom lens system at the telephoto end, and fW represents an overall focal length of the zoom lens system at the wide angle end.

41. A zoom lens system in accordance with claim 40, wherein the first lens unit moves monotonously toward the object side during zooming from the wide angle end to the telephoto end and the second lens unit moves monotonously toward the image side during zooming from the wide angle end to the telephoto end.

42. A zoom lens systems in accordance with claim 40, further comprising an aperture diaphragm provided between the second and third lens units, wherein the third lens unit and the aperture diaphragm move integrally during zooming.

43. A zoom lens system in accordance with claim 40, further comprising an aperture diaphragm provided between the second and third lens units, wherein the third lens unit and the aperture diaphragm do not move integrally during zooming.

44. A zoom lens system comprising sequentially from an object side:

a first lens unit having a positive optical power, the first lens unit moving toward the object side along an optical axis when zooming from a wide angle end to a telephoto end;

a second lens unit having a negative optical power, the second lens unit being fixed during zooming; and a third lens unit having a positive optical power, the third lens unit moving linearly toward the object side when zooming from the wide angle end to the telephoto end, and wherein the following conditional equation is satisfied:

$$0.2<M1/Z<3.0$$

where, M1 represents an amount of movement of the first lens unit during zooming from the wide angle end to the telephoto end, Z represents a zoom ratio (fT/fW), fT represents and overall focal length of the zoom lens system at the telephoto end, and fW represents an overall focal length of the zoom lens system at the wide angle end.

45. A zoom lens system comprising sequentially from an object side:

a first lens unit having a positive optical power, the first lens unit moving toward the object side along an optical axis when zooming from a wide angle end to a telephoto end;

a second lens unit having a negative optical power, the second lens unit being fixed during zooming; and a third lens unit having a positive optical power, the third lens unit moving linearly toward the object side along the optical axis when zooming from the wide angle end to the telephoto end, and wherein the following conditional equation is satisfied:

$$4.0<f1/fW<10.0$$

where, f1 represents a focal length of the first lens unit, and fW represents an overall focal length of the zoom lens system at the wide angle end.

46. A zoom lens system comprising sequentially from an object side:

a first lens unit having a positive optical power, the first lens unit moving toward the object side along an optical axis when zooming from a wide angle end to a telephoto end;

a second lens unit having a negative optical power, the second lens unit moving to a position toward the object side from the wide angle end at an intermediate focal length fM; and a third lens unit having a positive optical power, the third lens unit moving linearly toward the object side along the optical axis when zooming from the wide angle end to the telephoto end, and wherein the following conditional equation is satisfied:

$$0.2<M1/Z<3.0$$

where, M1 represents an amount of movement of the first lens unit during zooming from the wide angle end to the telephoto end, Z represents a zoom ratio (fT/fW), fT represents an overall focal length of the zoom lens system at the telephoto end, fW represents an overall focal legth of the zoom lens system at the wide angle end, and fM represents an intermediate focal length which is defined by $fM\surd(fT\times fW)$.

47. A zoom lens system for focusing an image on a solid state electronic imaging medium, comprising sequentially from an object side:

a first lens unit having a positive optical power;

a second lens unit having a negative optical power;

a third lens unit having a positive optical power; and an optical lowpass filter, wherein, when zooming, the first lens unit and the second lens unit move in mutually opposite directions along an optical axis, wherein the third lens unit moves monotonously toward the object side when zooming from a wide angle end to a telephoto end, and wherein the following conditional equation is satisfied:

$$0.2<M1/Z<2.0$$

where, M1 represents an amount of movement of the first lens unit during zooming from the wide angle end to the telephoto end, Z represents a zoom ratio (fT/fW), fT represents an overall focal length of the zoom lens system at the telephoto end, and fW represnets an overall focal length of the zoom lens system at the wide angle end.

48. A zoom lens system for focusing an image on a solid state electronic imaging medium, comprising sequentially from an object side:

a first lens unit having a positive optical power;

a second lens unit having a negative optical power;

a third lens unit having a positive optical power; and an optical lowpass filter, wherein, when zooming, the first lens unit and the second lens unit move in mutually opposite directions along an optical axis, wherein the third lens unit moves toward the object side by following a locus of a convex line when zooming from a wide angle end to a telephoto end, and wherein the following conditional equation is satisfied:

$$0.2 < M1/Z < 2.0$$

where, M1 represents an amount of movement of the first lens unit when zooming from the wide angle end to the telephoto end, Z represents a zoom ratio (fT/fW), fT represents an overall focal length of the zoom lens system at the telephoto end, and fW represents an overall focal length of the zoom lens system at the wide angle end.

49. A zoom lens system for focusing an image on a solid state electronic imaging medium, comprising sequentially from an object side:

a first lens unit having a positive optical power, the first lens unit moving toward the object side along an optical axis when zooming from a wide angle end to a telephoto end, a second lens unit having a negative optical power, the second lens unit being fixed during zooming;

a third lens unit having a positive optical power, the third lens unit moving linearly toward the object side when zooming from the wide angle end to the telephoto end, and an optical lowpass filter.

wherein the following conditional equation is satisfied:

$$0.2 < M1/Z < 3.0$$

where, M1 represents an amount of movement of the first lens unit during zooming from the wide angle end to the telephoto end, Z represents a zoom ratio (fT/fW), fT represents an overall focal length of the zoom lens system at the telephoto end, and fW represents an overall focal length of the zoom lens system at the wide angle end.

50. A zoom lens system for focusing an image on a solid state electronic imaging medium, comprising sequentially from an object side:

a first lens unit having a positive optical power, the first lens unit moving toward the object side along an optical axis when zooming from a wide angle end to a telephoto end;

a second lens unit having a negative optical power, the second lens unit being fixed during zooming;

a third lens unit having a positive optical power, the third lens unit moving linearly toward the object side along the optical axis when zooming from the wide angle end to the telephoto end; and an optical lowpass filter, wherein the following conditional equation is satisfied:

$$4.0 < f1/fW < 10.0$$

where, f1 represents a focal length of the first lens unit, and fW represents an overall focal length of the zoom lens system at the wide angle end.

51. A zoom lens system for focusing an image on a solid state electronic imaging medium, comprising sequentially from an object side:

a first lens unit having a positive optical power, the first lens unit moving toward the object side along an optical axis when zooming from a wide angle end to a telephoto end;

a second lens unit having a negative optical power, the second lens unit moving toward a position toward the object side from the wide angle end at an intermediate focal length fM;

a third lens unit having a positive optical power, the third lens unit moving linearly toward the object side along the optical axis when zooming from the wide angle end to the telephoto end; and an optical lowpass filter, wherein the folllowing conditional equation is satisfied:

$$0.2 < M1/Z < 3.0$$

where, M1 represents an amount of movement of the first lens unit during zooming from the wide angle end to the telephoto end, Z represents a zoom ratio (fT/fW), fT represents an overall focal length of the zoom lens system at the telephoto end, fW represents an overall focal length of the zoom lens system at the wide angle end, and fM represents an intermediate focal length which is defined by $fM\sqrt{(fT \times fW)}$.

* * * * *